(12) United States Patent
Kashi et al.

(10) Patent No.: US 12,509,509 B2
(45) Date of Patent: Dec. 30, 2025

(54) SOLUTION FORMULATIONS OF ENGINEERED ANTI-IL-23p19 ANTIBODIES

(71) Applicant: MERCK SHARP & DOHME LLC, Rahway, NJ (US)

(72) Inventors: Ramesh S. Kashi, Kenilworth, NJ (US); Aniket Badkar, Portage, MI (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 0 days.

(21) Appl. No.: 14/651,946

(22) PCT Filed: Dec. 9, 2013

(86) PCT No.: PCT/US2013/073825
§ 371 (c)(1),
(2) Date: Jun. 12, 2015

(87) PCT Pub. No.: WO2014/093203
PCT Pub. Date: Jun. 19, 2014

(65) Prior Publication Data
US 2015/0329632 A1 Nov. 19, 2015

Related U.S. Application Data

(60) Provisional application No. 61/737,035, filed on Dec. 13, 2012.

(51) Int. Cl.
*C07K 16/24* (2006.01)
*A61K 39/395* (2006.01)
*A61K 39/00* (2006.01)

(52) U.S. Cl.
CPC ...... *C07K 16/244* (2013.01); *A61K 39/39591* (2013.01); *A61K 2039/505* (2013.01); *C07K 2317/24* (2013.01); *C07K 2317/51* (2013.01); *C07K 2317/515* (2013.01); *C07K 2317/56* (2013.01); *C07K 2317/94* (2013.01)

(58) Field of Classification Search
None
See application file for complete search history.

(56) References Cited

U.S. PATENT DOCUMENTS

| | | |
|---|---|---|
| 4,401,820 A | 8/1983 | Chibata et al. |
| 4,816,567 A | 3/1989 | Cabilly et al. |
| 5,262,296 A | 11/1993 | Ogawa et al. |
| 5,762,905 A | 6/1998 | Burton et al. |
| 6,171,586 B1 | 1/2001 | Lam et al. |
| 6,267,958 B1 | 7/2001 | Andya et al. |
| 6,329,511 B1 | 12/2001 | Vasquez et al. |
| 6,818,216 B2 | 11/2004 | Young et al. |
| 6,875,432 B2 | 4/2005 | Liu et al. |
| 7,132,100 B2 * | 11/2006 | Oliver ............ A61K 47/183 530/387.3 |
| 7,247,707 B2 | 7/2007 | Besman et al. |
| 7,364,736 B2 | 4/2008 | Boyle et al. |
| 7,374,762 B2 | 5/2008 | Amphlett et al. |
| 7,375,193 B2 | 5/2008 | Baca et al. |
| 7,563,869 B2 | 7/2009 | Honjo et al. |
| 7,592,004 B2 | 9/2009 | Kaisheva et al. |
| 7,615,213 B2 | 11/2009 | Kasaian et al. |
| 7,635,473 B2 | 12/2009 | Warne et al. |
| 7,662,384 B2 | 2/2010 | Ramakrishnan et al. |
| 7,666,413 B2 | 2/2010 | Liu et al. |
| 7,691,379 B2 | 4/2010 | Allan |
| 7,705,132 B2 | 4/2010 | Rehder et al. |
| 7,740,842 B2 | 6/2010 | Arvinte et al. |
| 7,833,525 B2 | 11/2010 | Shenoy et al. |
| 7,951,368 B2 * | 5/2011 | Li .................. A61K 47/10 424/130.1 |
| 7,959,922 B2 | 6/2011 | Bakker et al. |
| 7,960,516 B2 | 6/2011 | Matheus et al. |
| 7,993,645 B2 | 8/2011 | Benson et al. |
| 7,998,477 B2 | 8/2011 | Yakovlevsky et al. |
| 8,034,906 B2 | 10/2011 | Borhani et al. |
| 8,067,547 B2 | 11/2011 | Ewert et al. |
| 8,142,776 B2 | 3/2012 | Liu et al. |
| 8,168,760 B2 | 5/2012 | Borhani et al. |
| 8,216,583 B2 | 7/2012 | Kruase et al. |
| 8,221,759 B2 | 7/2012 | Pilkington et al. |
| 8,263,080 B2 | 9/2012 | Katsikis et al. |
| 8,293,883 B2 | 10/2012 | Presta |
| 8,399,712 B2 | 3/2013 | Schultheiss et al. |
| 8,580,297 B2 | 11/2013 | Essler et al. |
| 8,703,126 B2 | 4/2014 | Liu et al. |
| 8,747,847 B2 | 6/2014 | Rotem-Yehudar et al. |
| 8,933,075 B2 | 1/2015 | Wang et al. |
| 8,952,136 B2 | 2/2015 | Carven et al. |
| 9,220,776 B2 | 12/2015 | Sharma et al. |
| 9,278,131 B2 | 3/2016 | Dauty et al. |
| 9,592,297 B2 | 3/2017 | Xiang et al. |
| 9,605,051 B2 | 3/2017 | Soane et al. |
| 9,713,641 B2 | 7/2017 | Hicklin et al. |
| 9,782,470 B2 | 10/2017 | Bhambhani et al. |

(Continued)

FOREIGN PATENT DOCUMENTS

| | | |
|---|---|---|
| AU | 2010200784 A1 | 3/2010 |
| CA | 2918888 A1 | 1/2015 |

(Continued)

OTHER PUBLICATIONS

Falconer et al. Stabilization of a monoclonal antibody during purification and formulation by addition of basic amino acid excipients. J Chem Technol Biotechnol 2011; 86: 942-948.*

(Continued)

*Primary Examiner* — Dong Jiang
(74) *Attorney, Agent, or Firm* — McDonnell Boehnen Hulbert & Berghoff LLP

(57) ABSTRACT

The present invention provides high concentration solution formulations of anti-human interleukin-23 p19 (IL-23p19) antibody hum13B8-b, and their use in treating various disorders.

6 Claims, 46 Drawing Sheets

Specification includes a Sequence Listing.

(56) References Cited

U.S. PATENT DOCUMENTS

| | | |
|---|---|---|
| 9,926,371 B2 | 3/2018 | Liu et al. |
| 10,072,072 B2 | 9/2018 | Vora et al. |
| 10,188,730 B2 | 1/2019 | Liang |
| 10,787,518 B2 | 9/2020 | Bernett et al. |
| 2004/0091490 A1 | 5/2004 | Johnson et al. |
| 2005/0101770 A1 | 5/2005 | Presta |
| 2006/0029599 A1 | 2/2006 | Kaisheva et al. |
| 2006/0057702 A1 | 3/2006 | Rosenthal et al. |
| 2006/0088523 A1 | 4/2006 | Andya et al. |
| 2006/0210557 A1 | 9/2006 | Luisi et al. |
| 2006/0210567 A1 | 9/2006 | Collins et al. |
| 2006/0246004 A1 | 11/2006 | Adams et al. |
| 2006/0286103 A1 | 12/2006 | Kolhe et al. |
| 2007/0009526 A1 | 1/2007 | Benson et al. |
| 2007/0009541 A1 | 1/2007 | Amphlett et al. |
| 2007/0048315 A1 | 3/2007 | Presta et al. |
| 2007/0053900 A1 | 3/2007 | Liu et al. |
| 2007/0059803 A1 | 3/2007 | Oppmann et al. |
| 2007/0065437 A1 | 3/2007 | Elson et al. |
| 2007/0184050 A1 | 8/2007 | Ishikawa et al. |
| 2007/0190047 A1 | 8/2007 | Brych et al. |
| 2008/0003220 A1 | 1/2008 | Gokarn |
| 2008/0050375 A1 | 2/2008 | Davies et al. |
| 2008/0057070 A1 | 3/2008 | Long et al. |
| 2008/0112953 A1 | 5/2008 | Mcauley et al. |
| 2008/0124326 A1 | 5/2008 | Rehder et al. |
| 2008/0152658 A1 | 6/2008 | Dagan et al. |
| 2008/0213282 A1 | 9/2008 | Jacob |
| 2008/0248048 A1 | 10/2008 | Fish et al. |
| 2008/0254026 A1 | 10/2008 | Long et al. |
| 2008/0286270 A1 | 11/2008 | Oliver et al. |
| 2008/0311119 A1 | 12/2008 | Maloney et al. |
| 2009/0042315 A1 | 2/2009 | Li et al. |
| 2009/0060906 A1 | 3/2009 | Barry et al. |
| 2009/0130119 A1 | 5/2009 | Abate et al. |
| 2009/0162352 A1 | 6/2009 | Adler et al. |
| 2009/0181027 A1 | 7/2009 | Dal Monte et al. |
| 2009/0208492 A1 | 8/2009 | O'Connor et al. |
| 2009/0217401 A1 | 8/2009 | Korman et al. |
| 2009/0285802 A1 | 11/2009 | Igawa et al. |
| 2009/0291076 A1 | 11/2009 | Morichika et al. |
| 2009/0304706 A1 | 12/2009 | Lu et al. |
| 2009/0311253 A1 | 12/2009 | Ghayur et al. |
| 2010/0021461 A1 | 1/2010 | Burke et al. |
| 2010/0055111 A1 | 3/2010 | Sharma et al. |
| 2010/0137213 A1 | 6/2010 | Fernandez et al. |
| 2010/0209434 A1 | 8/2010 | Bishop et al. |
| 2010/0209437 A1 | 8/2010 | Elson et al. |
| 2010/0266617 A1 | 10/2010 | Carven et al. |
| 2010/0272731 A1* | 10/2010 | Presta .............. C07K 14/54 424/158.1 |
| 2010/0278822 A1 | 11/2010 | Fraunhofer et al. |
| 2010/0286038 A1 | 11/2010 | Antochshuk et al. |
| 2010/0303827 A1 | 12/2010 | Sharma et al. |
| 2010/0316638 A1 | 12/2010 | Gurny et al. |
| 2011/0014203 A1 | 1/2011 | Nilsson et al. |
| 2011/0059079 A1 | 3/2011 | Babuka et al. |
| 2011/0060290 A1 | 3/2011 | Bonk et al. |
| 2011/0086038 A1 | 4/2011 | Hope et al. |
| 2011/0123550 A1 | 5/2011 | Shibayama et al. |
| 2011/0171217 A1 | 7/2011 | Badkar et al. |
| 2011/0226650 A1 | 9/2011 | Gokarn et al. |
| 2011/0229490 A1 | 9/2011 | Li et al. |
| 2011/0256135 A1 | 10/2011 | Fraunhofer et al. |
| 2011/0300135 A1 | 12/2011 | Lobo et al. |
| 2011/0318343 A1 | 12/2011 | Kaisheva et al. |
| 2012/0039876 A1 | 2/2012 | Oliver et al. |
| 2012/0076784 A1 | 3/2012 | Matheus et al. |
| 2012/0128687 A1 | 5/2012 | Adler et al. |
| 2012/0148576 A1 | 6/2012 | Sharma et al. |
| 2012/0183531 A1 | 7/2012 | Lucas et al. |
| 2012/0231972 A1 | 9/2012 | Golyshin et al. |
| 2013/0022625 A1 | 1/2013 | Igawa et al. |
| 2013/0058958 A1 | 3/2013 | Bowen et al. |
| 2013/0108651 A1 | 5/2013 | Carven et al. |
| 2013/0186797 A1 | 7/2013 | Walsh |
| 2014/0044708 A1 | 2/2014 | Dauty et al. |
| 2014/0044727 A1 | 2/2014 | Monck et al. |
| 2014/0093511 A1 | 4/2014 | Lonberg et al. |
| 2014/0178401 A1 | 6/2014 | Nabozny et al. |
| 2014/0206845 A1 | 7/2014 | Kameoka et al. |
| 2014/0227250 A1 | 8/2014 | Li et al. |
| 2014/0234296 A1 | 8/2014 | Sharma et al. |
| 2014/0314714 A1 | 10/2014 | Honjo et al. |
| 2014/0348841 A1 | 11/2014 | Schebye et al. |
| 2015/0071936 A1* | 3/2015 | Mendiratta ...... A61K 39/39591 424/142.1 |
| 2015/0071943 A1* | 3/2015 | Bishop .................. A61P 37/00 424/158.1 |
| 2015/0086559 A1 | 3/2015 | Mueller et al. |
| 2015/0100030 A1 | 4/2015 | Dix et al. |
| 2015/0110783 A1 | 4/2015 | Lu et al. |
| 2015/0258209 A1 | 9/2015 | Benz et al. |
| 2015/0290325 A1 | 10/2015 | Kashi et al. |
| 2015/0307606 A1 | 10/2015 | Basarkar et al. |
| 2015/0359900 A1 | 12/2015 | Wang et al. |
| 2016/0022814 A1 | 1/2016 | Petit et al. |
| 2016/0045615 A1 | 2/2016 | Li et al. |
| 2016/0090419 A1 | 3/2016 | Morichika et al. |
| 2016/0106835 A1 | 4/2016 | Hoos et al. |
| 2016/0166685 A1 | 6/2016 | Cheung et al. |
| 2016/0176963 A1 | 6/2016 | Maurer et al. |
| 2016/0222116 A1 | 8/2016 | Korman |
| 2016/0289315 A1 | 10/2016 | Mirza et al. |
| 2016/0304607 A1 | 10/2016 | Sadineni et al. |
| 2016/0355589 A1 | 12/2016 | Williams et al. |
| 2017/0051039 A1 | 2/2017 | Gombotz et al. |
| 2017/0056347 A1 | 3/2017 | Glick et al. |
| 2017/0097333 A1 | 4/2017 | Bhagwat et al. |
| 2017/0210792 A1 | 7/2017 | Mason et al. |
| 2017/0210812 A1 | 7/2017 | Wong et al. |
| 2017/0216433 A1 | 8/2017 | Li et al. |
| 2017/0267759 A1 | 9/2017 | Liang |
| 2017/0360929 A1 | 12/2017 | Sinha et al. |
| 2018/0237524 A1 | 8/2018 | Reichert et al. |
| 2018/0339045 A1 | 11/2018 | Li et al. |
| 2020/0055938 A1 | 2/2020 | Desai et al. |
| 2020/0147213 A1 | 5/2020 | Sharma et al. |
| 2020/0206350 A1 | 7/2020 | Chu et al. |
| 2020/0262922 A1 | 8/2020 | Bhattacharya et al. |
| 2022/0002410 A1 | 1/2022 | Antochshuk et al. |

FOREIGN PATENT DOCUMENTS

| | | |
|---|---|---|
| CN | 103429264 A | 12/2013 |
| CN | 107001470 A | 8/2017 |
| CN | 107743401 A | 2/2018 |
| CN | 107854439 A | 3/2018 |
| CN | 107922470 A | 4/2018 |
| CN | 108025018 A | 5/2018 |
| EP | 1801123 A2 | 6/2007 |
| EP | 2116265 A2 | 11/2009 |
| EP | 2275119 B1 | 9/2013 |
| EP | 3117837 A1 | 6/2017 |
| RU | 2589691 C2 | 7/2016 |
| TW | 201806974 A | 3/2018 |
| WO | 1989011297 A1 | 11/1989 |
| WO | 1994006448 A1 | 3/1994 |
| WO | 199704801 A1 | 2/1997 |
| WO | 2000/053631 | 9/2000 |
| WO | 2001/018051 | 3/2001 |
| WO | 2001030393 A2 | 3/2001 |
| WO | 2002072636 A2 | 9/2002 |
| WO | 03009817 A2 | 2/2003 |
| WO | 2003039485 A1 | 5/2003 |
| WO | 2003086310 A2 | 10/2003 |
| WO | 2004056875 A1 | 7/2004 |
| WO | WO 2004/055164 | 7/2004 |
| WO | 2004/071517 | 8/2004 |
| WO | 2004071439 | 8/2004 |
| WO | 2004/081190 | 9/2004 |
| WO | 2005120571 A2 | 12/2005 |
| WO | 2006121168 A1 | 11/2006 |
| WO | 2007019232 A2 | 2/2007 |

(56) References Cited

FOREIGN PATENT DOCUMENTS

| | | |
|---|---|---|
| WO | 2007/024846 | 3/2007 |
| WO | 2007/076524 | 7/2007 |
| WO | 2007092772 A2 | 8/2007 |
| WO | 2007110339 A1 | 10/2007 |
| WO | 2007/147019 | 12/2007 |
| WO | 2008076321 A1 | 6/2008 |
| WO | 2008079290 A2 | 7/2008 |
| WO | 2008086395 A2 | 7/2008 |
| WO | 2008/103432 | 8/2008 |
| WO | 2008/103473 | 8/2008 |
| WO | 2008121301 A1 | 10/2008 |
| WO | 2008/153610 | 12/2008 |
| WO | 2008156712 A1 | 12/2008 |
| WO | 2008157409 A1 | 12/2008 |
| WO | 2009009407 A1 | 1/2009 |
| WO | 2009/043933 | 4/2009 |
| WO | 2009120684 A1 | 10/2009 |
| WO | 2009126688 A2 | 10/2009 |
| WO | 2010032220 A1 | 3/2010 |
| WO | 2010062372 A2 | 6/2010 |
| WO | 2010069858 A1 | 6/2010 |
| WO | 2010102241 A1 | 9/2010 |
| WO | 2010129469 A1 | 11/2010 |
| WO | 2011012637 A2 | 2/2011 |
| WO | 2011017070 A1 | 2/2011 |
| WO | 2011024862 A1 | 3/2011 |
| WO | 2011056772 A1 | 5/2011 |
| WO | 2011080209 A2 | 7/2011 |
| WO | 2011139718 A1 | 11/2011 |
| WO | WO 2012/010799 | 1/2012 |
| WO | 2012018538 A2 | 2/2012 |
| WO | 2012076670 A2 | 6/2012 |
| WO | 2012135035 A1 | 10/2012 |
| WO | 2012135408 A1 | 10/2012 |
| WO | 2012165917 A1 | 12/2012 |
| WO | 2013063468 A1 | 5/2013 |
| WO | 2014004436 A2 | 1/2014 |
| WO | 2014036076 A1 | 3/2014 |
| WO | 2015011199 A1 | 1/2015 |
| WO | 2015038777 A1 | 3/2015 |
| WO | 2015038782 A1 | 3/2015 |
| WO | 2015038811 A2 | 3/2015 |
| WO | 2015038818 A2 | 3/2015 |
| WO | 2016015675 A1 | 2/2016 |
| WO | 2016024228 A1 | 2/2016 |
| WO | 2016028656 A1 | 2/2016 |
| WO | 2016028672 A1 | 2/2016 |
| WO | 2016100882 A1 | 6/2016 |
| WO | 2016118654 A1 | 7/2016 |
| WO | 2016140717 A1 | 9/2016 |
| WO | 2016168133 A1 | 10/2016 |
| WO | 2016168716 A1 | 10/2016 |
| WO | 2016176504 A1 | 11/2016 |
| WO | 2016196173 A1 | 12/2016 |
| WO | 2016200782 A1 | 12/2016 |
| WO | 2017025498 A1 | 2/2017 |
| WO | 2017030823 A2 | 2/2017 |
| WO | 2017037203 A1 | 3/2017 |
| WO | 2017040790 A1 | 3/2017 |
| WO | 2017040864 A1 | 3/2017 |
| WO | 2017048824 A1 | 3/2017 |
| WO | 2017054646 A1 | 4/2017 |
| WO | 2017112621 A1 | 6/2017 |
| WO | 2017198741 A1 | 11/2017 |
| WO | 2018091729 A2 | 5/2018 |
| WO | 2018158332 A1 | 9/2018 |
| WO | 2018160722 A1 | 9/2018 |
| WO | 2018187057 A1 | 10/2018 |
| WO | 2018204343 A1 | 11/2018 |
| WO | 2018204368 A1 | 11/2018 |
| WO | 2018204374 A1 | 11/2018 |
| WO | 2018204405 A1 | 11/2018 |

OTHER PUBLICATIONS

Banks et al. The Effect of Sucrose Hydrolysis on the Stability of Protein Therapeutics during Accelerated Formulation Studies. J Pharm Sci. Dec. 2009; 98(12):4501-10.*
SYNAGIS FDA label (2004).*
SYNAGIS FDA Approval Letter (2004).*
Goswami et al., Developments and Challenges for mAb-Based Therapeutics. Antibodies, Aug. 2013, 2, 452-500.*
M. Siedler, Implementation of a Platform Approach for Early Biologics Development. Am. Pharm. Rev., vol. 14(6), Sep. 1, 2011.*
S. Uchiyama, Liquid formulation for antibody drugs. Biochim Biophys Acta. Nov. 2014;1844(11):2041-2052.*
Baert et al., "Influence of immunogenicity on the long-term efficacy of infliximab in Crohn's disease," New Engl J Med. 348(7):601-8 (Feb. 2003).
Banks et al., "Removal of cysteinylation from an unpaired sulfhydryl in the variable region of a recombinant monoclonal IgG1 antibody improves homogeneity, stability, and biological activity," J Pharm Sci. 97(2):775-90 (Feb. 2008).
Beniaminovitz et al., "Prevention of rejection in cardiac transplantation by blockade of the interleukin-2 receptor with a monoclonal antibody," New Engl J Med. 342(9):613-9 (Mar. 2000).
Bhambhani et al., "Formulation design and high-throughput excipient selection based on structural integrity and conformational stability of dilute and highly concentrated IgG1 monoclonal antibody solutions," J Pharm Sci. 101(3):1120-35 (Mar. 2012).
Bowman et al. "Rationale and safety of anti-interleukin-23 and anti-interleukin-17A therapy," Curr Opin Infect Dis. 19(3):245-52 (Jun. 2006).
Brady et al., "Characterization of nonenzymatic glycation on a monoclonal antibody," Anal Chem. 79(24):9403-13 (Dec. 2007).
Choo et al., "SPdb—a signal peptide database," BMC Bioinformatics 6:249 (Oct. 2005).
Chothia & Lesk, "Canonical structures for the hypervariable regions of immunoglobulins," J Mol Biol. 196(4):901-17 (Aug. 1987).
Cua & Kastelein, "TGF-beta, a 'double agent' in the immune pathology war," Nat Immunol. 7 (6):557-9 (Jun. 2006).
Daugherty & Mrsny, "Formulation and delivery issues for monoclonal antibody therapeutics," Adv Drug Deliv Rev. 58(5-6):686-706 (Aug. 2006).
Davagnino et al., "Acid hydrolysis of monoclonal antibodies," J Immunol Methods 185(2):177-80 (Sep. 1995).
Elkins et al., "In vivo clearance of an intracellular bacterium, Francisella tularensis LVS, is dependent on the p40 subunit of interleukin-12 (IL-12) but not on IL-12 p70," Infect Immun. 70(4): 1936-48 (Apr. 2002).
Frucht, "IL-23: a cytokine that acts on memory T cells," Sci STKE 2002(114):pe1 (Jan. 2002).
Ghosh et al., "Natalizumab for active Crohn's disease," New Engl J Med. 348(1):24-32 (Jan. 2003).
Harris et al., "Identification of multiple sources of charge heterogeneity in a recombinant antibody," J Chromatogr B Biomed Sci Appl. 752(2):233-45 (Mar. 2001).
Herold et al., "Anti-CD3 monoclonal antibody in new-onset type 1 diabetes mellitus," New Engl J Med. 346(22):1692-8 (May 2002).
Ionescu & Vlasak, "Kinetics of chemical degradation in monoclonal antibodies: relationship between rates at the molecular and peptide levels," Anal Chem. 82(8):3198-206 (Apr. 2010).
Lam et al., "Antioxidants for prevention of methionine oxidation in recombinant monoclonal antibody HER2," J Pharm Sci. 86(11):1250-5 (Nov. 1997).
Langowski et al., "IL-23 promotes tumour incidence and growth," Nature 442(7101):461-5 (Jul. 2006).
Langrish et al., "IL-12 and IL-23: master regulators of innate and adaptive immunity," Immunol Rev. 202:96-105 (Dec. 2004).
Langrish et al., "IL-23 drives a pathogenic T cell population that induces autoimmune inflammation," J Exp Med. 201(2):233-40 (Jan. 2005).
Lipsky et al., "Infliximab and Methotrexate in the Treatment of Rheumatoid Arthritis," New Engl J Med. 343(22):1594-602 (Nov. 2000).

(56) References Cited

OTHER PUBLICATIONS

Liu & Blumhardt, "Randomised, double blind, placebo controlled study of interferon beta-1a in relapsing-remitting multiple sclerosis analysed by area under disability/time curves," J Neurol Neurosurg Psychiatry 67(4):451-6 (Oct. 1999).

Liu et al., "Structure and stability changes of human IgG1 Fc as a consequence of methionine oxidation," Biochemistry 47(18):5088-100 (May 2008).

Liu et al., "Human IgG2 antibody disulfide rearrangement in vivo," J Biol Chem. 283(43):29266-72 (Oct. 2008).

Liu et al., "Heterogeneity of monoclonal antibodies," J Pharm Sci. 97(7):2426-47 (Jul. 2008).

Milgrom et al., "Treatment of Allergic Asthma with Monoclonal Anti-IgE Antibody," New Engl J Med. 341(26):1966-73 (Dec. 1999).

Oppmann et al., "Novel p19 protein engages IL-12p40 to form a cytokine, IL-23, with biological activities similar as well as distinct from IL-12," Immunity 13(5):715-25 (Nov. 2000).

Parham et al., "A receptor for the heterodimeric cytokine IL-23 is composed of IL-12Rbeta1 and a novel cytokine receptor subunit, IL-23R," J Immunol. 168(11):5699-708 (Jun. 2002).

Perchiacca et al., "Aggregation-resistant domain antibodies engineered with charged mutations near the edges of the complementarity-determining regions," Protein Eng Des Sel. 25(10):591-601 (Oct. 2012).

Portielji et al., "IL-12: a promising adjuvant for cancer vaccination," Cancer Immunol Immunother. 52(3):133-44 (Mar. 2003).

Presta, "Selection, design, and engineering of therapeutic antibodies," J Allergy Clin Immunol. 116(4):731-6 (Oct. 2005).

Reissner & Aswad, "Deamidation and isoaspartate formation in proteins: unwanted alterations or surreptitious signals?," Cell Mol Life Sci. 60(7):1281-95 (Jul. 2003).

Rustandi et al., "Applications of CE SDS gel in development of biopharmaceutical antibody-based products," Electrophoresis 29(17):3612-20 (Sep. 2008).

Slamon et al., "Use of chemotherapy plus a monoclonal antibody against HER2 for metastatic breast cancer that overexpresses HER2," New Engl J Med. 344(11):783-92 (Mar. 2001).

Vermeer & Norde, "The thermal stability of immunoglobulin: unfolding and aggregation of a multi-domain protein," Biophys J. 78(1):394-404 (Jan. 2000).

Vlasak et al., "Identification and characterization of asparagine deamidation in the light chain CDR1 of a humanized IgG1 antibody," Anal Biochem. 392(2):145-54 (Sep. 2009).

Vlasak & Ionescu, "Fragmentation of monoclonal antibodies," MAbs 3(3):253-63 (May 2011).

Wang et al., "Antibody structure, instability, and formulation," J Pharm Sci. 96(1):1-26 (Jan. 2007).

Wei et al., "Identification of a single tryptophan residue as critical for binding activity in a humanized monoclonal antibody against respiratory syncytial virus," Anal Chem. 79(7):2797-805 (Apr. 2007).

Wiekowski et al., "Ubiquitous transgenic expression of the IL-23 subunit p19 induces multiorgan inflammation, runting, infertility, and premature death," J Immunol. 166(12):7563-70 (Jun. 2001).

Yang et al., "A randomized trial of bevacizumab, an anti-vascular endothelial growth factor antibody, for metastatic renal cancer," New Engl J Med. 349(5):427-34 (Jul. 2003).

Yu et al., "Investigation of N-terminal glutamate cyclization of recombinant monoclonal antibody in formulation development," J Pharm Biomed Anal. 42(4):455-63 (Oct. 2006).

International Search Report of the International Searching Authority for International Application No. PCT/US2013/073825, mailed Feb. 7, 2014 (3 pages).

Written Opinion of the International Searching Authority for International Application No. PCT/US2013/073825, mailed Feb. 7, 2014 (3 pages).

Warne, "Development of high concentration protein biopharmaceuticals: The use of platform approaches in formulation development," European J. Pharmaceutics & Biopharmaceutics 78:208-212 (2011).

Wang, "Instability, stabilization, and formulation of liquid protein pharmaceuticals," International J. of Pharmaceutics 185:129-188 (1999).

FDA label of Benlysta®, Mar. 2012, pp. 1-22.
FDA label of Blincyto®, Dec. 2014, pp. 1-24.
FDA label of Adcetris®, Nov. 2014, pp. 1-19.
FDA label of Ilaris, Mar. 2012, pp. 1-13.
FDA label of Raptiva®, Mar. 2009, pp. 1-36.
FDA label of Remicade®, Feb. 2011, pp. 1-47.
FDA label of Nucala®, Nov. 2015, pp. 1-28.
FDA label of Xolair®, 2007, pp. 1-20.
FDA label of Entyvio, May 2014, pp. 1-21.

European Medicines Agency, European Public Assessment Report (EPAR) Avastin, Scientific Discussion. Jan. 24, 2006, pp. 1-61.

Shire, et al., "Challenges in the Development of High Protein Concentration Formulations," Journal of Pharmaceutical Sciences, 93:1390-1402 (2004).

Daugherty and Mrsny, "Formulation and Delivery Issues for Monoclonal Antibody Therapeutics," Current Trends in Monoclonal Antibody Development and Manufacturing, 11:103-29 (2010).

FDA label of TALTZ® Mar. 2016, pp. 1-25.
FDA label of YERVOY®, Oct. 2015, pp. 1-32.
FDA label of SILIQ®, Feb. 2017, pp. 1-22.
FDA label of OCREVUS, Mar. 2017, pp. 1-18.
FDA label of CINQAIR®, Mar. 2016, pp. 1-16.
FDA label of ZINBRYTA, May 2016, pp. 1-32.
FDA label of ZINPLAVA, Oct. 2016, pp. 1-11.
FDA label of SYLVANT, 2014, pp. 1-16.
FDA label of ERBITUX, Jan. 2012, pp. 1-31.
FDA label of FASENRA, Nov. 2017, pp. 1-8.
FDA label of KEVZARA, May 2017, pp. 1-45.
FDA label of EMPLICITI, Nov. 2015, pp. 1-22.

Schermeyer et al., "Characterization of highly concentrated antibody solution—A toolbox for the description of protein long-term solution stability," MAbs 9(7): 1169-85 (2017).

Webster, 2017, "Predicting Long-Term Storage Stability of Therapeutic Proteins," Pharmaceutical Technology 37(11):1-7.

FDA label for REOPRO (Abciximab), dated Nov. 4, 1997, p. 1-17.
FDA label for PROSTASCINT (Capromab Pendetide), Jun. 2012, p. 1-16.
FDA label for RITUXAN (Rituximab), Feb. 2010, p. 1-35.
FDA label for SIMULECT (Basiliximab), May 1998, p. 1-7.
FDA label for MYLOTARG (Gemtuzumab Ozogamicin), Aug. 2005, p. 1-21.
FDA label for CAMPATH or LEMTRADA (Alemtuzumab), Sep. 2014, p. 1-18.
FDA label for ZEVALIN (Ibritumomab Tiuxetan), Sep. 2009, p. 1-11.
FDA label for HUMIRA (Adalimumab), Jan. 2008, p. 1-34.
FDA label for AVASTIN (Bevacizumab), Sep. 2011, p. 1-25.
FDA label for TYSABRI (Natalizumab), Jan. 2012, p. 1-32.
FDA label for VECTIBIX (Panitumumab), Jun. 2017, p. 1-31.
FDA label for SOLIRIS (Eculizumab), Sep. 2011, p. 1-24.
FDA label for CIMZIA (Certolizumab pegol), Jan. 2017, p. 1-40.
FDA label for ARZERRA (Ofatumumab), Oct. 2009, p. 1-13.
FDA label for PROLIA (Denosumab), Sep. 2011, p. 1-20.
FDA label for RAXIBACUMAB, Dec. 2012, p. 1-14.
FDA label for KADCYLA (Ado-Trastuzumab Emtansine), Aug. 29, 2013.
FDA label for OPDIVO (Nivolumab), Dec. 2017, p. 1-73.
FDA label for REPATHA (Evolocumab), Aug. 2015, p. 1-34.
FDA label for PRAXBIND (Idarucizumab), Oct. 2015, p. 1-10.
FDA label for DRAZALEX (Daratumumab), Nov. 2016, p. 1-26.
FDA label for PROTRAZZA (Necitumumab), Nov. 2015, p. 1-12.
FDA label for AMJEVITA (Adalimumab-Atto), Sep. 2016, p. 1-61.
FDA label for BAVENCIO (Avelumab), Mar. 2017, p. 1-20.

Bangert & Kopp, "Tildrakizumab for the treatment of psoriasis," Immunotherapy (2018).

Wang, "Instability, stabilization and formulation of liquid protein pharmaceuticals", International Journal of Pharmaceutics, 185:129-188 (1999).

Ahamed, Tangir, Phase Behavior of an Intact Monoclonal Antibody, Biochemical Journal, 2007, 610-619, 93.

(56) References Cited

OTHER PUBLICATIONS

Altschul, Stephen F., A Protein Alignment Scoring System Sensitive at All Evolutionary Distances, J Mol Evol, 1993, 290-300, 36.
Armstrong, NA, Sucrose, Handbook of Pharmaceutical Excipients, 2009, 703-707, 6th Edition.
Basu et al., Protein crystals for the delivery of biopharmaceuticals, Expert Opinion on Biological Therapy, 2004, pp. 301-317, vol. 4(3).
BENLYSTA prescribing information, Mar. 2011.
Borwankar, A.U. et al., Viscosity Reduction of a Concentrated Monoclonal Antibody with Arginine•HCI and Arginine•Glutamate, Ind. Eng. Chem. Res., 2016, 11225-11234, 55(43).
Carpenter, John F. et al., Rational Design of Stable Lyophilized Protein Formulations: Some Practical Advice, Pharmaceutical Research, 1997, 969-975, 14(8).
Carpenter, John F., Application of infrared spectroscopy to development of stable lyophilized protein formations, European Journal of Pharmaceutics and Biopharmaceutics, 1998, 231-238, 45.
Chang, B.S. and Hershenson, S., Practical approaches to protein formulation development in "Rationale Design of stable protein formulations-theory and practice", Kluwer Academic/Plenum Publishers, 2002, 1-25.
Chauhan, Veeren M., Advancements in the co-formulation of biologic therapeutics, Journal of Controlled Release, 2020, pp. 397-405, vol. 327.
Chauvin et al., TIGIT and PD-1 impair tumor antigen-specific CD8 T cells in melanoma patients, Journal of Clinical Investigation, 2015, pp. 2046-2058, vol. 125(5).
Chen, et al., Influence of histidine on the stability and physical properties of a fully human antibody in aqueous and solid forms, 2003, 1952-1960, 20(12), Pharm Res.
Cordoba et al., Non-enzymatic hinge region fragmentation of antibodies in solution, 2005, 115-121, 818(2), J Chromatogr B Analyt Technol Biomed Life Sci.
Costantino, Henry R., The Secondary Structure and Aggregation of Lyophilized Tetanus Toxoid, Journal of Pharmaceutical Sciences, 1996, 1290-1293, vol. 85, No. 12.
Cudney, R., Protein Crystallization and Dumb Luck, The Rigaku Journal, 1999, 1-7, vol. 16, No. 1.
Daugherty and Mrsny, Local tissue distribution and cellular fate of vascular endothelial growth factor (VEGF) following intramuscular injection, 2010, 27-35, 18(1), J Drug Target.
Davies et al., Structural Determinants of Unique Properties of Human IgG4-Fc, Journal of Molecular Biology, 2014, pp. 630-644, vol. 426(3).
Dayhoff, M.O., A Model of Evolutionary Change in Proteins, Atlas of Protein Sequence and Structure, 1978, 345-352, 22.
Dear et al., Contrasting the Influence of Cationic Amino Acids on the Viscosity and Stabililty of a Highly Concentrated Monoclonal Antibody, Pharm. Res., 2017, 193-207, vol. 34.
Dembo, Amir, Limit Distribution of Maximal Non-Aligned Two-Sequence Segmental Score, The Annals of Probability, 1994, 2022-2039, vol. 22, No. 4.
European Search Report, application No. 12763896.03, mailed Nov. 5, 2014, 6 pages.
Everts et al., Selective Intracellular Delivery ofDexamethasone into Activated Endothelial Cells Using an E-Selectin-Directed Immunoconjugate, J. Immunol., 2002, pp. 883-889, 168.
Fukuda, Masakazu et al., Thermodynamic and Fluorescence Analyses to Determine Mechanisms of IgG1 Stabilization and Destabilization by Arginine, Pharm. Res., 2014, 992-1001, 31.
Garber, Ellen et al., A broad range of Fab stabilities within a host of therapeutic IgGs, Biochemical and Biophysical Research Communications, 2007, 751-757, 355.
Giege, et al., Crystallogenesis of Biological Macromolecules: Facts and Perspectives, Acta Cryst., 1994, pp. 339-350, D50.
Gikanga, Benson et al., Manufacturing of High-Concentration Monoclonal Antibody Formulations via Spray Drying—the Road to Manufacturing Scale, PDS J Pharm Sci and Tech, 2015, 59-73, 69.
Gizzi, Patrick et al., Molecular Tailored Histidine-Based Complexing Surfactants: From Micelles to Hydrogels, Eur. J. Org. Chem., 2009, 3953-3963, N/A.
Guo, Zheng et al., Structure-Activity Relationship for Hydrophobic Salts as Viscosity-Lowering Excipients for Concentrated Solutions of Monoclonal Antibodies, Pharm Res, 2012, 3102-3109, 29.
Harris et al., Comparison of the conformations of two intact monoclonal antibodies with hinges, Immunological Reviews, 1998, pp. 35-43, vol. 163.
Harris et al., Crystallization of Intact Monoclonal Antibodies, Proteins: Structure, Function, and Genetics, 1995, pp. 285-289, vol. 23, No. 2.
He et al., Humanization and Pharmacokinetics of a Monoclonal Antibody with Specificity for both E- and P-Selectin, J. Immunol., 1998, pp. 1029-1035, 160.
Holliger et al., Engineered antibody fragments and the rise of single domains, Nat. Biotechnol., 2005, pp. 1126-1136, 23.
International Search Report, International Application PCT/US12/31063, date of mailing Jun. 22, 2012.
Izutsu, Ken-Ichi et al., Excipient crystallinity and its protein-structure—stabilizing effect during freeze-drying, Journal of Pharmacy and Pharmacology, 2002, 1033-1039, 54.
Jameel, Feroz (Editor), Introduction to the Textbook, Formulation and Process Development Strategies for Manufacturing Biopharmaceuticals, 2010, 1-986, N/A.
Jezek, Jan et al., Viscosity of concentrated therapeutic protein compositions, Advanced Drug Delivery Reviews, 2011, 1107-1117, 63.
Jones, Andrew J.S., Analysis of Polypeptides and proteins, Advanced Drug Delivery Reviews, 1993, 29-90, 10.
Jorgensen, Lene et al., Recent trends in stabilising peptides and proteins in pharmaceutical formulation—considerations in the choice of excipients, Expert Opinion on Drug Delivery, 2009, 1219-1230, 6(11).
Kaithamana, Shashi, Induction of Experimental Autoimmune Graves' Disease in BALB/c Mice, The Journal of Immunology, 1999, 5157-5164, 163.
Kang, Jichao et al., Rapid formulation development for monoclonal antibodies, Bio Process International, 2016, 40-45, 14(4).
KEYTRUDA (Merck & Co., Inc., Whitehouse Station, NJ USA; initial U.S. approval 2014, updated Sep. 2017) 49 pages.
Kheddo, Priscilla et al., The effect of arginine glutamate on the stability of monoclonal antibodies in solution, Int. J. Pharmaceutics, 2014, 126-133, 473.
Kohler et al., Continuous Cultures of Fused Cells Secreting Antibody of Predefined Specificity, Nature, 1975, pp. 495-497, vol. 256.
Krishnan, Development of Formulations for Therapeutic Monoclonal Antibodies and Fc Fusion Proteins, Chugai Exhibit 2014, 2010, pp. 1-48.
Kundrot, C.E., Which strategy for a protein crystallization project?, Cellular Molecular Life Science, 2004, 525-536, 61.
Le Doussal et al., Enhanced in vivo targeting of an asymmetric bivalent hapten to double-antigen-positive mouse B cells with monoclonal antibody conjugate cocktails, J. Immunol., 1991, pp. 169-175, 146.
Liu, Jun et al., Reversible Self-Association Increases the Viscosity of a Concentrated Monoclonal Antibody in Aqueous Solution, Journal of Pharmaceutical Sciences, 2005, 1928-1940, 94(9).
Mach, Henryk et al., Addressing new analytical challenges in protein formulation development, European Journal pf Pharmaceutics and Biopharmaceutics, 2011, 196-207, 78.
Madden, Thomas L., Applications of Network BLAST Server, Methods in Enzymology, 1996, 131-141, 266.
Manzini, B. et al., Polymer-supported syntheses of oxo-crown ethers and derivatives containing a-amino-acid residues, Reactive & Functional Polymers, 2008, 1297-1306, 68(9).
Mccoy et al., Phaser crystallographic software, Journal of Applied Crystallography, 2007, pp. 658-674, vol. 40.
Mcdermott, et al., PD-1 as a potential target in cancer therapy, Cancer Medicine, 2013, pp. 662-673, WO.
Menne, Kerstin M.L., A comparison of signal sequence prediction methods using a test set of signal peptides, Bioinformatics Applications Note, 2000, 741-742, 16.

(56) References Cited

OTHER PUBLICATIONS

Morissette, Sherry L. et al., High-throughput crystallization: polymorphs, salts, co-crystals and solvates of pharmaceutical solids, Advanced Drug Delivery Reviews, 2004, 275- 300, 56.

Murakami, Monica S., Cell Cycle Regulation, Oncogenes, and Antineoplastic Drugs, The Molecular Basis of Cancer, 1995, 3-17, Chapter 1.

Ollmann Saphire et al., Crystal Structure of a Neutralizing Human IgG Against HIV-1: A Template for Vaccine Design, Science, 2001, pp. 1155-1159, vol. 293.

Ollmann Saphire et al., Crystallization and preliminary structure determination of an intact human immunoglobulin, b12: an antibody that broadly neutralizes primary isolates of HIV-1, Acta Crystallographica Section D: Biological Crystallography, 2001, pp. 168-171, D57.

Pearlman, Rodney, Analysis of Protein Drugs, Peptide and Protein Drug Delivery, 1991, 247-301, Chapter 6.

Pertsev, I.M. et al., Pharmaceutical and Biomedical Aspects of Drugs, Kharkov Publishing House UkrFA, 1999, 253-254, Chapter 11.

Poole, Raewyn M., Pembrolizumab: First Global Approval, Drugs, 2014, 1973-1981, 74(16).

Presta, Leonard G., Engineering of therapeutic antibodies to minimize immunogenicity and optimize function, Advanced Drug Delivery Reviews, 2006, 640-656, 58.

Prestrelski, Steven J., Optimization of Lyophilization Conditions for Recombinant Human Interleukin-2 by Dried State Conformational Analysis Using Fourier-Transform Infrared Spectroscopy, Pharmaceutical Research, 1995, 1250-1259, vol. 12, No. 9.

PROLIA prescribing information, Jun. 2010.

Qing, G. et al., Chiral Effect at Protein/Graphene Interface: A Bioinspired Perspective To Understand Amyloid Formation, Journal of the American Chemical Society, 2014, 10736-10742, 136(30).

Reich, Gabriele. Chapter 10: "Pharmaceutical Formulation and Clinical Application". D19 is a chapter from the textbook "Handbook of Therapeutic Antibodies, vol. 1", published by Wiley & Sons in 2007.

Reichert, et al., Monoclonal antibody successes in the clinic, Nature Biotechnology, 2005, pp. 1073-1078, vol. 23.

Remmele, Richard L., Interleukin-1 Receptor (IL-1R) Liquid Formulation Development Using Differential Scanning Calorimetry, Pharmaceutical Research, 1998, 200-208, vol. 15, No. 2.

Reply of the patent proprietor to the notice(s) of opposition to EP2691112; Author: Merck Sharp & Dohm E Corp; Date of publication: Jul. 22, 2019, 11 pages.

Sane, Samir U. et al., Raman Spectroscopic Characterization of Drying-Induced Structural Changes in a Therapeutic Antibody: Correlating Structural Changes with Long-Term Stability, Journal of Pharmaceutical Sciences, 2004, 1005-1018, 93(4).

Scapin et al., Structure of full-length human anti-PD1 therapeutic IgG4 antibody pembrolizumab, Nature Structural & Molecular Biology, 2015, pp. 953-958, vol. 22, No. 12.

Seifert, Tina et al., Chroman-4-one- and Chromone-Based Sirtuin 2 Inhibitors with Antiproliferative Properties in Cancer Cells, Journal of Medicinal Chemistry, 2014, 9870-9888, 57.

Shahrokh, Zahra, Approaches to Analysis of Aggregates and Demonstrating Mass Balance in Pharmaceutical Protein (Basic Fibroblast Growth Factor) Formulations, Journal of Pharmaceutical Sciences, 1994, 1645-1650, vol. 83, No. 12.

Sharma et al., Preparation, purification and crystallization of antibody Fabs and single-chain Fv domains, Immunology Methods Manual: The Comprehensive Sourcebook of Techniques, 1997, pp. 15-37, vol. 1.

Shire, Steven J. et al., Formulation and manufacturing of biologics, Current Opinion in Biotechnology, 2009, 708-714, 20.

Sigma-Aldrich, Co., Products for Life Science Research, 2001, 1-47, N/A.

Sluzky, Victoria, Chomatographic Methods for Quantitative Analysis of Native, Denatured, and Aggregated Basic Fibroblast Growth Factor in Solution Formulations, Pharmaceutical Research, 1994, 485-490, vol. 11, No. 4.

Spiess, Christoph et al., Alternative molecular formats and therapeutic applications for bispecific antibodies, Molecular Immunology, 2015, 95-106, 67.

Study NCT01295827 posted in Feb. 2011 on ClinicalTrials.gov (see p. 6 "First Posted"), 14 pages.

Sule, S.V. et al., Solution pH That Minimizes Self-Association of Three Monoclonal Antibodies Is Strongly Dependent on Ionic Strength, Mol. Pharmaceutics, 2012, 744-751, 9.

Sumit Goswami, Developments and Challenges for mAb-based Therapeutics, Antibodies, 2013, 452-500, 2.

Sworn statement of Chakravarthy Nachu Narasimhan, 2019, 2 pages.

Te Booy, Marcel, Evaluation of the Physical Stability of Freeze-Dried Sucrose-Containing Formulations by Differential Scanning Calorimetry, Pharmaceutical Research, 1992, 109-114, vol. 9, No. 1.

Third Party Observations dated Aug. 25, 2022 for application No. EP20180173280, publication No. EP3398612, 14 pages.

Tomar, Dheeraj S., Molecular basis of high viscosity in concentrated antibody solutions: Strategies for high concentration drug product development, mAbs, 2016, 216-228, vol. 8, No. 2.

Topalian et al., Survival, Durable Tumor Remission, and Long-Term Safety in Patients With Advanced Melanoma Receiving Nivolumab, Clinical Journal of Oncology, 2014, pp. 1020-1030, vol. 32, No. 10.

Trilisky, Egor, Crystallization and Liquid-Liquid Phase Separation of Monoclonal Antibodies and Fc-Fusion Proteins: Screening Results, Biotechnology Progress, 2011, 1054-1067, vol. 27, No. 4.

Tyagi, R. et al., The use of chemical modification and chemical crosslinking to stabilize proteins (enzymes), Biochemistry, 1998, 395-407, 63(3).

TYSABRI prescribing information, Nov. 2004.

Uchiyama, Susumu, Liquid formulation for antibody drugs, Biochimica et Biophysica Acta, 2014, 2041-2052, 1844.

Usami, A., The effect of pH, hydrogen peroxide and temperature on the stability of human monoclonal antibody, Journal of Pharmaceutical and Biomedical Analysis, 1996, 1133-1140, 14.

Von Heijne et al., A new method for predicting signal sequence cleavage sites, Nucleic Acids Res., 1986, pp. 1683-4690, 14.

Vonrhein et al., Data processing and analysis with the autoPROC toolbox, Acta Crystallographica Section D, Biological Crystallography, 2011, pp. 293-302, D67.

Wang, B. et al., Amino acid endcapped poly(p-dioxanone): synthesis and crystallization, J Polym Res, 2013, 1-9, 20(4).

Wang, Shujing et al., Viscosity-Lowering Effect of Amino Acids and Salts on Highly Concentrated Solutions of Two IgG1 Monoclonal Antibodies, Mol. Pharmaceutics, 2015, 4478-4487, 12.

Warne, Nicholas W., Development of high concentration protein biopharmaceuticals: The use of platform approaches in formulation development, Eur J Pharm Biopharm, 2011, 1-2, Abstract 78(2).

Warne, Nicholas W., Formulation Development of Phase 1-2 Biopharmaceuticals: An Efficient and Timely Approach, John Wiley & Sons, Inc., 2010, 147-159, Chapter 6.

Weber, Patricia C., Overview of Protein Crystallization Methods, Methods in Enzymology, 1997, 13-22, 276.

Weber, Wolfgang A., Assessing Tumor Response to Therapy, Journal of Nuclear Medicine, 2009, 1S-10S, 50.

Wolchok et al., Nivolumab plus Ipilimumab in Advanced Melanoma, The New England Journal of Medicine, 2013, pp. 122-133, vol. 369(2).

Yang, M. et al., Crystalline monoclonal antibodies for subcutaneous delivery, Proceedings of the the National Academy of Sciences, Jun. 10, 2003, 6934-6939, 100-12.

Yu, Lian, Amorphous pharmaceutical solids: preparation, characterization and stabilization, Advanced Drug Delivery Reviews, 2001, 27-42, 48.

Zang, Yuguo, Towards Protein Crystallization as a Process Step in Downstream Processing of Therapeutic Antibodies: Screening and Optimization at Microbatch Scale, PloS One, 2011, 1-8, 6(9).

(56) References Cited

OTHER PUBLICATIONS

Zhang, J. et al., Synthesis and characterization of heterotelechelic poly(ethylene glycol)s with amino acid at one end and hydroxyl group at another end, Journal of Applied Polymer Science, 2008, 2432-2439, 110(4).

Zhou, Shuxia et al., Biotherapeutic Formulation Factors Affecting Metal Leachables from Stainless Steel Studied by Design of Experiments, AAPS PharmSciTech, 2012, 284-294, 13(1).

Webster, Predicting Long-Term Storage Stability of Therapeutic Proteins, Pharmaceutical Technology, 2013, 1-7, 37(11).

\* cited by examiner

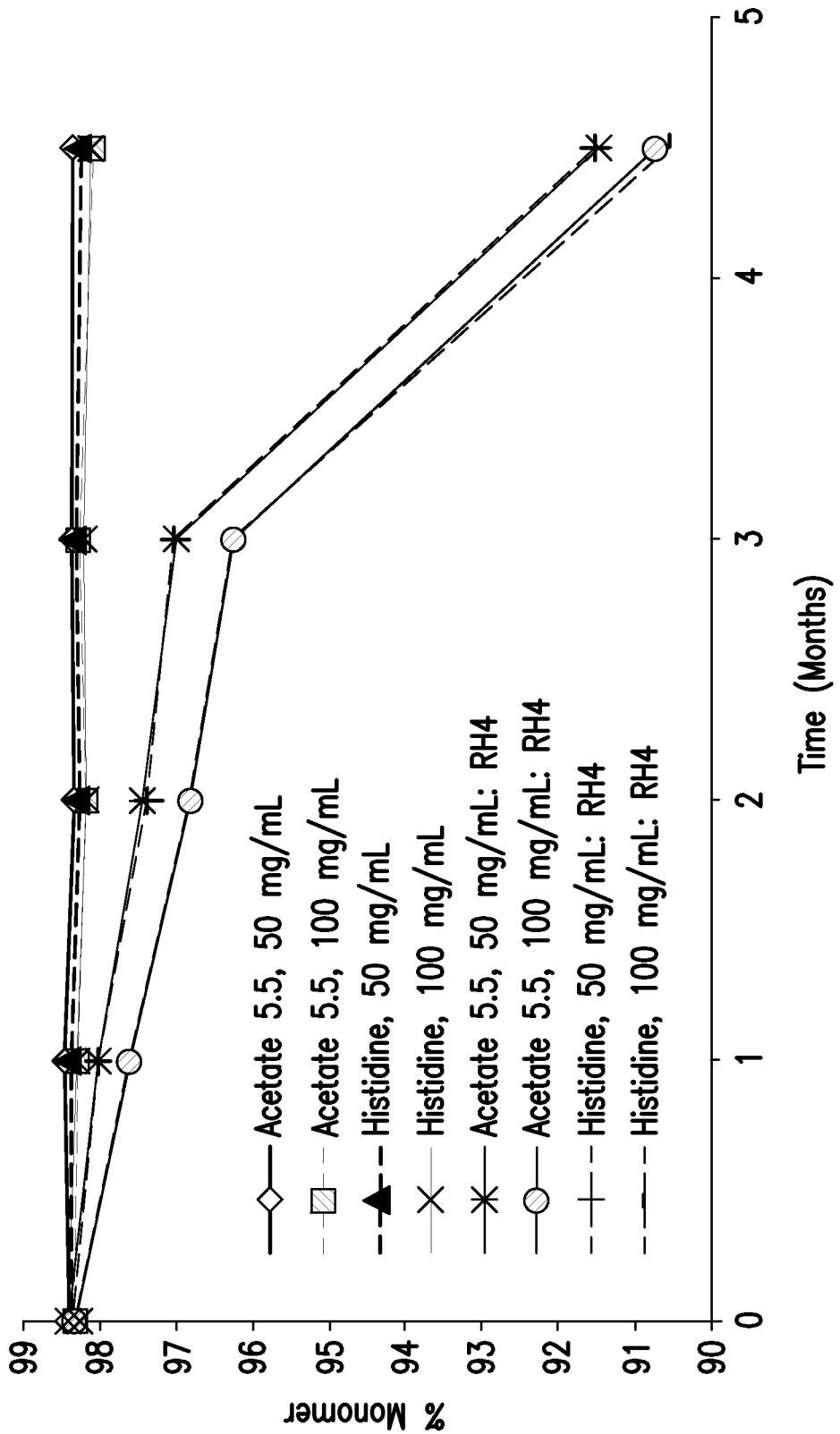

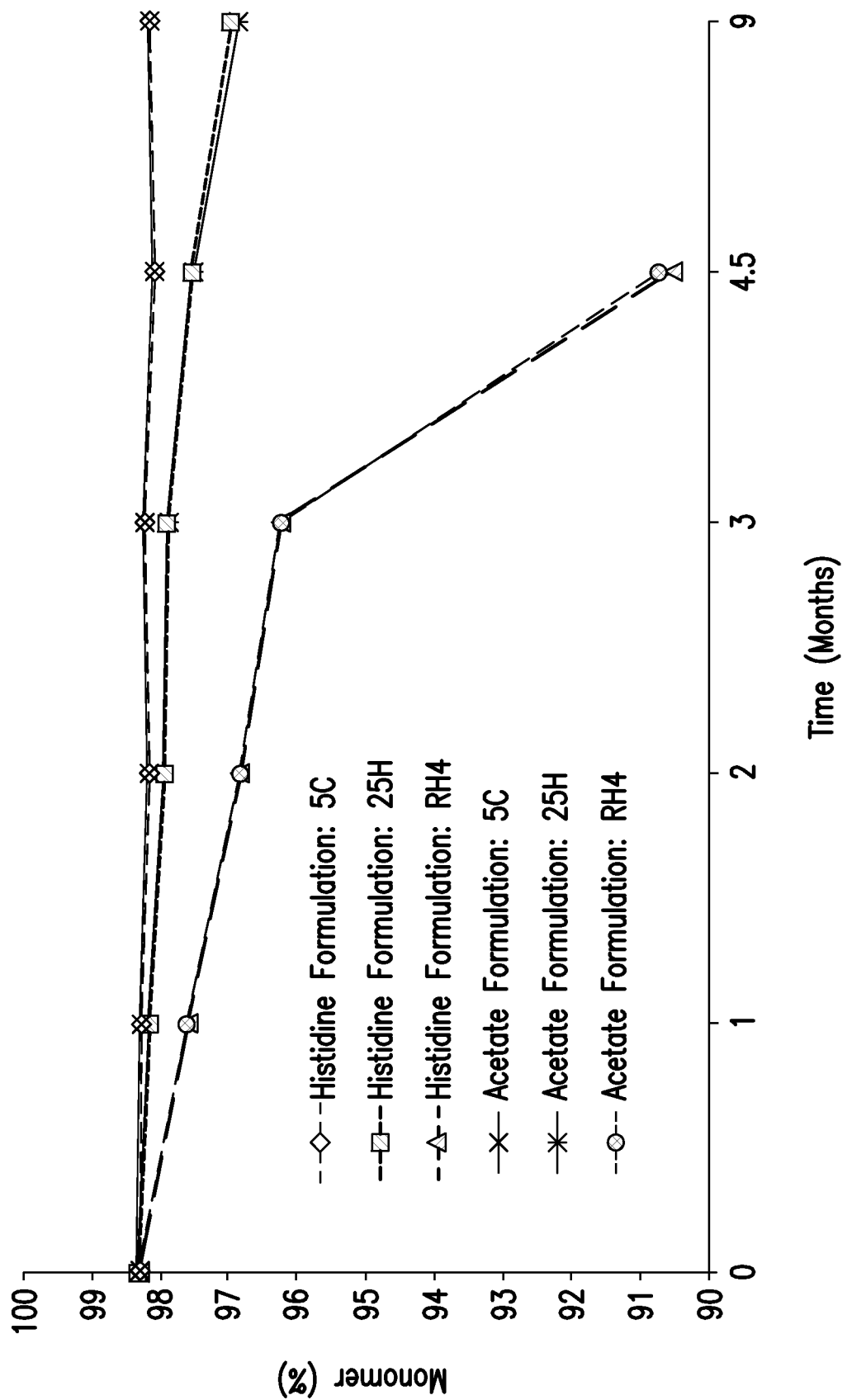

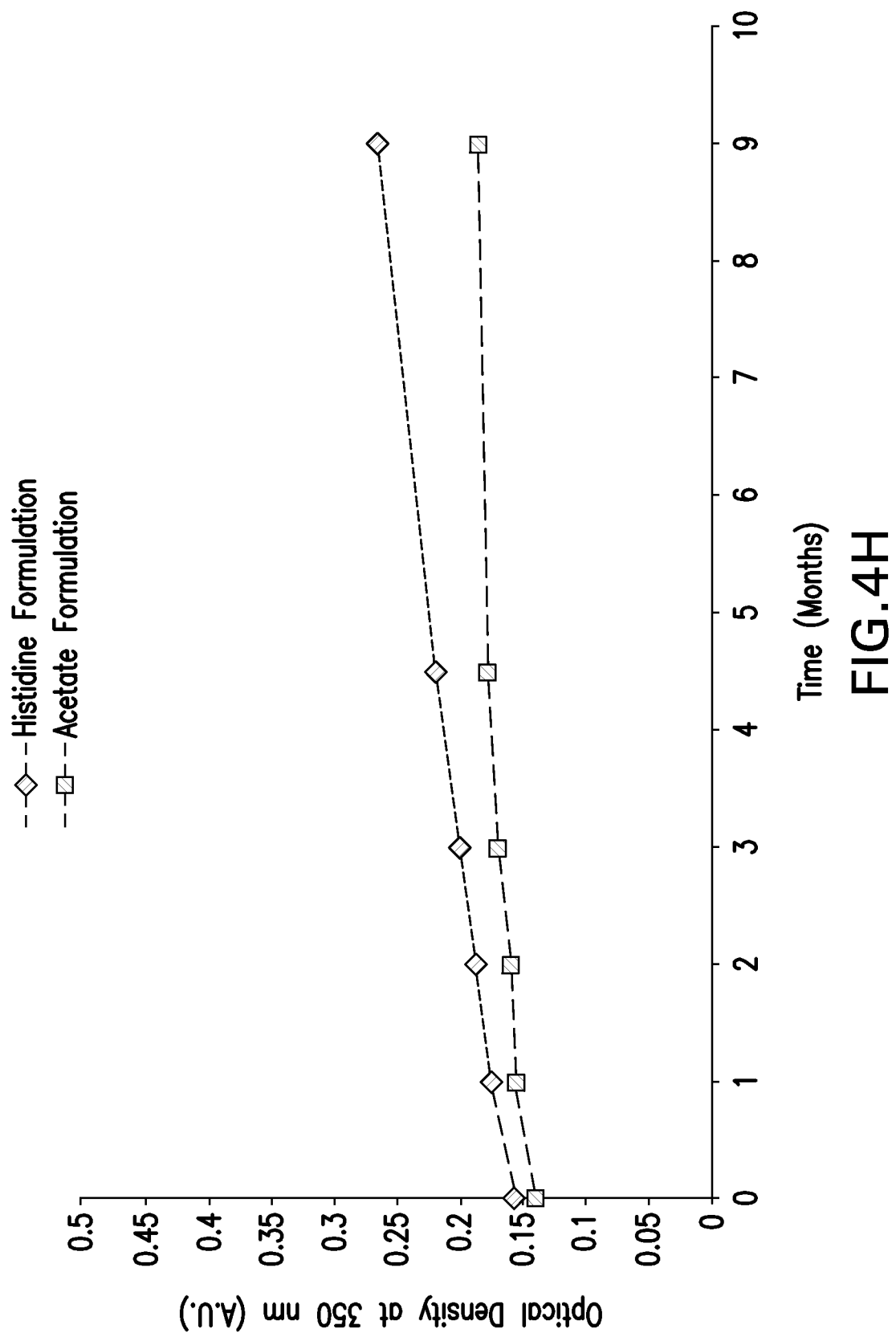

SOLUTION FORMULATIONS OF ENGINEERED ANTI-IL-23p19 ANTIBODIES

This application is a national stage application under 35 U.S.C. § 371 of International Application No. PCT/US2013/073825, filed Dec. 9, 2013, which claims the benefit of U.S. Provisional Patent Application Ser. No. 61/737,035 filed on Dec. 13, 2012, the disclosures of each of which are explicitly incorporated by reference herein.

FIELD OF THE INVENTION

The present invention relates generally to high concentration solution formulations of therapeutic antibodies, and their use in treating various disorders.

BACKGROUND OF THE INVENTION

Interleukin-23 (IL-23) is a heterodimeric cytokine comprised of two subunits, p19 which is unique to IL-23, and p40, which is shared with interleukin-12 (IL-12). The p19 subunit is structurally related to IL-6, granulocyte-colony stimulating factor (G-CSF), and the p35 subunit of IL-12. IL-23 mediates signaling by binding to a heterodimeric receptor comprising two subunits, IL-23R, unique to IL-23 receptor, and IL-12Rβ1, which is shared with the IL-12 receptor. A number of early studies demonstrated that the consequences of a genetic deficiency in p40 (p40 knockout mouse; p40KO mouse) were more severe than those observed with deficiency of p35, e.g. in a p35KO mouse. These results were eventually explained by the discovery of IL-23, and the realization that the p40KO prevents expression of not only IL-12, but also IL-23. See, e.g., Oppmann et al. (2000) *Immunity* 13:715-725; Wiekowski et al. (2001) *J. Immunol.* 166:7563-7570; Parham et al. (2002) *J. Immunol.* 168:5699-708; Frucht (2002) *Sci STKE* 2002, E1-E3; Elkins et al. (2002) *Infection Immunity* 70:1936-1948).

Recent studies, through the use of p40 KO mice, have shown that blockade of both IL-23 and IL-12 is an effective treatment for various inflammatory and autoimmune disorders. However, the blockade of IL-12 through p40 appears to have undesirable systemic consequences, such as increased susceptibility to opportunistic microbial infections or increased risk of tumors. Bowman et al. (2006) *Curr. Opin. Infect. Dis.* 19:245; Langowski et al. (2006) *Nature* 442:461. Accordingly, specific blockade of the p19 subunit of IL-23 is preferred in the treatment of human disease because it interferes with the pathogenic inflammatory activity of IL-23 without interfering with the beneficial activities of IL-12. e.g. in fighting infection and in immunosurveillance.

Therapeutic antibodies may be used to block cytokine activity. A significant limitation in using antibodies as a therapeutic agent in vivo is the immunogenicity of the antibodies. For monoclonal antibodies derived from non-human species, repeated use in humans results in the generation of an immune response against the therapeutic antibody. Such an immune response results in a loss of therapeutic efficacy at a minimum, and potentially a fatal anaphylactic response. Accordingly, antibodies of reduced immunogenicity in humans, such as humanized or fully human antibodies, are preferred for treatment of human subjects. Exemplary therapeutic antibodies to IL-23p19 are disclosed in U.S. Patent Application Publication No. 2007/0009526, and in International Patent Publication Nos. WO 2007/076524, WO 2007/024846, WO 2007/147019, and WO 2009/043933 the disclosures of which are hereby incorporated by reference in their entireties. Additional humanized anti-IL-23p19 antibodies are disclosed in commonly assigned applications published as International Patent Publication Nos. WO 2008/103432 and WO 2008/103473, and in commonly-assigned U.S. Patent Application Publication No. 2007/0048315, the disclosures of which are hereby incorporated by reference in their entireties.

Antibody drugs for use in humans may differ somewhat in the amino acid sequence of their constant domains, or in their framework sequences within the variable domains, but they typically differ most dramatically in the CDR sequences. Even antibodies binding to the same protein, the same polypeptide, or even potentially the same epitope may comprise entirely different CDR sequences. Therapeutic antibodies for use in human beings can also be obtained from human germline antibody sequence or from non-human (e.g. rodent) germline antibody sequences, such as in humanized antibodies, leading to yet further diversity in potential CDR sequences. These sequence differences result in different stabilities in solution and different responsiveness to solution parameters. In addition, small changes in the arrangement of amino acids or changes in one or a few amino acid residues can result in dramatically different antibody stability and susceptibility to sequence-specific degradation pathways. As a consequence, it is not possible at present to predict the solution conditions necessary to optimize antibody stability. Each antibody much be studied individually to determine the optimum solution formulation. Bhambhani et al. (2012) *J. Pharm. Sci.* 101:1120.

Antibodies are also relatively high molecular weight proteins (~150,000 Da), for example as compared with other therapeutic proteins such as hormones and cytokines. As a consequence, it is frequently necessary to dose with relatively high weight amounts of antibody drugs to achieve the desired molar concentrations of drug. In addition, it is often desirable to administer antibody drugs subcutaneously, as this enables self-administration. Self-administration avoids the time and expense associated with visits to a medical facility for administration, e.g., intravenously. Subcutaneous delivery is limited by the volume of solution that can be practically delivered at an injection site in a single injection, which is generally about 1 to 1.5 ml. Subcutaneous self-administration is typically accomplished using a pre-filled syringe or autoinjector filled with a liquid solution formulation of the drug, rather than a lyophilized form, to avoid the need for the patient to re-suspend the drug prior to injection. For delivery of higher doses of drug this volume limitation places a premium on the development of high concentration solution formulations. Such high concentrations of antibodies, however, exhibit macromolecular crowding effects and increased protein-protein interactions, resulting in physical instabilities such as opalescence, self-association, aggregation, unfolding and phase separation. Such high concentration antibody solutions can also exhibit high viscosity (e.g. >10 centipoises), which reduces syringeability in pre-filled syringes and autoinjector devices. Antibody drugs must be stable during storage to ensure efficacy and consistent dosing, so it is critical that whatever formulation is chosen supports desirable properties, such as high concentration, clarity and acceptable viscosity, and that is also maintains these properties and drug efficacy over an acceptably long shelf-life under typical storage conditions.

As a consequence, the need exists for stable, high concentration solution formulations of therapeutic antibodies, such as antibodies that bind to human IL-23p19. Such stable solution formulations will preferably exhibit stability over months to years under conditions typical for storage of drugs for self-administration, i.e. at refrigerator temperature in a syringe, resulting in a long shelf-life for the corresponding drug product. Such stable, high-concentration solution formulations would enable packaging of the antibody drug for high concentration subcutaneous injection by self-administration.

SUMMARY OF THE INVENTION

The present invention provides high concentration solution formulations of humanized anti-IL-23p19 antibody 13B8-b ("hum13B8-b"). Antibody hum13B8-b comprises two identical light chains with the sequence of SEQ ID NO: 2 and two identical heavy chains with the sequence of SEQ ID NO: 1.

In one embodiment, the solution formulation comprises humanized anti-IL-23p19 antibody hum13B8-b, histidine buffer pH 6.0 (±0.3), sucrose and polysorbate 80. In anther embodiment, the solution formulation comprises humanized anti-IL-23p19 antibody 13B8-b, about 10 mM histidine buffer pH 6.0 (±0.3), about 7% sucrose and about 0.05% polysorbate 80. In a further embodiment, the solution formulation comprises humanized anti-IL-23p19 antibody 13B8-b, 10 mM histidine buffer pH 6.0 (±0.3), 7% sucrose and 0.05% polysorbate 80.

In various embodiments, the solution formulations of the present invention comprise at least 50, 80, 90, 100, 110 or 120 mg/ml antibody hum13B8-b. In other embodiments, the solution formulations of the present invention comprise about 80-120 mg/ml antibody hum13B8-b, 80-120 mg/ml antibody hum13B8-b, about 100 mg/ml antibody hum13B8-b, and 100 mg/ml antibody hum13B8-b.

In another aspect the invention relates to methods of treatment employing the high concentration solution formulations of anti-IL-23p19 antibody hum13B8-b of the present invention to treat disorders including, but not limited to, inflammatory disease, autoimmune disease, proliferative disorders, cancer, infectious disease (e.g. bacterial, mycobacterial, viral or fungal infection, including chronic infections), arthritis, psoriasis, psoriatic arthritis, enthesitis, ankylosing spondlyitis, inflammatory bowel disease, including Crohn's disease and ulcerative colitis, multiple sclerosis, uveitis, graft-versus-host disease, systemic lupus erythematosus and diabetes. In yet another aspect the invention relates to high concentration solution formulations of anti-IL-23p19 antibody hum13B8-b for use in treating these same disorders. In yet another aspect the invention relates to use of high concentration solution formulations of anti-IL-23p19 antibody hum13B8-b in manufacture of a medicament for use in treating these same disorders.

BRIEF DESCRIPTION OF THE DRAWINGS

FIG. 1 shows data used to determine optimal buffer and pH conditions for formulations comprising hum13B8-b.

FIGS. 1H and 1I show opalescence ($OD_{350}$) and hydrodynamic size (nm), as measured by dynamic light scattering (DLS), respectively, for low concentration antibody formulations (1 mg/ml) in several buffers at different pHs, whereas

FIG. 4 shows stability of acetate and histidine antibody formulations, comprising 10 mM buffer, 7% sucrose and 0.05% polysorbate 80, when stored under various conditions. Samples were stored as 1.5 ml samples in 2.0 ml glass vials. FIG. 4A shows stability of 50 and 100 mg/ml antibody preparations, as reflected by percentage of monomer antibody measured by HP-SEC, when stored at 5° C. (ambient relative humidity) or under RH4 conditions (40° C., 75% relative humidity). A brief discussion of HP-SEC is provided Example 3.

FIGS. 4B-4D are plots of the percent monomer, HMW species and LMW species, respectively, as determined by HP-SEC, under a variety of storage conditions "25H" refers to storage at 25° C., 60% relative humidity. Note that the ordinates (time axes) of FIGS. 4B-4D are not linear. A brief discussion of HP-SEC is provided Example 3.

FIGS. 4G-4I are plots of opalescence after storage at 5° C., 25° C. (25H) and 40° C. (RH4), respectively.

The stabilities of 10 mM acetate and 10 mM histidine formulations were measured as percent monomer and as percent high molecular weight species, as measured by HP-SEC. Stability was measured for samples stored at 5° C. (±3° C.), 25H (25° C., 60% relative humidity), or RH4 (40° C., 75% relative humidity). Results are presented at FIGS. 4A and 4B. A brief discussion of HP-SEC is provided Example 3.

FIG. 5 presents stability data for antibody formulations of the present invention when stored as drug substance in 30 mL ethylene-vinyl-acetate (EVA) fluid contact layer Celsius® Pak bags. Data are presented for formulations comprising 10 mM Histidine buffer (pH 6.0), 7% sucrose, 0.05% polysorbate 80 and antibody hum13B8-b. FIGS. 5A-5C are plots of protein concentration, biological potency (as measured by cell based functional assay), and biological potency (as measured by ELISA), respectively, for three different preparations of hum13B8-b (Lots A, B and C). Brief discussions of protein concentration determination, cell based functional assays and ELISAs are provided Examples 7, 8 and 9, respectively.

FIGS. 5D-5G are plots of results of HP-IEX experiments that monitor antibody stability by measuring percentages of acidic variants, main peak, post-main peak species and basic variants, respectively. A brief discussion of HP-IEX is provided Example 5.

Figure 5A:
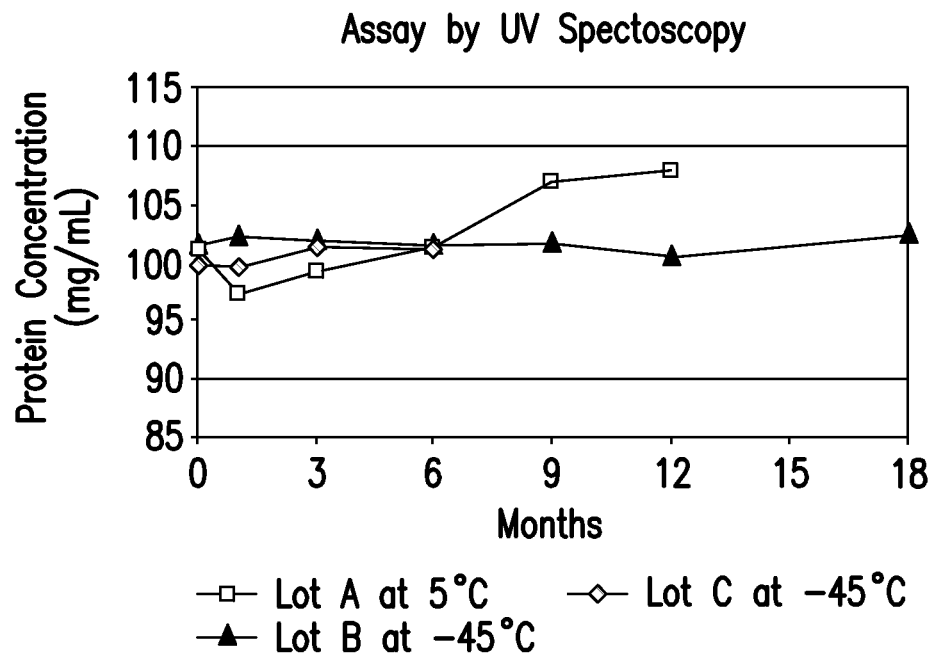
Figure 5B:
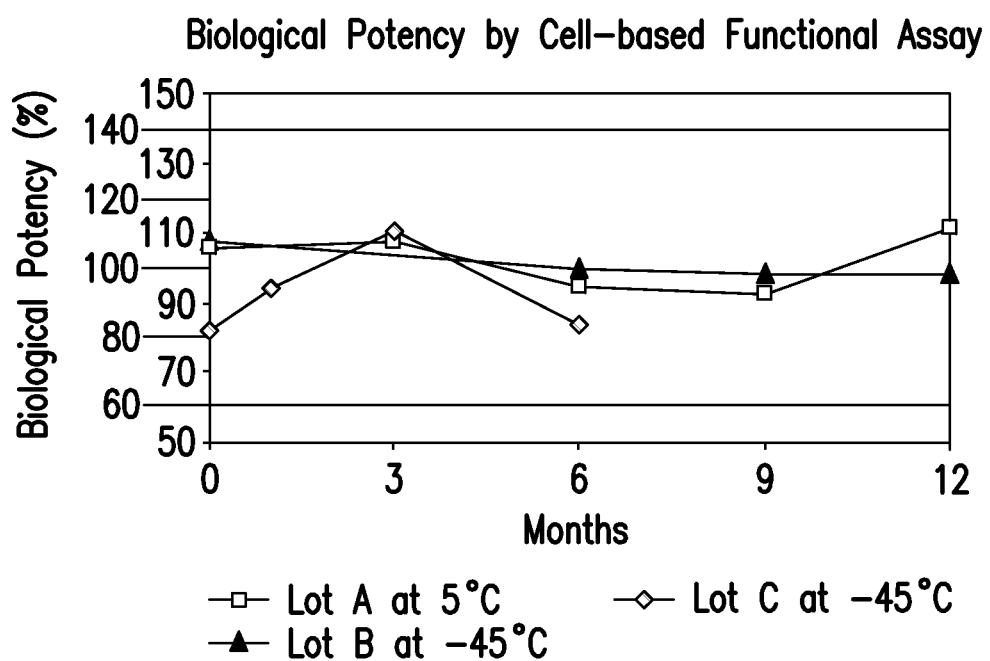
Figure 5C:
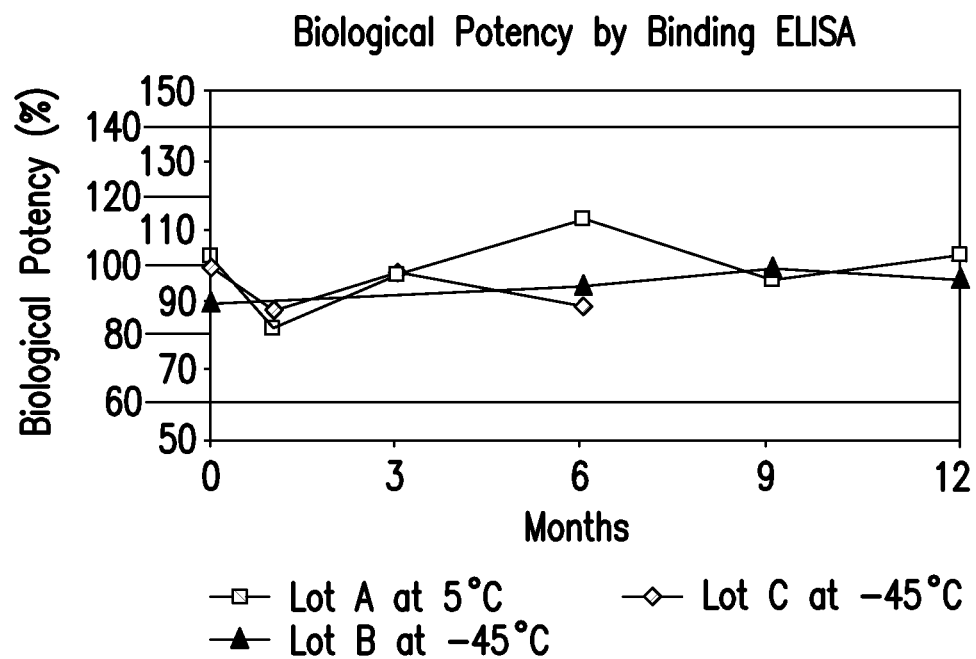
Figure 5D:
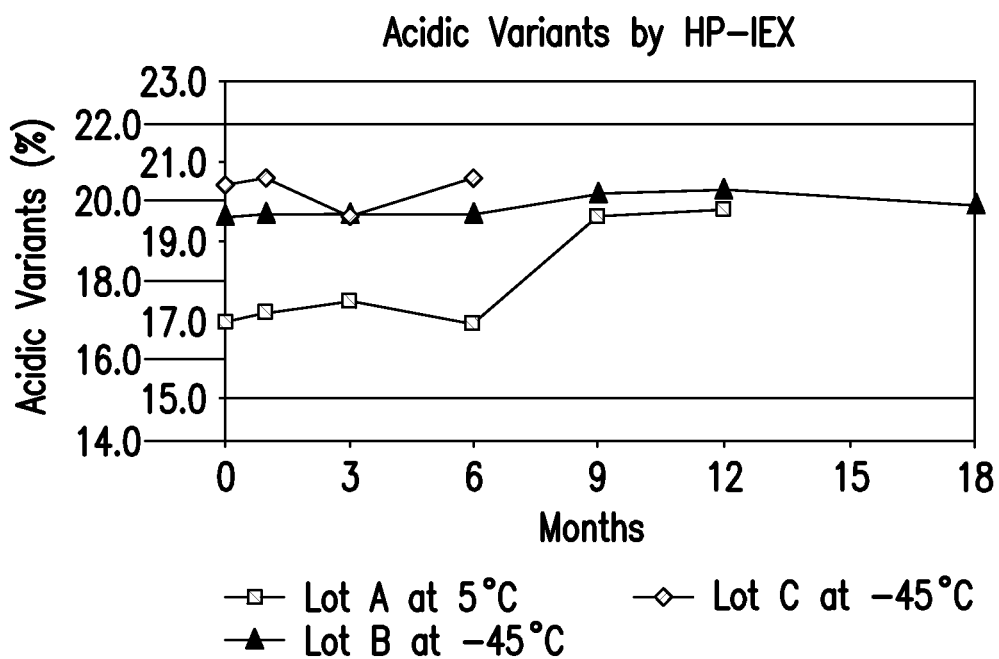
Figure 5E:
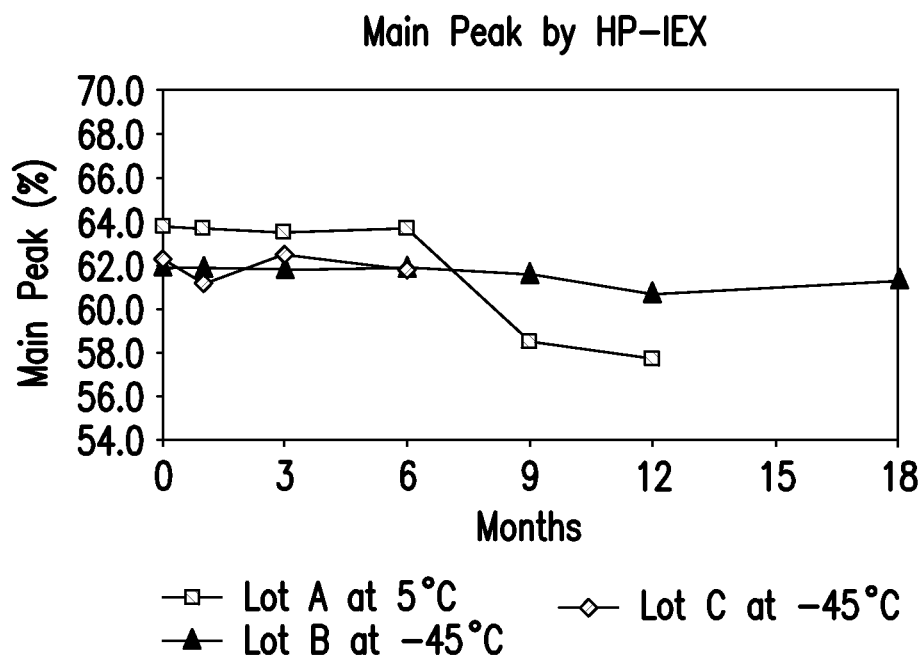
Figure 5F:
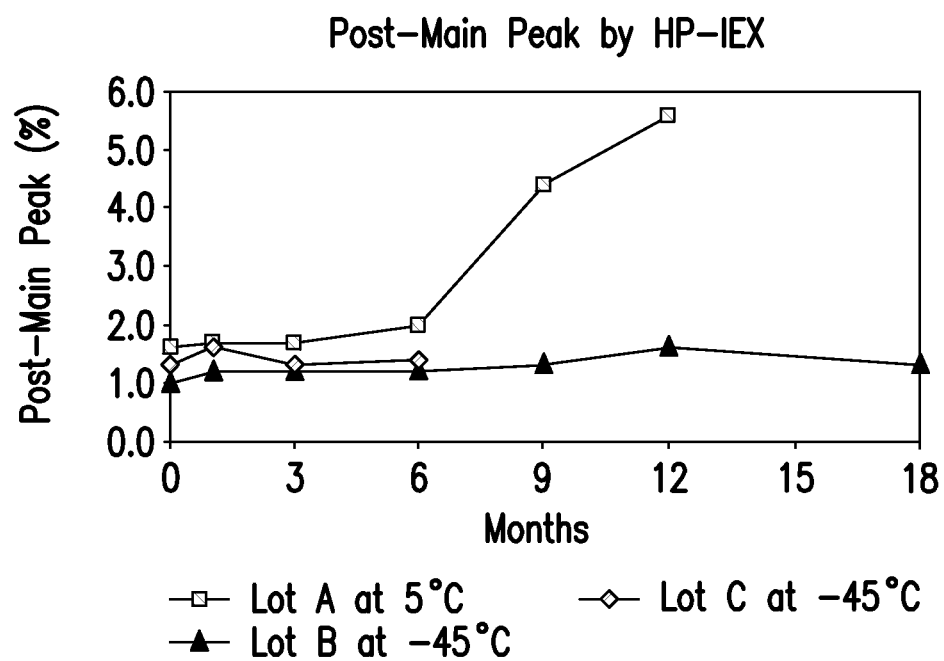
Figure 5G:
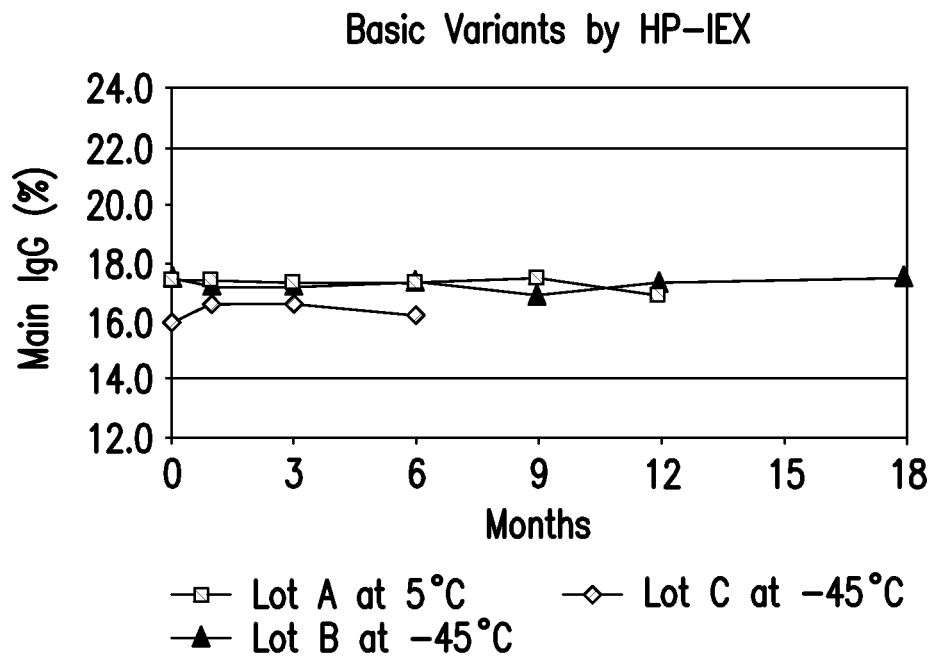
Figure 5H:
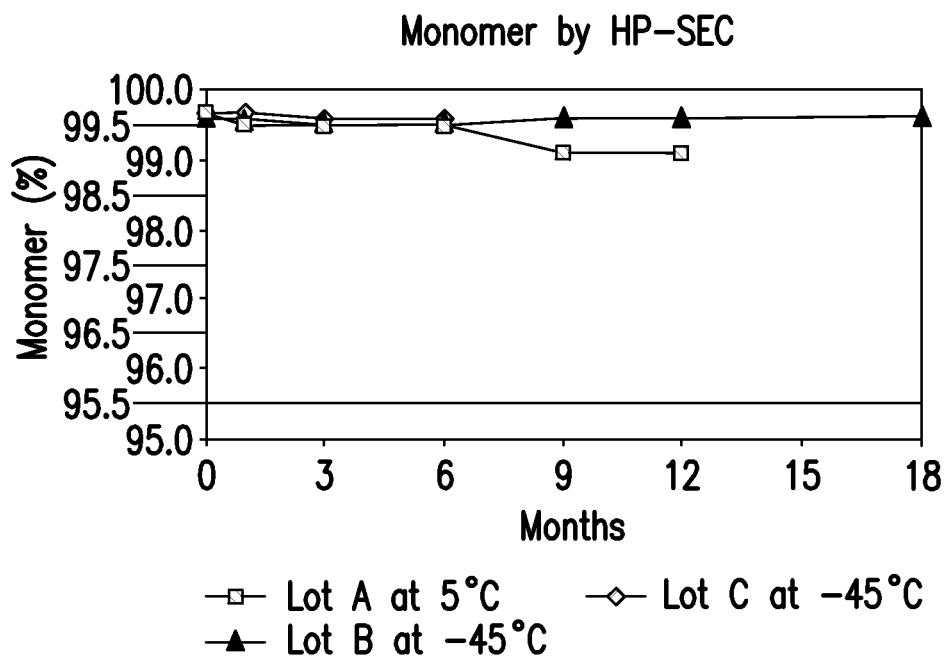

FIG. 5H shows the percent monomer, as measured by HP-SEC. A brief discussion of HP-SEC is provided Example 3.

Figure 5I:
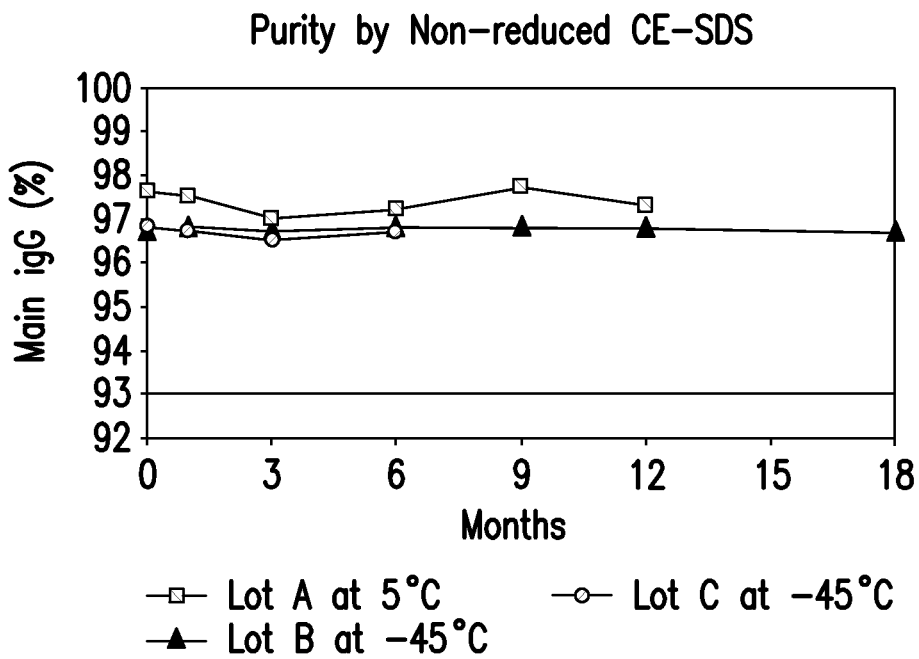
Figure 5J:
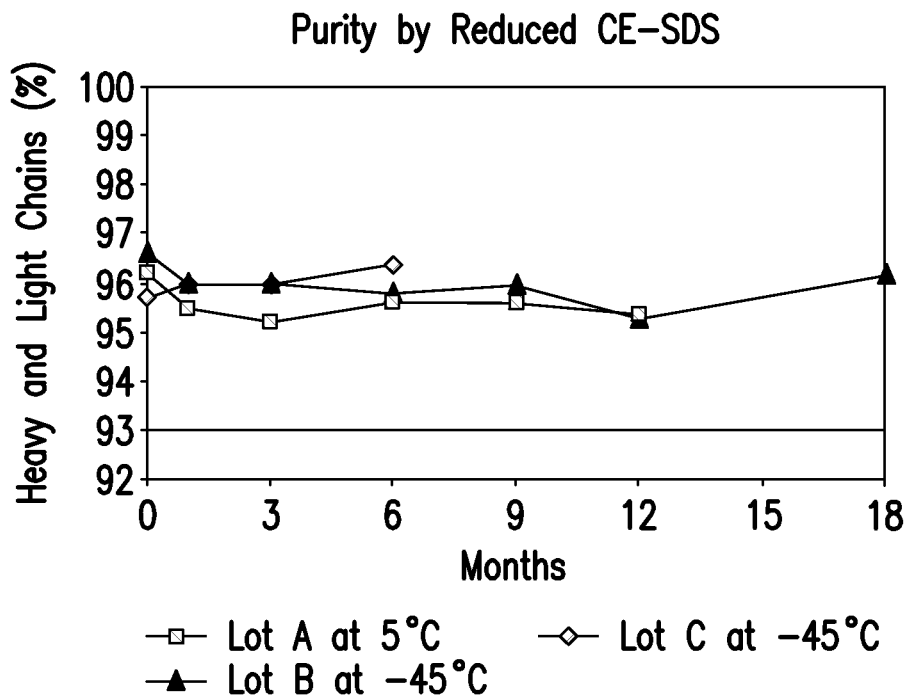

FIGS. 5I and 5J show purity by measuring percent main peak by non-reducing CE-SDS, or percent heavy and light chains by reducing CE-SDS, respectively. A brief discussion of CE-SDS is provided Example 10.

Figure 5K:
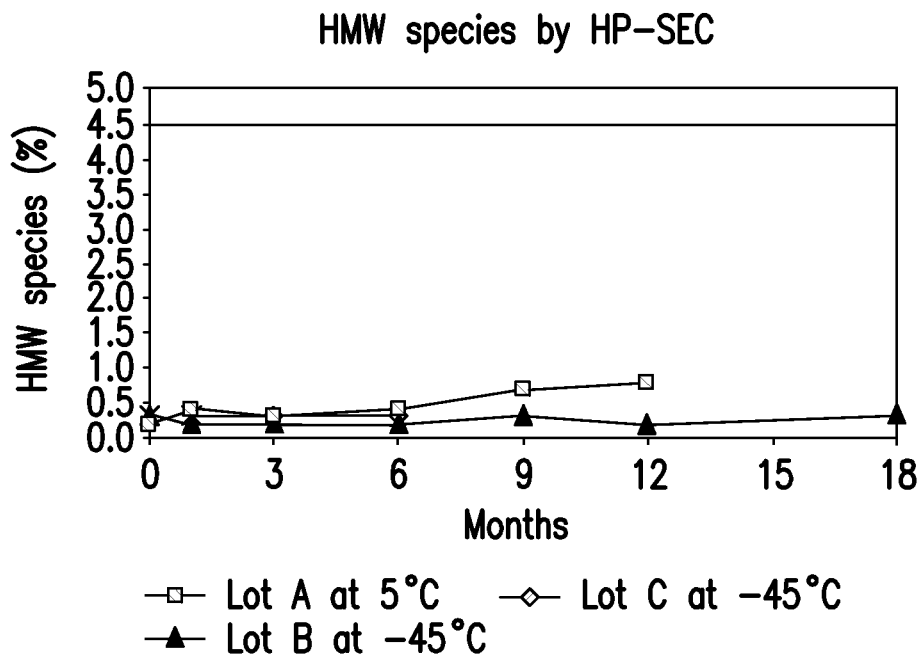
Figure 5L:
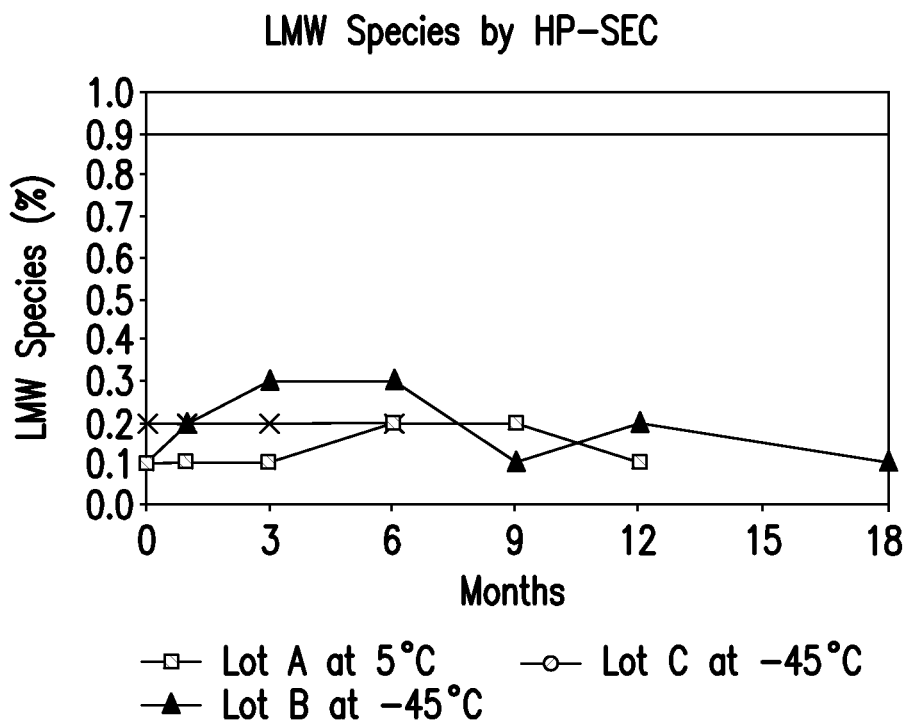

FIGS. 5K and 5L show percent HMW and LMW species, respectively, as measured by HP-SEC. A brief discussion of HP-SEC is provided Example 3.

FIG. 6 presents additional stability data for antibody formulations of the present invention (antibody Lots A and B) when stored as drug substance in 30 mL ethylene-vinyl-acetate (EVA) fluid contact layer Celsius® Pak bags. Data are presented for formulations comprising 10 mM Histidine buffer (pH 6.0), 7% sucrose, 0.05% polysorbate 80 and antibody hum13B8-b. FIGS. 6A and 6B are plots of biological potency as measured by ELISA and as measured by cell based functional assay, respectively. Brief discussions of ELISAs and cell based functional assays are provided Examples 9 and 8, respectively.

Figure 6A:
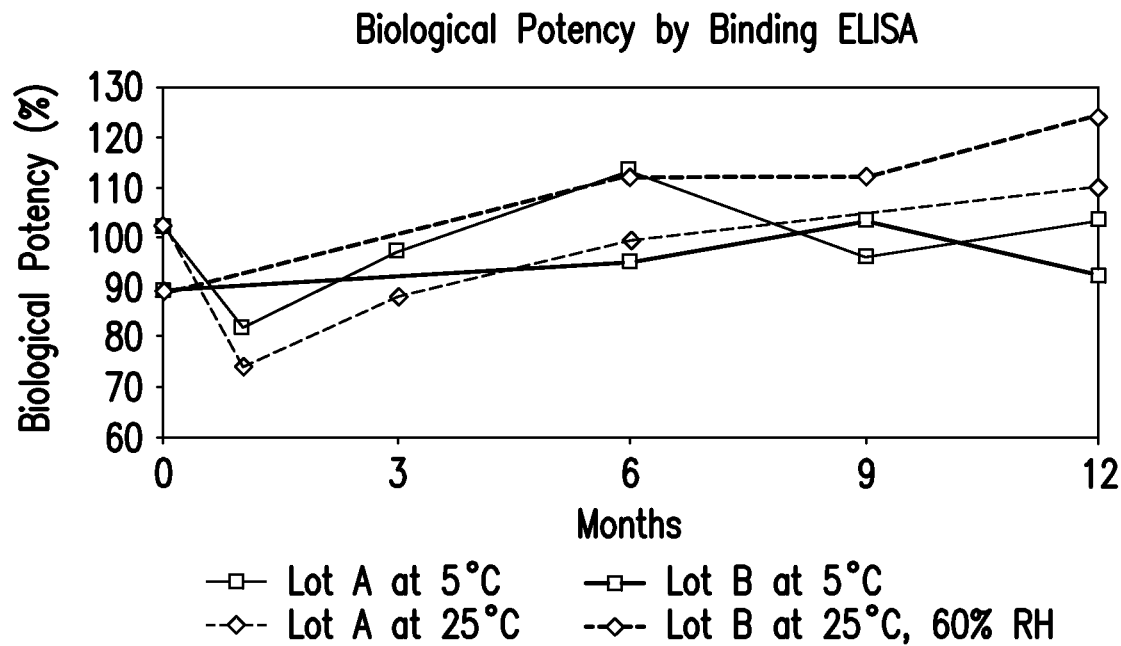
Figure 6B:
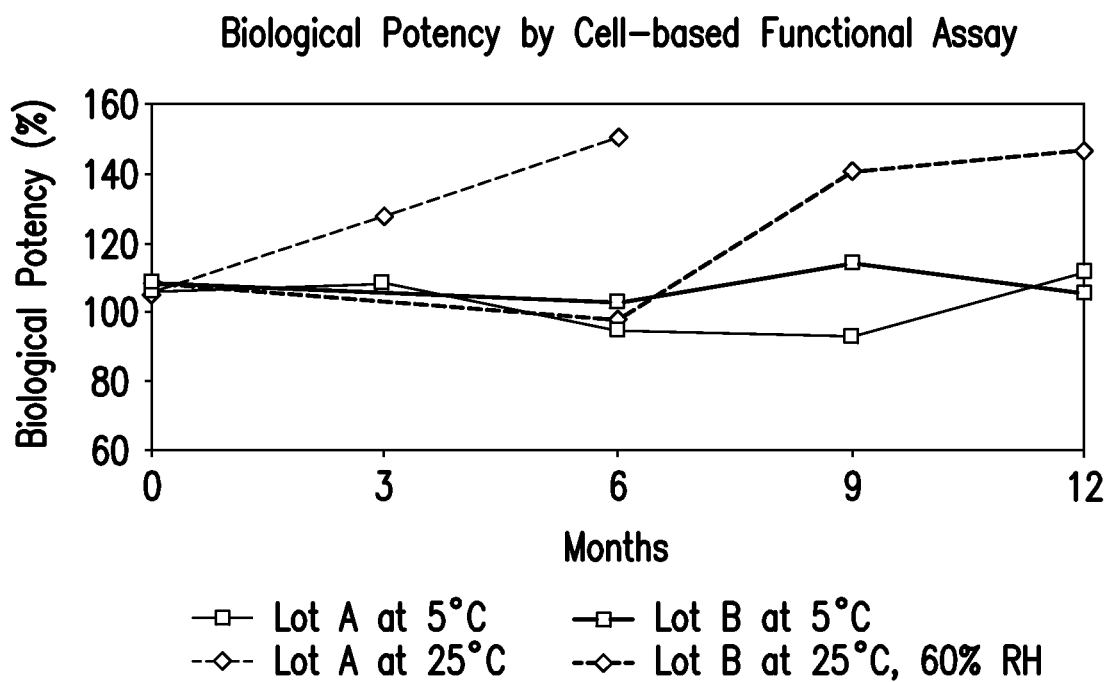
Figure 6C:
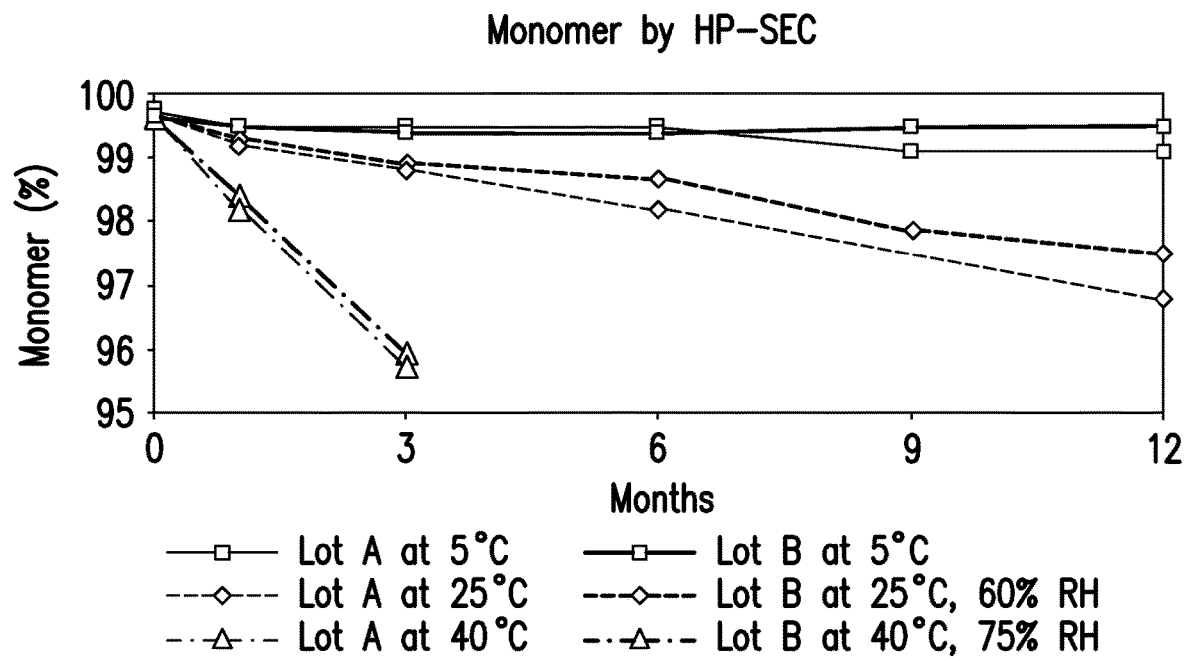
Figure 6D:
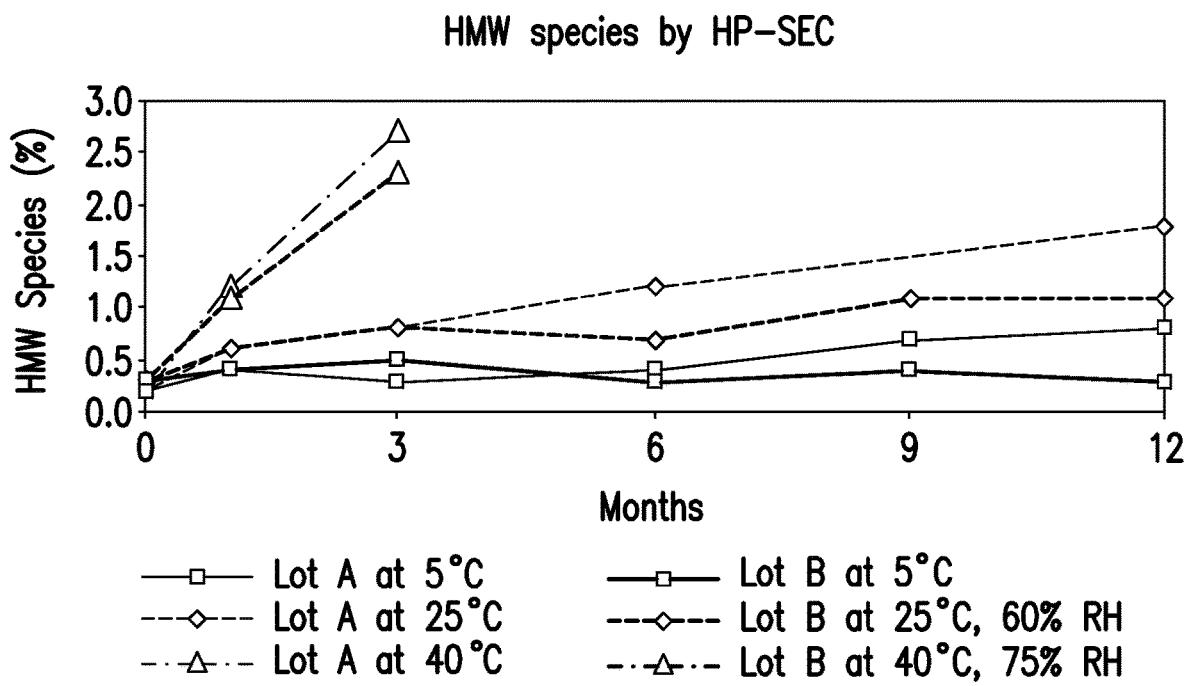
Figure 6E:
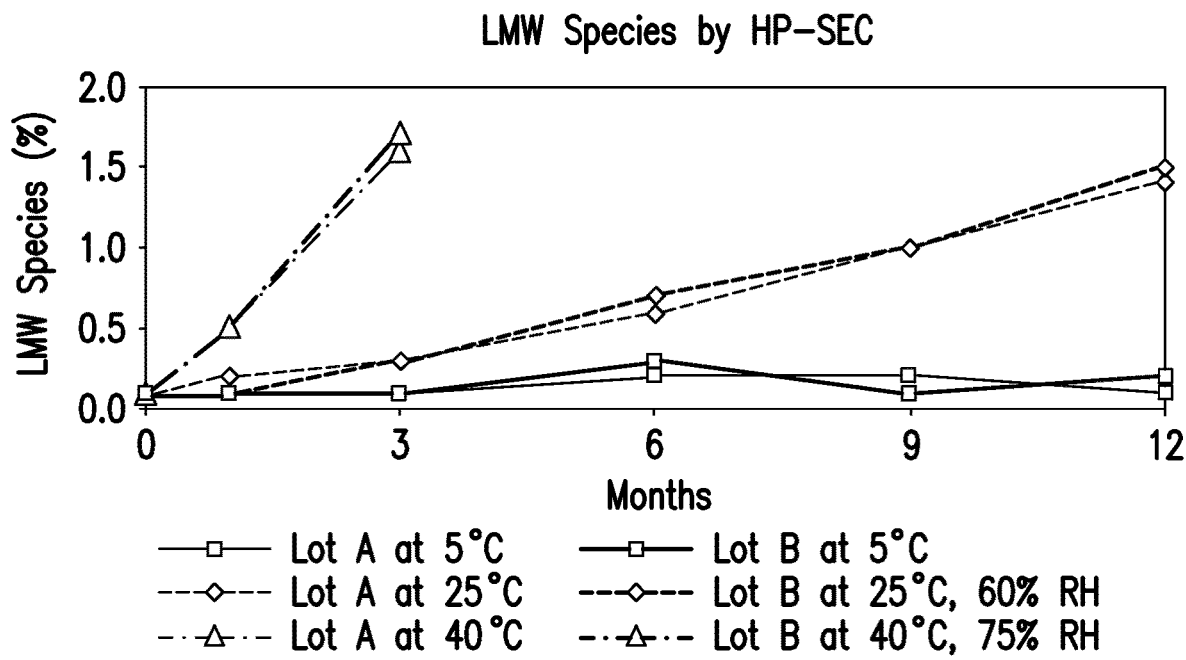

FIGS. 6C-6E are plots of the percent monomer, HMW species and LMW species, respectively, as determined by HP-SEC, under a variety of storage conditions. A brief discussion of HP-SEC is provided Example 3.

Figure 6F:
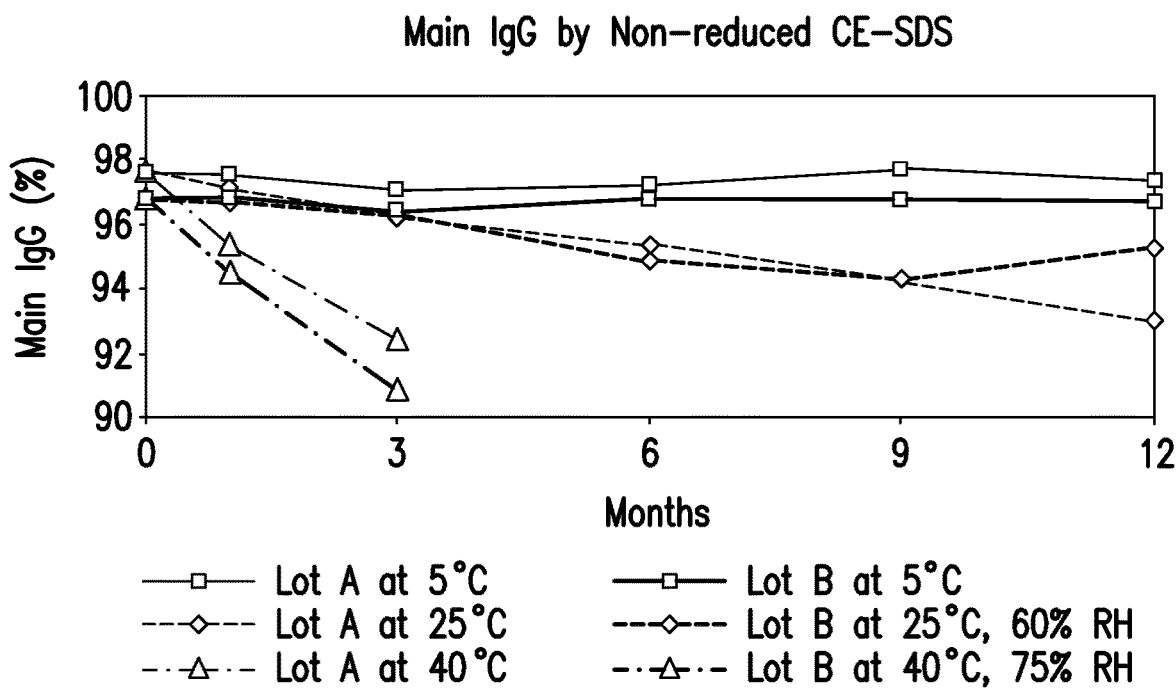
Figure 6G:
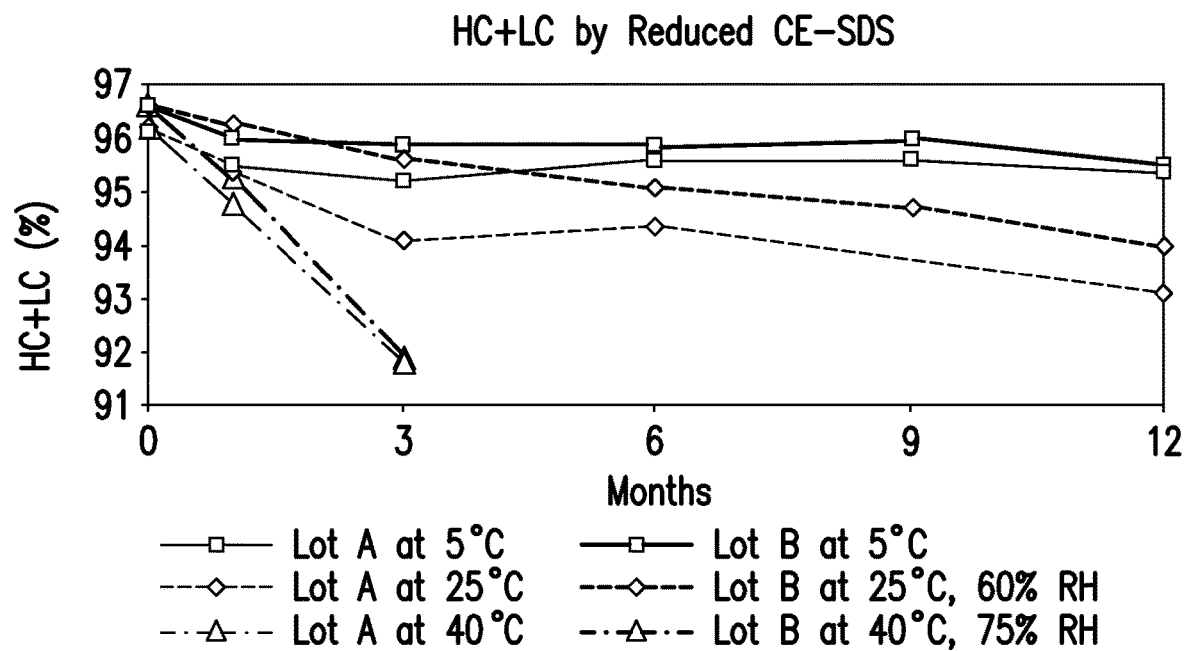
Figure 6H:
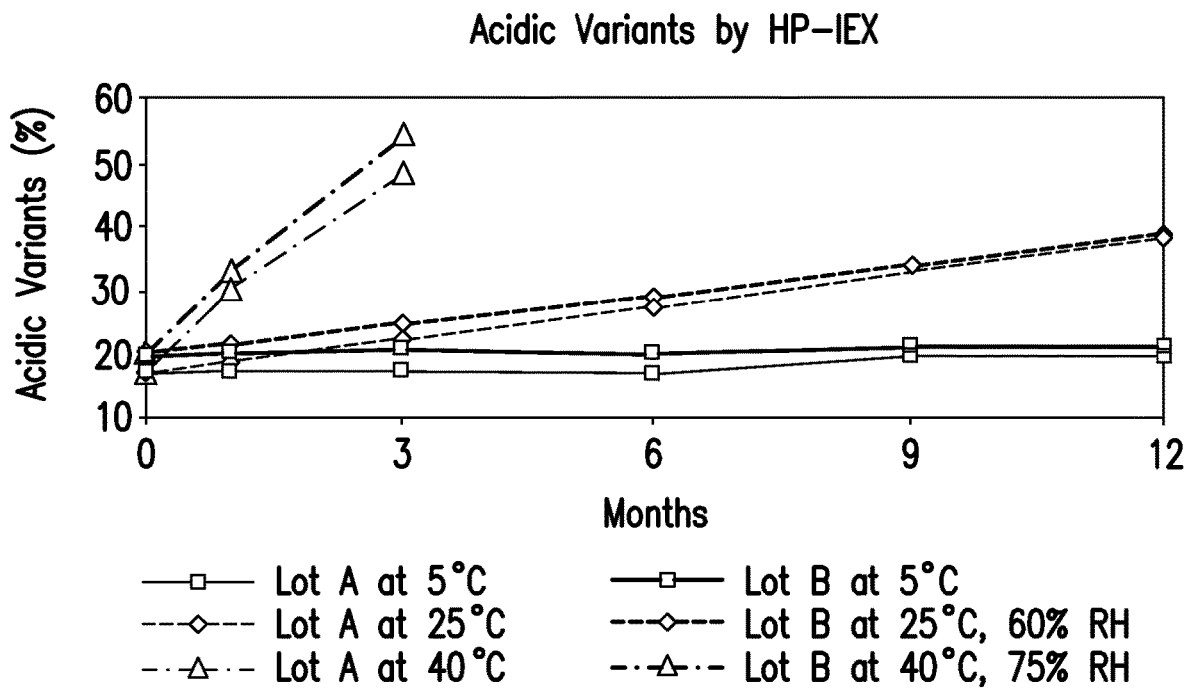
Figure 6I:
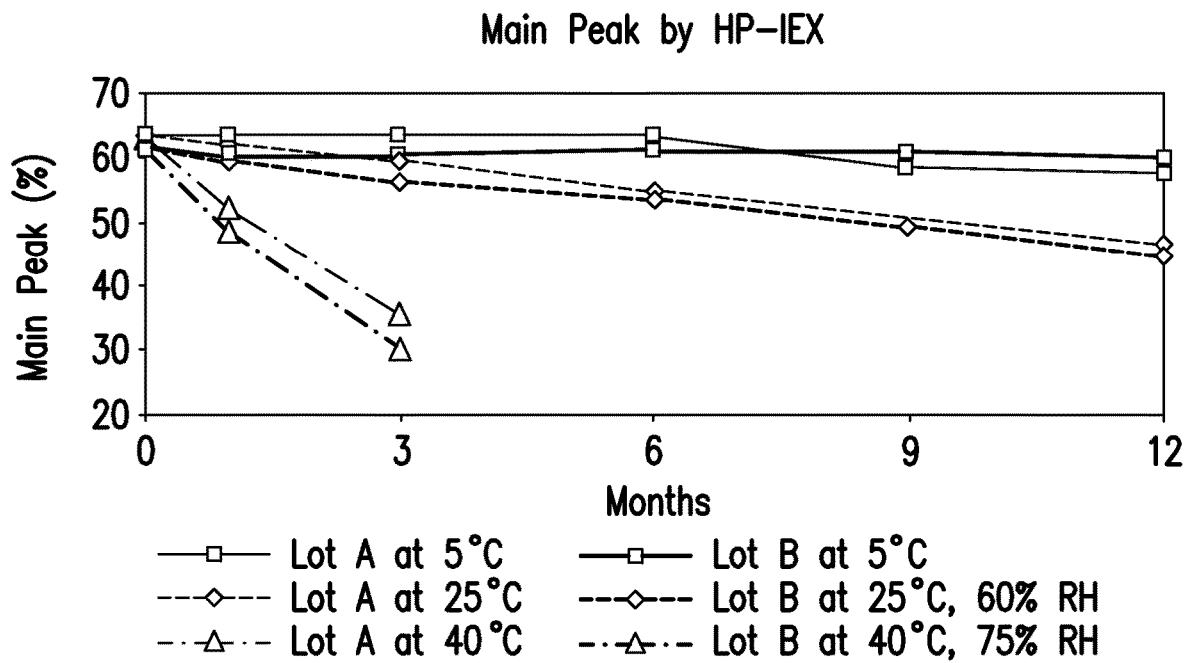
Figure 6J:
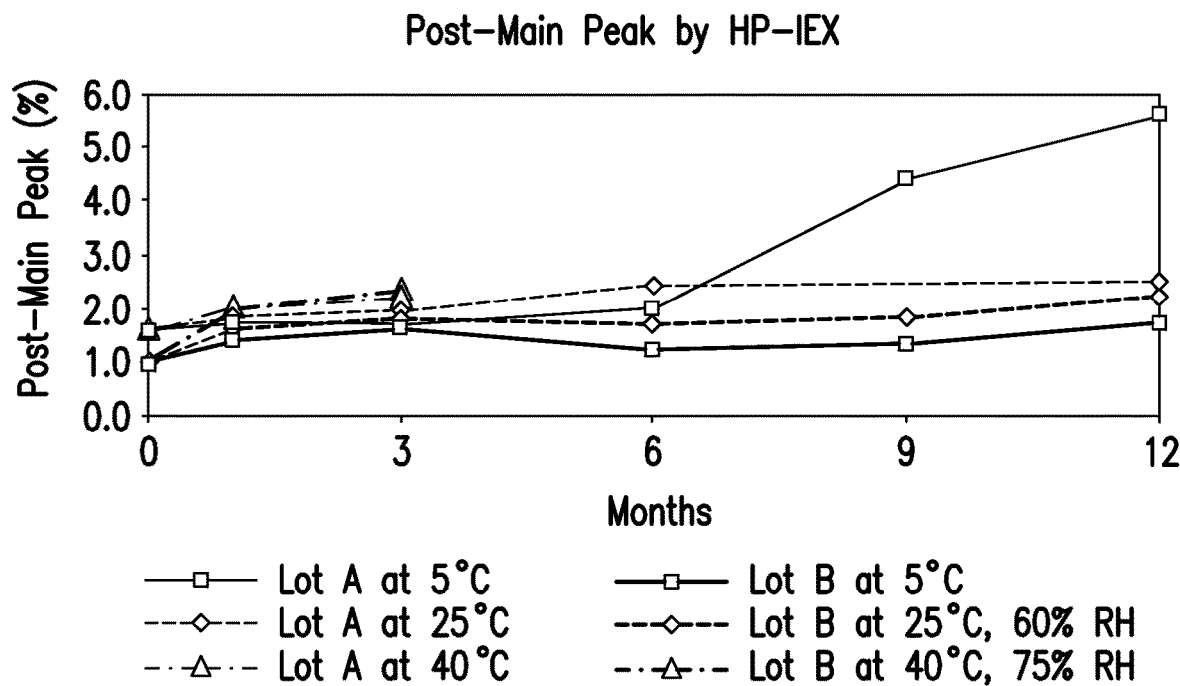
Figure 6K:
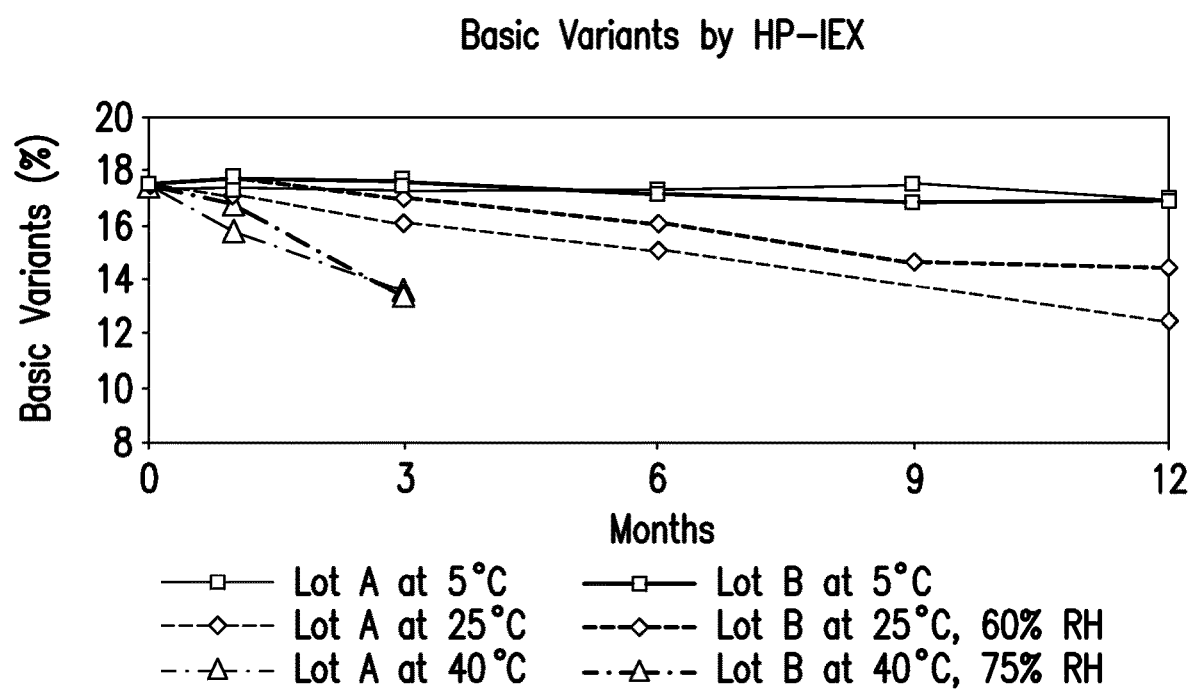

FIGS. 6F and 6G show purity by measuring percent main peak by non-reducing CE-SDS, or percent heavy and light chains by reducing CE-SDS, respectively. A brief discussion of CE-SDS is provided Example 10.

FIGS. 6H-6K are plots of results of HP-IEX experiments that monitor antibody stability by measuring percentages of acidic variants, main peak, post-main peak species and basic variants, respectively. A brief discussion of HP-IEX is provided Example 5.

FIG. 7 presents stability data for antibody formulations of the present invention when stored at 5° C. (3° C.) as drug product in unit doses in prefilled syringes, at 100 mg/ml antibody concentration and 1.0 ml fill volume. FIG. 7A is a plot of protein concentration for four different preparations of hum13B8-b (Lots D, E, F, G and H) as determined by uv absorption. A brief discussion of protein concentration determinations is provided Example 7.

Figure 7A:
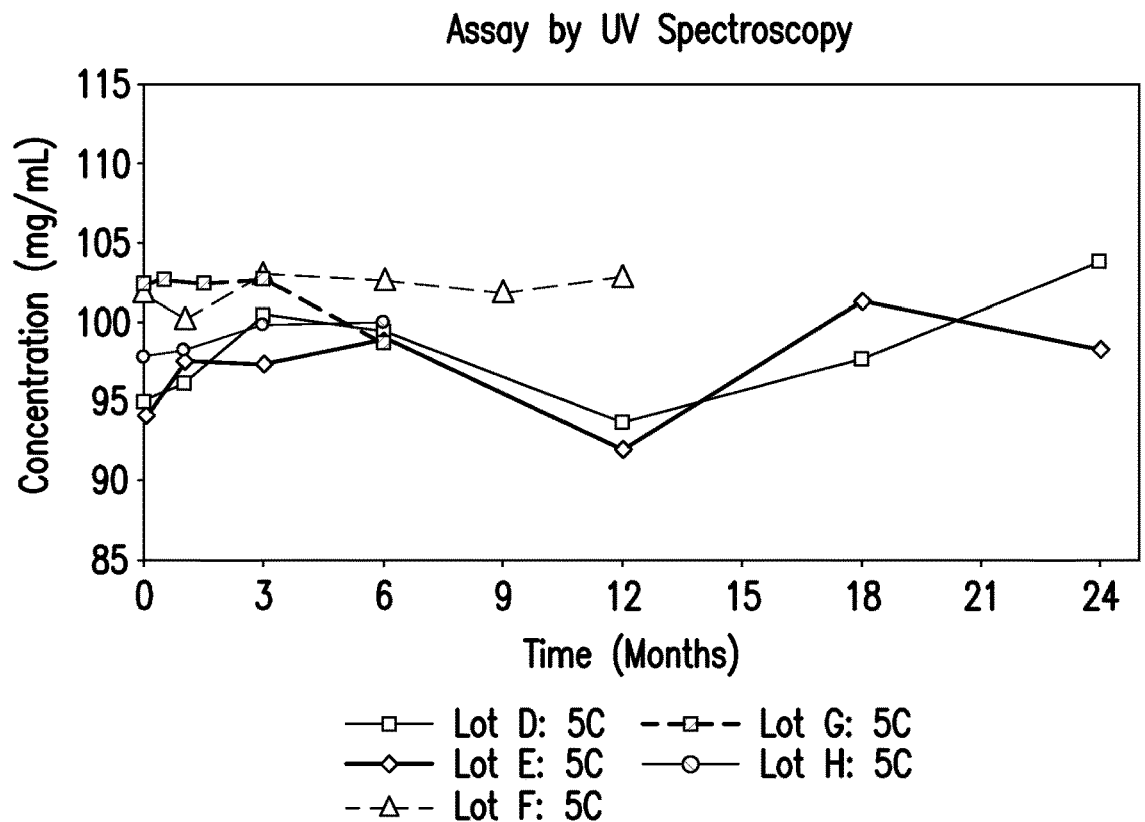
Figure 7B:
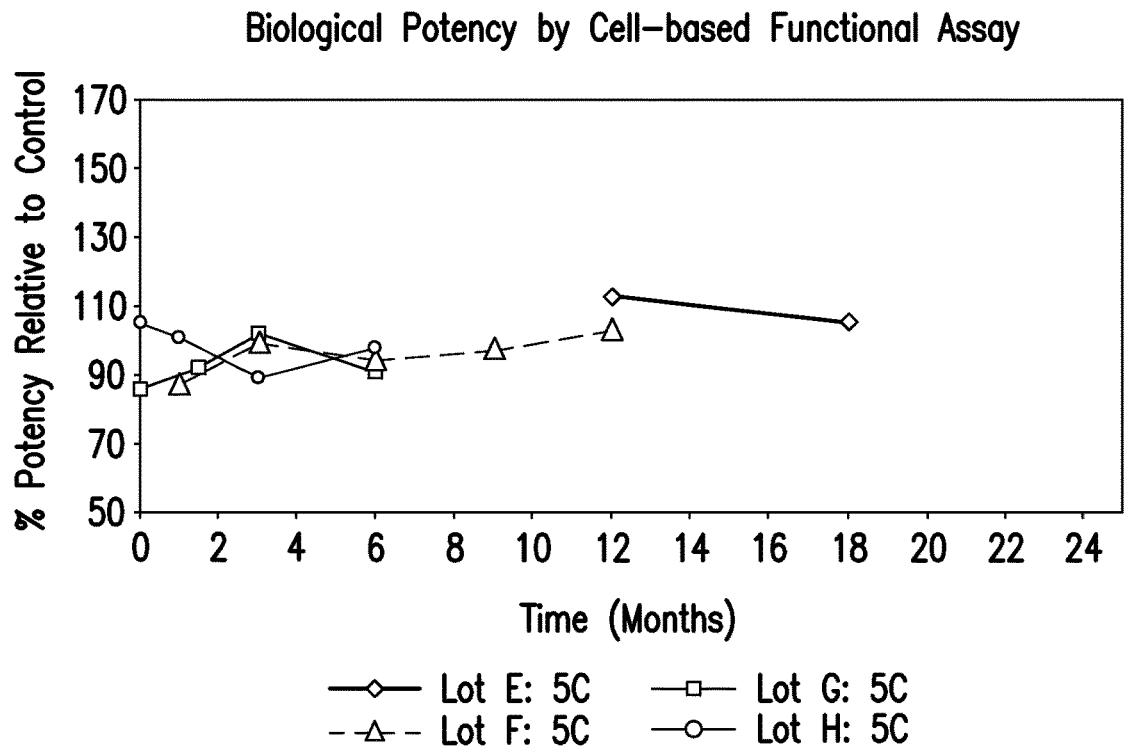
Figure 7C:
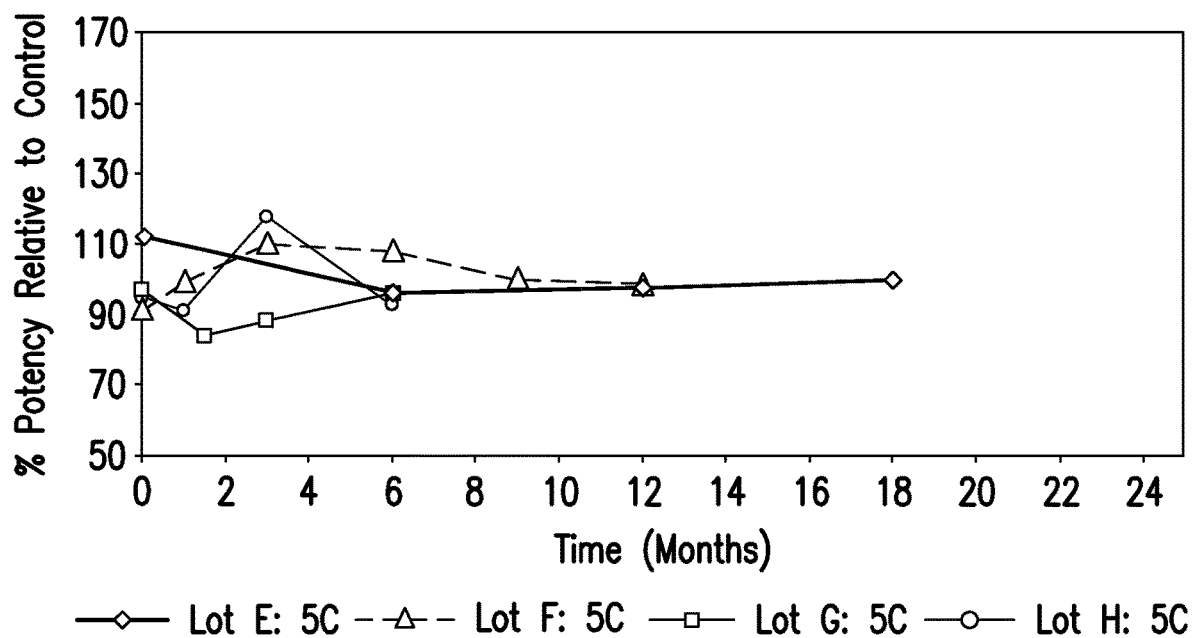

FIGS. 7B and 7C are plots of biological potency as measured by cell based functional assay, and as measured by ELISA, respectively, for four different preparations of hum13B8-b (Lots E, F, G and H). Brief discussions of cell based functional assays and ELISAs are provided Examples 8 and 9, respectively.

Figure 7D:
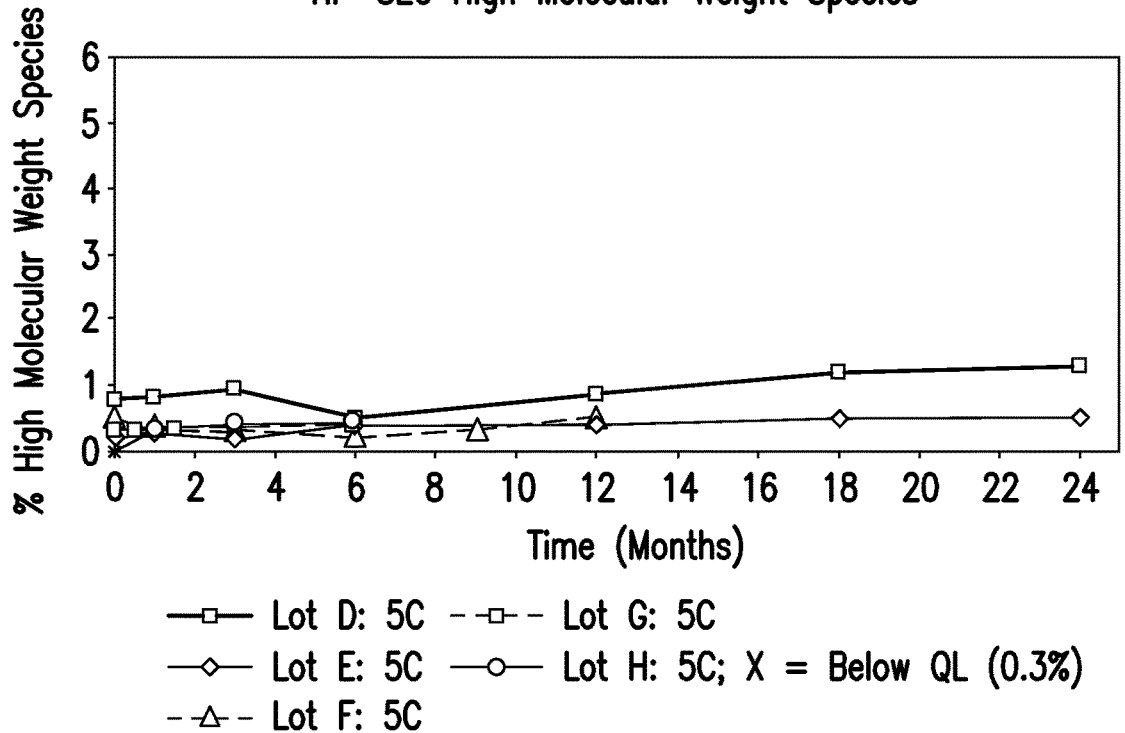
Figure 7E:
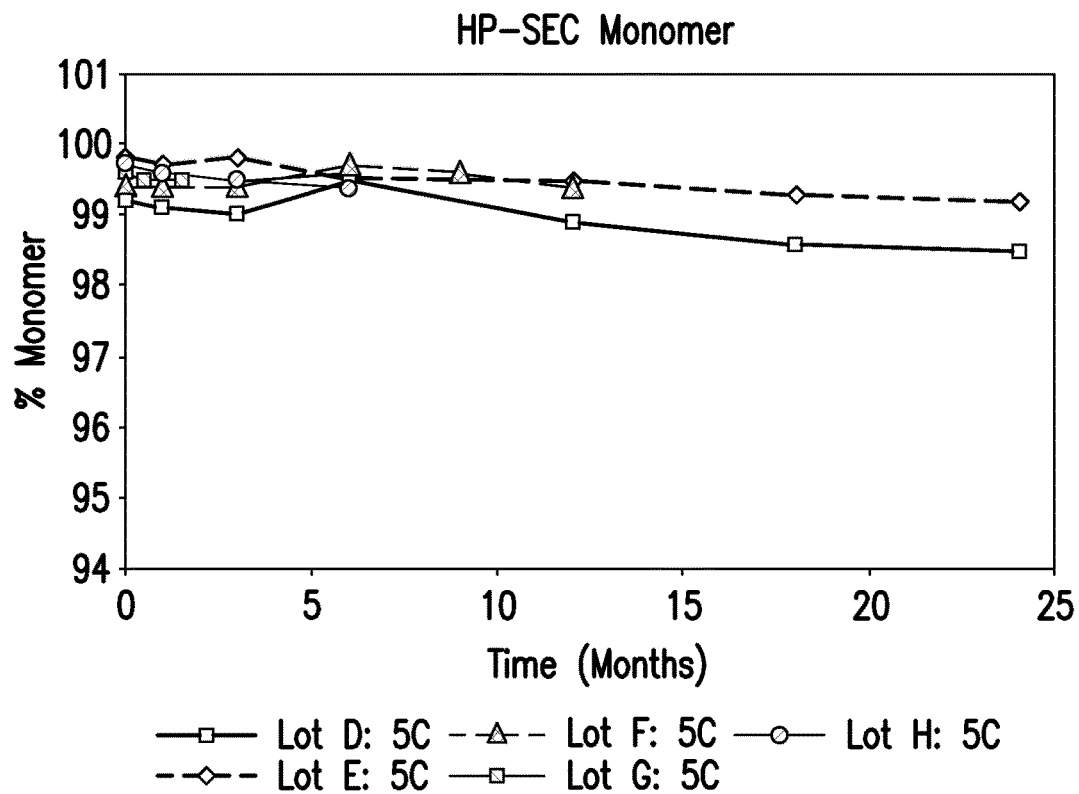
Figure 7F:
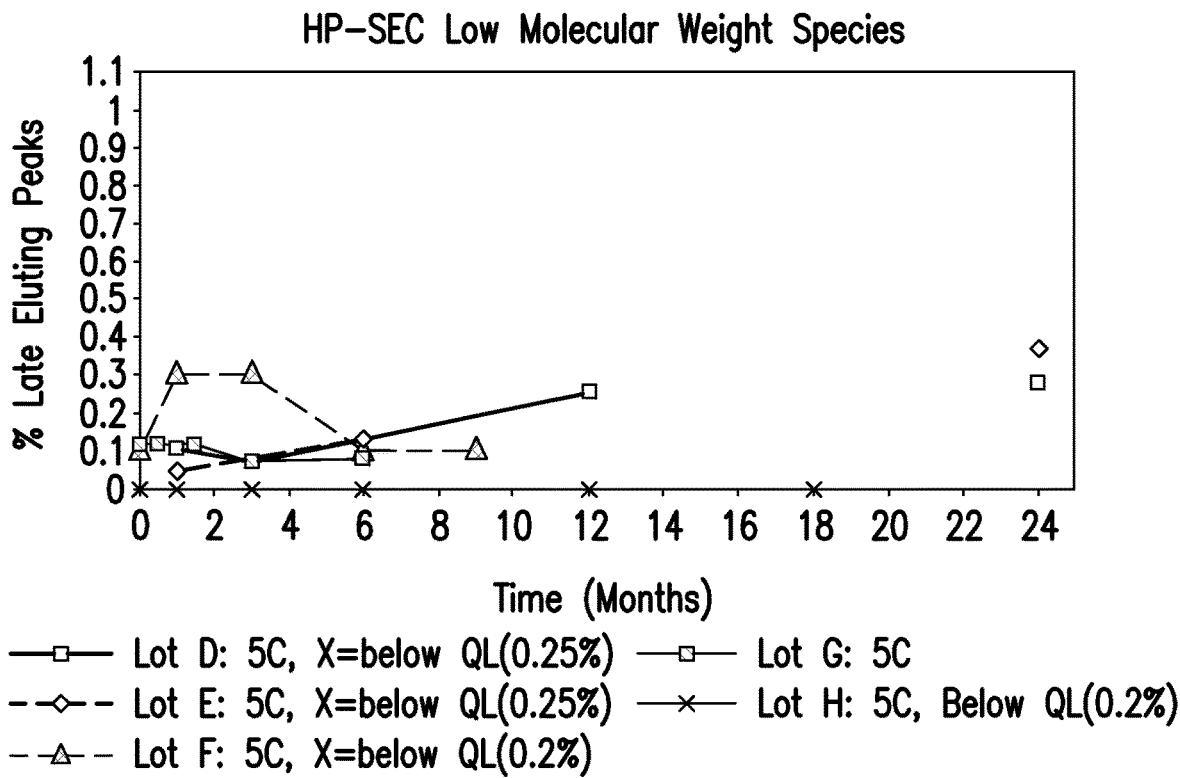
Figure 7G:
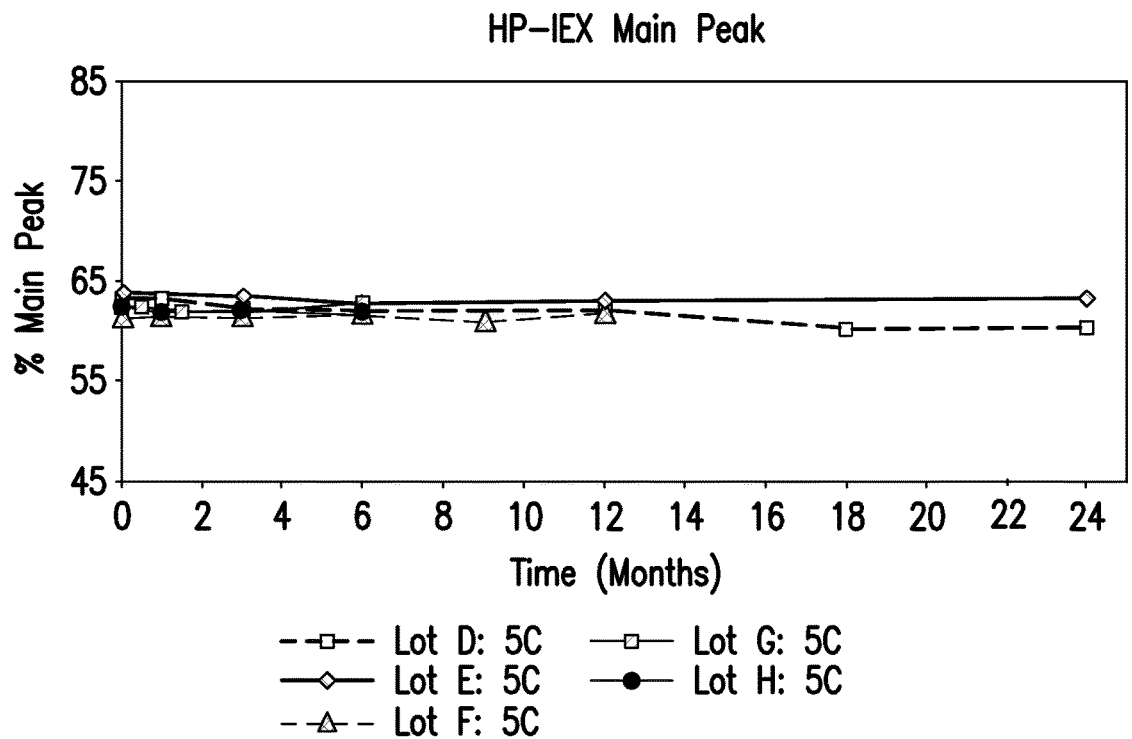
Figure 7H:
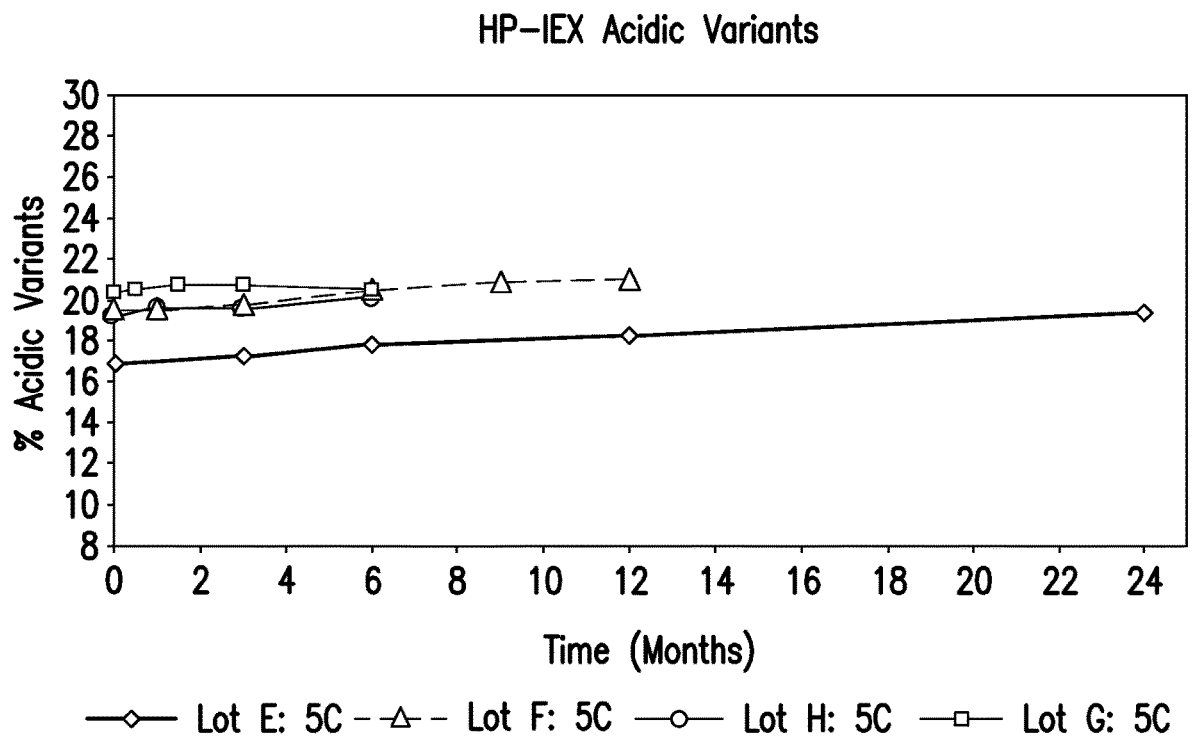
Figure 7I:
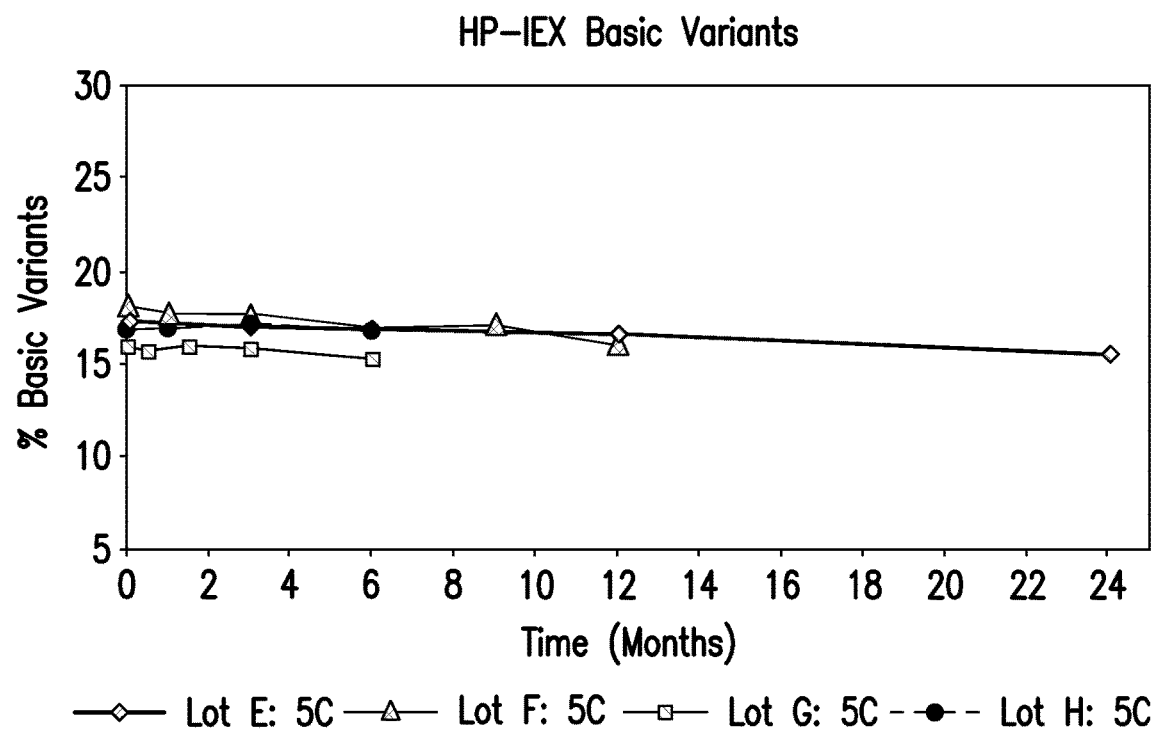
Figure 7J:
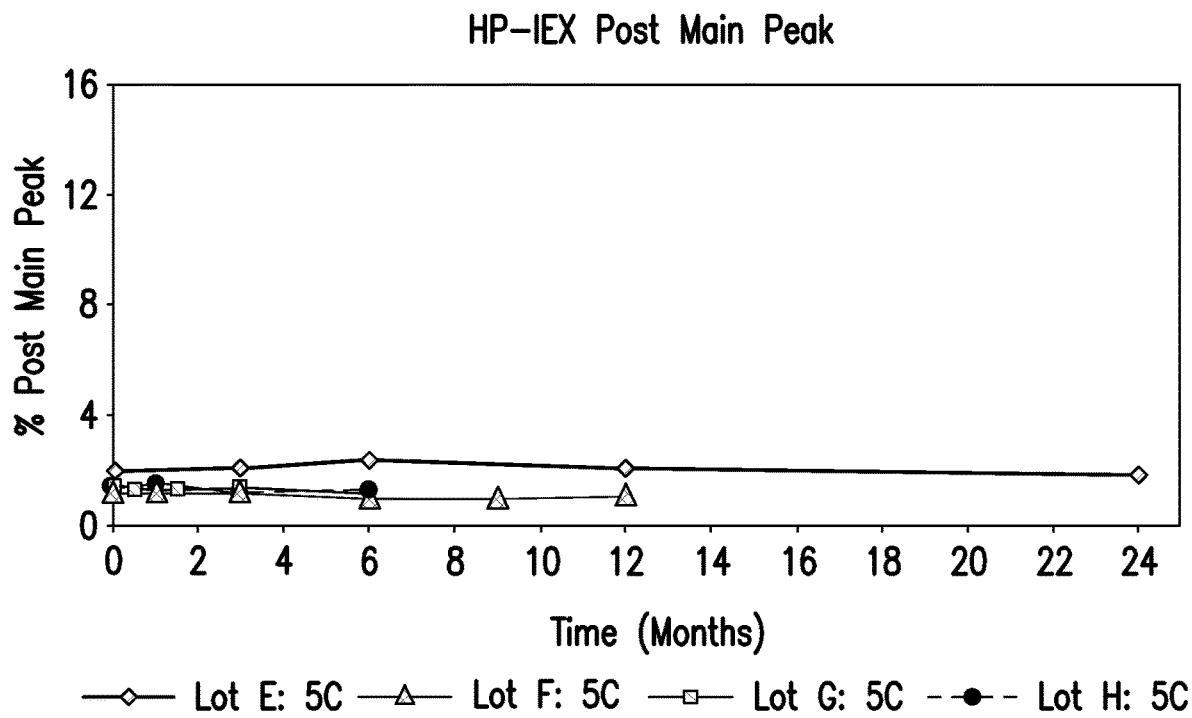

FIGS. 7D-7F are plots of the percent HMW species, monomer, and LMW species, respectively, as determined by HP-SEC. A brief discussion of HP-SEC is provided Example 3.

FIGS. 7G-7J are plots of results of HP-IEX experiments that monitor antibody stability by measuring percentages of the main peak, acidic variants, basic variants, and post-main peak species, respectively. A brief discussion of HP-IEX is provided Example 5.

Figure 7K:
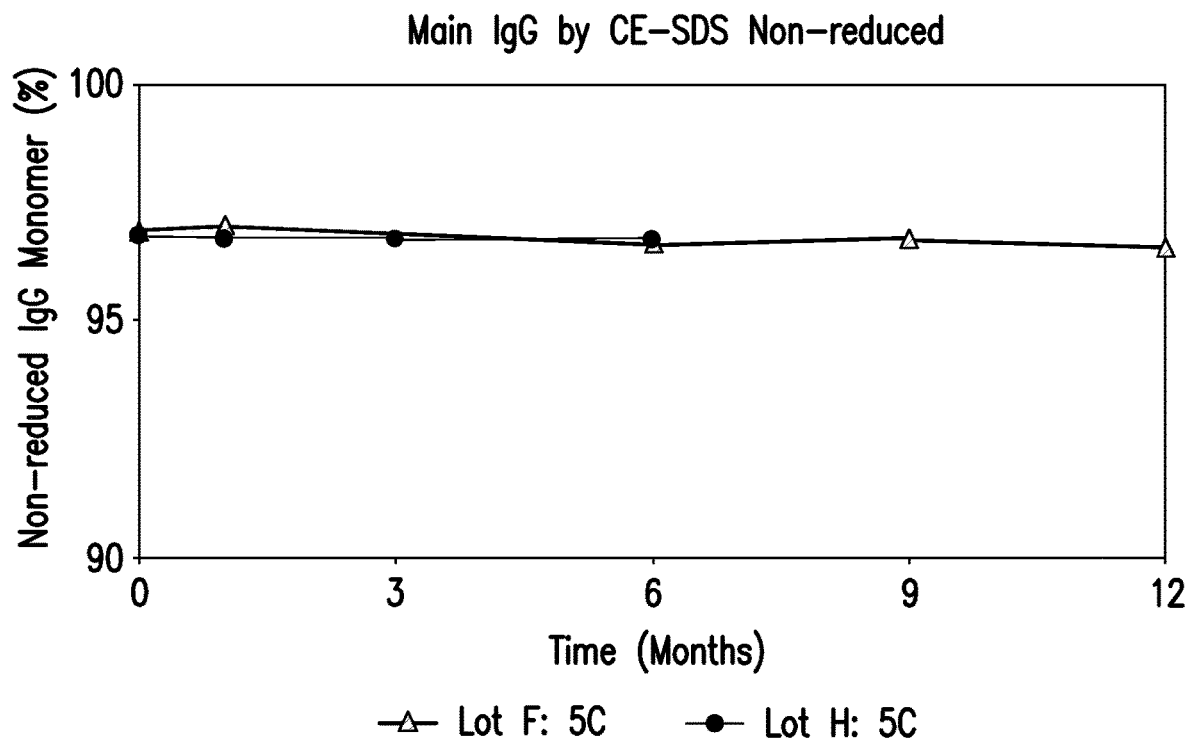
Figure 7L:
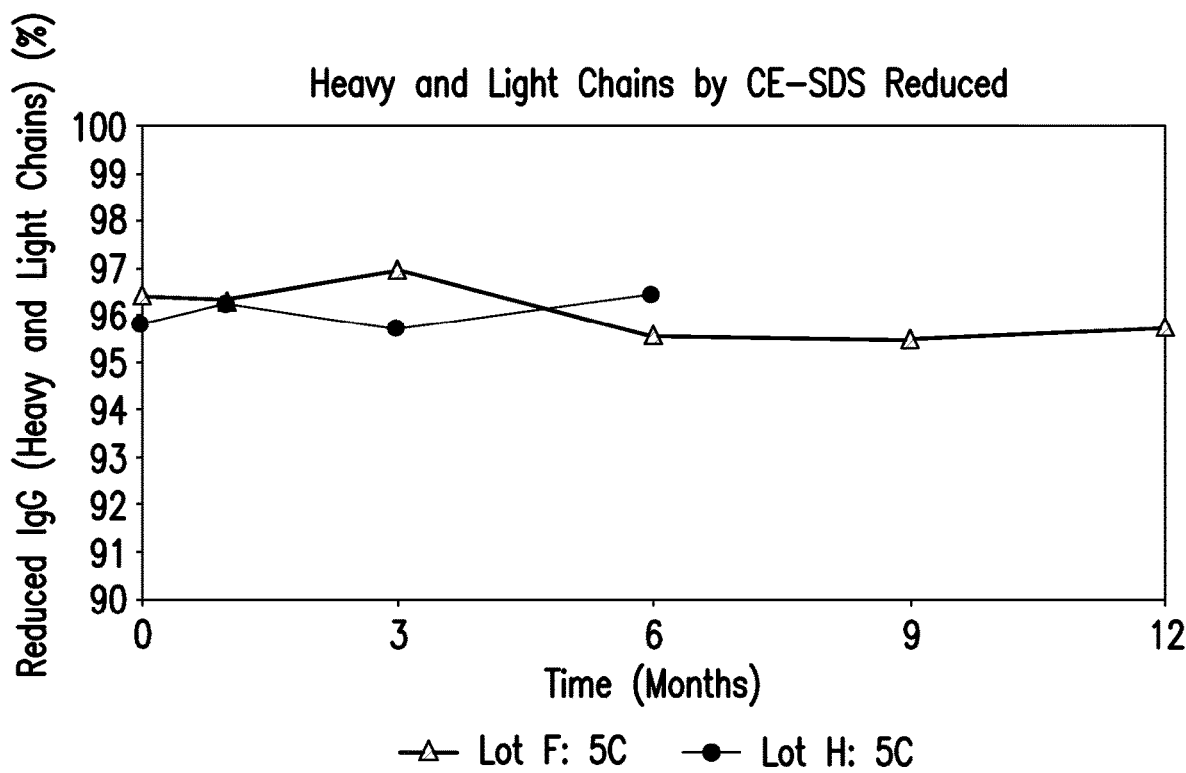

FIGS. 7K and 7L show purity by measuring percent main peak by non-reducing CE-SDS, or percent heavy and light chains by reducing CE-SDS, respectively. A brief discussion of CE-SDS is provided Example 10.

DETAILED DESCRIPTION

As used herein, including the appended claims, the singular forms of words such as "a," "an," and "the," include their corresponding plural references unless the context clearly dictates otherwise. Table 10 below provides a listing of sequence identifiers used in this application. Unless otherwise indicated, the proteins and subjects referred to herein are human proteins and human subjects, rather than another species. As used herein, "FIG. X" refers collectively to all of individual FIGS. XA-XZ.

All references cited herein are incorporated by reference to the same extent as if each individual publication, database entry (e.g. Genbank sequences or GeneID entries), patent application, or patent, was specifically and individually indicated to be incorporated by reference. Citation of the references herein is not intended as an admission that the reference is pertinent prior art, nor does it constitute any admission as to the contents or date of these publications or documents.

I. Definitions

"Proliferative activity" encompasses an activity that promotes, that is necessary for, or that is specifically associated with, e.g., normal cell division, as well as cancer, tumors, dysplasia, cell transformation, metastasis, and angiogenesis.

As used herein, the term "hypervariable region" refers to the amino acid residues of an antibody that are responsible for antigen-binding. The hypervariable region comprises amino acid residues from a "complementarity determining region" or "CDR" (e.g. residues 24-34 (CDRL1), 50-56 (CDRL2) and 89-97 (CDRL3) in the light chain variable domain and residues 31-35 (CDRH1), 50-65 (CDRH2) and 95-102 (CDRH3) in the heavy chain variable domain (Kabat et al. (1991) Sequences of Proteins of Immunological Interest, 5th Ed. Public Health Service, National Institutes of Health, Bethesda, Md.) and/or those residues from a "hypervariable loop" (i.e. residues 26-32 (L1), 50-52 (L2) and 91-96 (L3) in the light chain variable domain and 26-32 (H1), 53-55 (H2) and 96-101 (H3) in the heavy chain variable domain (Chothia and Lesk (1987) *J. Mol. Biol.* 196: 901-917). As used herein, the term "framework" or "FR" residues refers to those variable domain residues other than the hypervariable region residues defined herein as CDR residues. The residue numbering above relates to the Kabat numbering system and does not necessarily correspond in detail to the sequence numbering in the accompanying Sequence Listing.

"Immune condition" or "immune disorder" encompasses, e.g., pathological inflammation, an inflammatory disorder, and an autoimmune disorder or disease. "Immune condition" also refers to infections, persistent infections, and proliferative conditions, such as cancer, tumors, and angiogenesis, including infections, tumors, and cancers that resist eradication by the immune system. "Cancerous condition" includes, e.g., cancer, cancer cells, tumors, angiogenesis, and precancerous conditions such as dysplasia.

"Inflammatory disorder" means a disorder or pathological condition where the pathology results, in whole or in part, from, e.g., a change in number, change in rate of migration, or change in activation, of cells of the immune system. Cells of the immune system include, e.g., T cells, B cells, monocytes or macrophages, antigen presenting cells (APCs), dendritic cells, microglia, NK cells, NKT cells, neutrophils, eosinophils, mast cells, or any other cell specifically associated with the immunology, for example, cytokine-producing endothelial or epithelial cells.

As used herein, concentrations are to be construed as approximate within the ranges normally associated with such concentrations in the manufacture of pharmaceutical formulations. Specifically, concentrations are need not be exact, but may differ from the stated concentrations within the tolerances typically expected for drugs manufactured under GMP conditions. Similarly, pH values are approximate within the tolerances typically expected for drugs manufactured under GMP conditions and stored under typical storage conditions. For example, the histidine formulations of the present invention are referred to as having a pH of 6.0 but the typical tolerance is pH 6.0 (±0.3). Unless otherwise indicated, percent concentrations are weight/weight concentrations.

II. High Concentration Solution Antibody Formulations

Typical therapeutic monoclonal antibodies are comprised of four polypeptides: two light chains (e.g. 214 amino acids long) and two heavy chains (e.g. 446 amino acids long). Each chain is in turn comprised of a variable domain and a constant domain. Variable domains for anti-IL-23p19 hum13B8-b are 108 and 116 amino acids for the light and heavy chains, respectively, and the constant domains are 106 and 330 amino acids. The specificity of an antibody for its target is largely determined by the sequences falling within the so-called "hyper-variable," or "complementarity determining" regions (CDRs), three of which are found in the variable domains of each of the heavy and light chains. The CDRs may vary in length between different antibodies, but in hum13B8-b the CDRs comprise 44 amino acids on heavy chains and 27 amino acids on the light chain. The CDR residues are highly variable between different antibodies, and may originate from human germline sequences (in the case of fully human antibodies), or from non-human (e.g. rodent) germline sequences. The framework regions can also differ significantly from antibody to antibody. The constant regions will differ depending on whether the selected antibody has a lambda (λ) or kappa (κ) light chain, and depending on the class (or isotype) of the antibody (IgA, IgD, IgE, IgG, or IgM) and subclass (e.g. IgG1, IgG2, IgG3, IgG4). The sum total is an antibody molecule of approximately 150,000 Da, comprised of approximately 650 amino acids, of which 224 are in variable domains, including 71 amino acids in "hyper-variable" regions, with constant domains varying in class, subclass, and light chain constant domains.

The antibody of the present invention (anti-IL-23p19 mAb hum13B8-b) also differs from many recently developed therapeutic antibodies in that it is humanized, rather than fully human. As a result, the CDR sequences are derived from non-human (in this case mouse) germline sequences, rather than human germline sequences. The germline sequences comprise the sequence repertoire from which an antibody's CDR sequences are derived, aside from somatic hypermutation derived changes, and as a consequence it would be expected that CDRs obtained starting with a mouse germline would systematically differ from those starting from a human germline. This is, in fact, the basis for using different species immune systems to raise antibodies, since use of different species increases the potential diversity in resulting CDR sequences. Use of human germline sequences is often justified on the basis that CDR sequences from human germlines will be less immunogenic in humans than those derived from other species, reflecting the underlying belief that CDRs will systematically differ depending on their species of origin. Although the increase in CDR diversity increases the likelihood of finding antibodies with desired properties, such as high affinity, it further magnifies the difficulties in developing a stable solution formulation of the resulting antibody.

Even antibodies that bind to the same antigen can differ dramatically in sequence, and are not necessarily any more closely related in sequence than antibodies to entirely separate antigens. For example, the variable domains of the antibody of the present invention (hum13B8-b) share only approximately 50 to 60% sequence identity with another anti-IL-23p19-specific antibody CNTO 1959 (SEQ ID NOs: 116 and 106 of U.S. Pat. No. 7,993,645). CNTO 1959 is a fully human antibody. Based on the low sequence similarity, the chemical properties of the antibodies, and thus their susceptibility to degradation, cannot be presumed to be similar despite their shared target.

As demonstrated above, antibodies are large, highly complex polypeptide complexes subject to various forms of degradation and instability in solution. The diversity of sequence, and thus structure, of antibodies gives rise to wide range of chemical properties. Aside from the obvious sequence-specific differences in antigen binding specificity, antibodies exhibit varying susceptibility to various degradative pathways, aggregation, and precipitation. Amino acid side chains differ in the presence or absence of reactive groups, such as carboxy-(D,E), amino-(K), amide-(N,Q), hydroxyl-(S,T,Y), sulfhydryl-(C), thioether-(M) groups, as well as potentially chemically reactive sites on histidine, phenylalanine and proline residues. Amino acid side chains directly involved in antigen binding interactions are obvious candidates for inactivation by side chain modification, but degradation at other positions can also affect such factors as steric orientation of the CDRs (e.g. changes in framework residues), effector function (e.g. changes in Fc region—see, e.g., Liu et al. (2008) *Biochemistry* 47:5088), or self-association/aggregation.

Antibodies are subject to any number of potential degradation pathways. Oxidation of methionione residues in antibodies, particularly in CDRs, can be a problem if it disrupts antigen binding. Presta (2005) *J. Allergy Clin. Immunol.* 116: 731; Lam et al. (1997) *J. Pharm. Sci.* 86:1250. Other potential degradative pathways include asparagine deamidation (Harris et al. (2001) *Chromatogr., B* 752:233; Vlasak et al. (2009) *Anal. Biochem.* 392:145) tryptophan oxidation (Wei et al. (2007) *Anal. Chem.* 79:2797), cysteinylation (Banks et al. (2008) *J. Pharm. Sci.* 97:775), glycation (Brady et al. (2007) *Anal. Chem.*

79:9403), pyroglutamate formation (Yu et al. (2006) *J. Pharm. Biomed. Anal.* 42:455), disulfide shuffling (Liu et al. (2008) *J. Biol. Chem.* 283:29266), and hydrolysis (Davagnino et al. (1995) *J. Immunol. Methods* 185:177). Discussed in Ionescu & Vlasak (2010) *Anal. Chem.* 82:3198. See also Liu et al. (2008) *J. Pharm. Sci.* 97:2426. Some potential degradation pathways depend not only on the presence of a specific amino acid residue, but also the surrounding sequence. Deamidation and isoaspartate formation can arise from a spontaneous intramolecular rearrangement of the peptide bond following (C-terminal to) N or D residues, with N-G and D-G sequences being particularly susceptible. Reissner & Aswad (2003) *CMLS Cell. Mol. Life Sci.* 60:1281.

Antibodies are also subject to sequence-dependent non-enzymatic fragmentation during storage. Vlasak & Ionescu (2011) *mAbs* 3:253. The presence of reactive side chains, such as D, G. S. T, C or N can result in intramolecular cleavage reactions that sever the polypeptide backbone. Such sequence specific hydrolysis reactions are typically critically dependent on pH. Id. Antibodies may also undergo sequence-dependent aggregation, for example when CDRs include high numbers of hydrophobic residues. Perchiacca et al. (2012) *Prot. Eng. Des. Selection* 25:591. Aggregation is particularly problematic for antibodies that need to be formulated at high concentrations for subcutaneous administration, and has even led some to modify the antibody sequence by adding charged residues to increase solubility. Id.

Mirroring the diversity of potential sequence-specific stability issues with antibodies, potential antibody formulations are also diverse. A number of different variables must be custom-optimized for each new antibody. Formulations may vary, for example, in antibody concentration, buffer, pH, presence or absence of surfactant, presence or absence of tonicifying agents (ionic or nonionic), presence of absence of molecular crowding agent. Commercially available therapeutic antibodies are marketed in a wide range of solution formulations, in phosphate buffer (e.g. adalimumab), phosphate/glycine buffer (e.g. basilixumab), Tris buffer (e.g. ipilimumab), histidine (e.g. ustekinumab), sodium citrate (e.g. rituximab); and from pH 4.7 (e.g. certolizumab) and pH 5.2 (e.g. adalimumab) to pH 7.0-7.4 (e.g. cetuximab). They are also available in formulations optionally containing disodium edetate (e.g. alemtuzumab), mannitol (e.g. ipilimumab), sorbitol (e.g. golimumab), sucrose (e.g. ustekinumab), sodium chloride (e.g. rituximab), potassium chloride (e.g. alemtuzumab), and trehalose (e.g. ranibizumab); all with and without polysorbate-80, ranging from 0.001% (e.g. abcixmab) to 0.1% (e.g. adalimumab).

Exemplary antibody formulations are found at U.S. Pat. No. 7,691,379 (anti-IL-9 mAb MEDI-528); U.S. Pat. No. 7,592,004 (anti-IL-2 receptor, daclizumab); U.S. Pat. No. 7,705,132 (anti-EGFR, panitumumab); and U.S. Pat. No. 7,635,473 (anti-Aβ; bapineuzumab). Additional exemplary antibody formulations are found at U.S. Pat. App. Pub. Nos. 2010/00021461 (anti-α4-integrin, natalizumab); 2009/0181027 (anti-IL-12/IL-23, ustekinumab); 2009/0162352 (anti-CD20, ritumixmab); 2009/0060906 (anti-IL-13); 2008/0286270 (anti-RSV, palivizumab); and 2006/0088523 (anti-Her2, pertuzumab). Yet additional formulations are described at Daugherty & Mrsyn (2006) *Adv. Drug Deliv. Rev.* 58:686; Wang et al. (2007) *J. Pharm. Sci.* 96:1; and Lam et al. (1997) *J. Pharm. Sci.* 86:1250.

Sequence variability, which is the basis for antibody specificity, is at the heart of the immune response. This variability leads to chemical heterogeneity of the resulting antibodies, which results in a wide range of potential degradation pathways. The vast array of antibody formulations developed to-date attests to the fact that formulations must be individually optimized for each specific antibody to ensure optimal stability. In fact, each and every commercial therapeutic antibody approved for use in humans so far has had a unique, distinct formulation.

III. Biological Activity of Humanized Anti-IL-23

The solution formulations of anti-IL-23p19 mAb hum13B8-b of the present invention will find use in treatment of disorders in which selective antagonism of IL-23 signaling is expected to be beneficial. Inflammatory diseases of the skin, joints, CNS, as well as proliferative disorders elicit similar immune responses, thus IL-23 blockade should provide inhibition of these immune mediated inflammatory disorders, without comprising the host ability to fight systemic infections. Antagonizing IL-23 should relieve the inflammation associated with inflammatory bowel disease, Crohn's disease, ulcerative colitis, rheumatoid arthritis, psoriatic arthritis, psoriasis, ankylosing spondylitis, graft-versus-host disease, atopic dermatitis, and various other autoimmune and inflammatory disorders. Use of IL-23 inhibitors will also provide inhibition of proliferative disorders, e.g., cancer and autoimmune disorders, e.g., multiple sclerosis, type I diabetes, and SLE. Descriptions of IL-23 in these various disorders can be found in the following published PCT applications: WO 04/081190; WO 04/071517; WO 00/53631; and WO 01/18051. IL-23 inhibitors may also find use in treatment of infections, including chronic infections, such as bacterial, mycobacterial, viral and fungal infections. See U.S. Pat. No. 8,263,080 and Int'l App. Pub. WO 2008/153610.

The high concentration solution formulations of the present invention include antibodies that retain biologically activity when stored for extended periods of time. As used herein, the term "biologically active" refers to an antibody or antibody fragment that is capable of binding the desired the antigenic epitope and directly or indirectly exerting a biologic effect. Typically, these effects result from the failure of IL-23 to bind its receptor. As used herein, the term "specific" refers to the selective binding of the antibody to the target antigen epitope. Antibodies can be tested for specificity of binding by comparing binding of the antibody to IL-23 with binding to irrelevant antigen or antigen mixture under a given set of conditions. If the antibody binds to IL-23 at least 10, and preferably 50 times more than to irrelevant antigen or antigen mixture then it is considered to be specific. An antibody that binds to IL-12 is not an IL-23-specific antibody. An antibody that "specifically binds" to IL-23p19 does not bind to proteins that do not comprise the IL-23p19-derived sequences, i.e. "specificity" as used herein relates to IL-23p19 specificity, and not any other sequences that may be present in the protein in question. For example, as used herein, an antibody that "specifically binds" to IL-23p19 will typically bind to FLAG®-hIL-23p19, which is a fusion protein comprising IL-23p19 and a FLAG® peptide tag, but it does not bind to the FLAG® peptide tag alone or when it is fused to a protein other than IL-23p19.

IL-23-specific binding compounds of the present invention can inhibit any of its biological activities, including but not limited to production of IL-1β and TNF by peritoneal macrophages and IL-17 by $T_H17$ T cells. See Langrish et al. (2004) *Immunol. Rev.* 202:96-105. Anti-IL-23p19 antibodies will also be able to inhibit the gene expression of IL-17A, IL-17F, CCL7, CCL17, CCL20, CCL22, CCR1, and GM-CSF. See Langrish et al. (2005) *J. Exp. Med.* 201:233-240. IL-23-specific binding compounds of the present invention will also block the ability of IL-23 to enhance proliferation or survival of $T_H17$ cells. Cua and Kastelein (2006) *Nat. Immunol.* 7:557-559. The inhibitory activity of engineered anti-IL-23p19 antibodies will be useful in the treatment of inflammatory, autoimmune, and proliferative disorders. Examples of such disorders are described in PCT patent application publications WO 04/081190; WO 04/071517; WO 00/53631; and WO 01/18051.

The high concentration solution formulations of the present invention are useful, for example, for storage and delivery of anti-IL-23p19 antibody hum13B8-b for use in treatment or prevention of a disorder associated with elevated activity of IL-23 or IL-23p19, such as Th17-mediated diseases, autoimmune or chronic inflammatory disorders, or cancers.

IV. Solution Formulations of Humanized Anti-IL-23p19 Antibody 13B8-b

The present invention provides high concentration solution formulations of anti-IL-23p19 antibody hum13B8-b, which comprises two identical light chains with the sequence of SEQ ID NO: 2 and two identical heavy chains with the sequence of SEQ ID NO: 1, and which is disclosed in co-pending, commonly assigned U.S. Pat. No. 8,293,883, the disclosure of which is hereby incorporated by reference in its entirety. The humanized light chain 13B8 sequence (with kappa constant region) is provided at SEQ ID NO: 2, and the light chain variable domain comprises residues 1-108 of that sequence. The humanized heavy chain 13B8 sequence (with γ1 constant region) is provided at SEQ ID NO: 1, and the heavy chain variable domain comprises residues 1-116 of that sequence.

Heavy and light chain sequences (SEQ ID NOs: 1 and 2) are provided without signal sequences. Exemplary heavy and light chain signal sequences are provided at SEQ ID NOs: 12 and 13, respectively. The signal sequences, or nucleic acid sequences encoding the signal sequences, may be appended to the N-terminus of the respective antibody chains to create a precursor protein for secretion from a host cell. Alternative signal sequences may also be used, and several can be found at "SPdb: a Signal Peptide Database." Choo et al. (2005) *BMC Bioinformatics* 6:249.

A hybridoma expressing parental antibody 13B8 was deposited pursuant to the Budapest Treaty with American Type Culture Collection (ATCC—Manassas, Virginia, USA) on Aug. 17, 2006 under Accession Number PTA-7803. The relationship between parental antibody 13B8 and hum13B8-b is detailed in commonly assigned U.S. Pat. No. 8,293,883.

Solution formulations of the present invention were developed using at least eight different lots of antibody 13B8-b prepared from Chinese hamster ovary (CHO) cells in culture, at 500-2000 L scale.

A range of initial solution conditions was considered for the solution formulation of the present invention. Experiments were done with various buffers, such as acetate, citrate, histidine, TRIS and phosphate, at pHs ranging from 4.0 to 8.8. Excipients, such as sucrose, trehalose, and mannitol, were tested, as were various concentrations (and thus ionic strengths) of NaCl, and the inclusion of the surfactant polysorbate 80. Formulations were screened based on opalescence by determining the O.D. at 350 nm. Aggregation was measured by high-performance size exclusion chromatography (HP-SEC), dynamic light scattering (DLS) and analytical ultracentrifugation (AUC). Biochemical stability was measured by high-performance ion exchange chromatography (HP-IEX), and thermal stability was measured by differential scanning calorimetry (DSC).

Figure 1A:
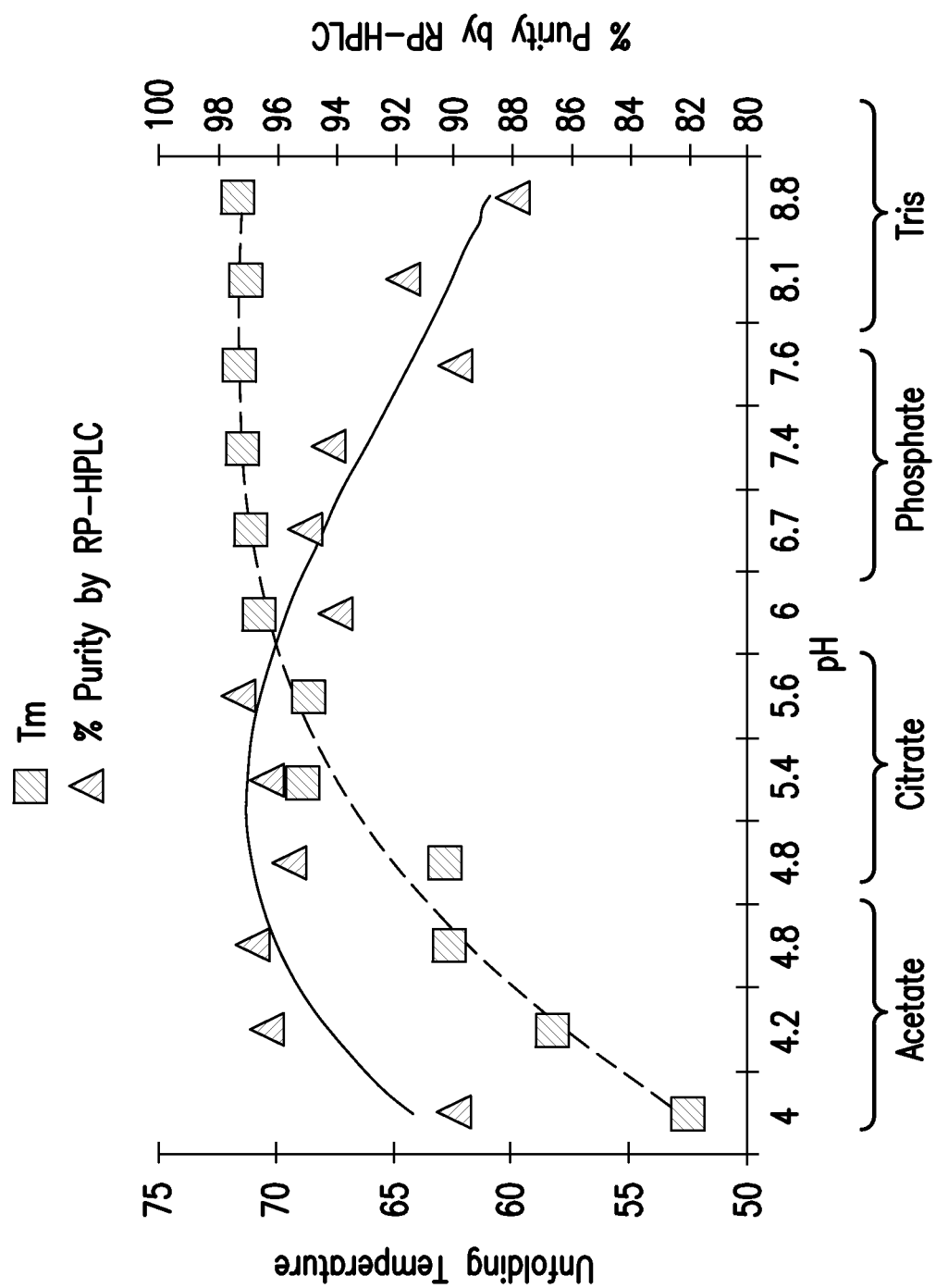
FIG. 1A shows unfolding temperature, as determined by differential scanning calorimetry (DSC), and percent purity, as measured by RP-HPLC, for various 1 mg/mL antibody formulations.
Figure 1B:
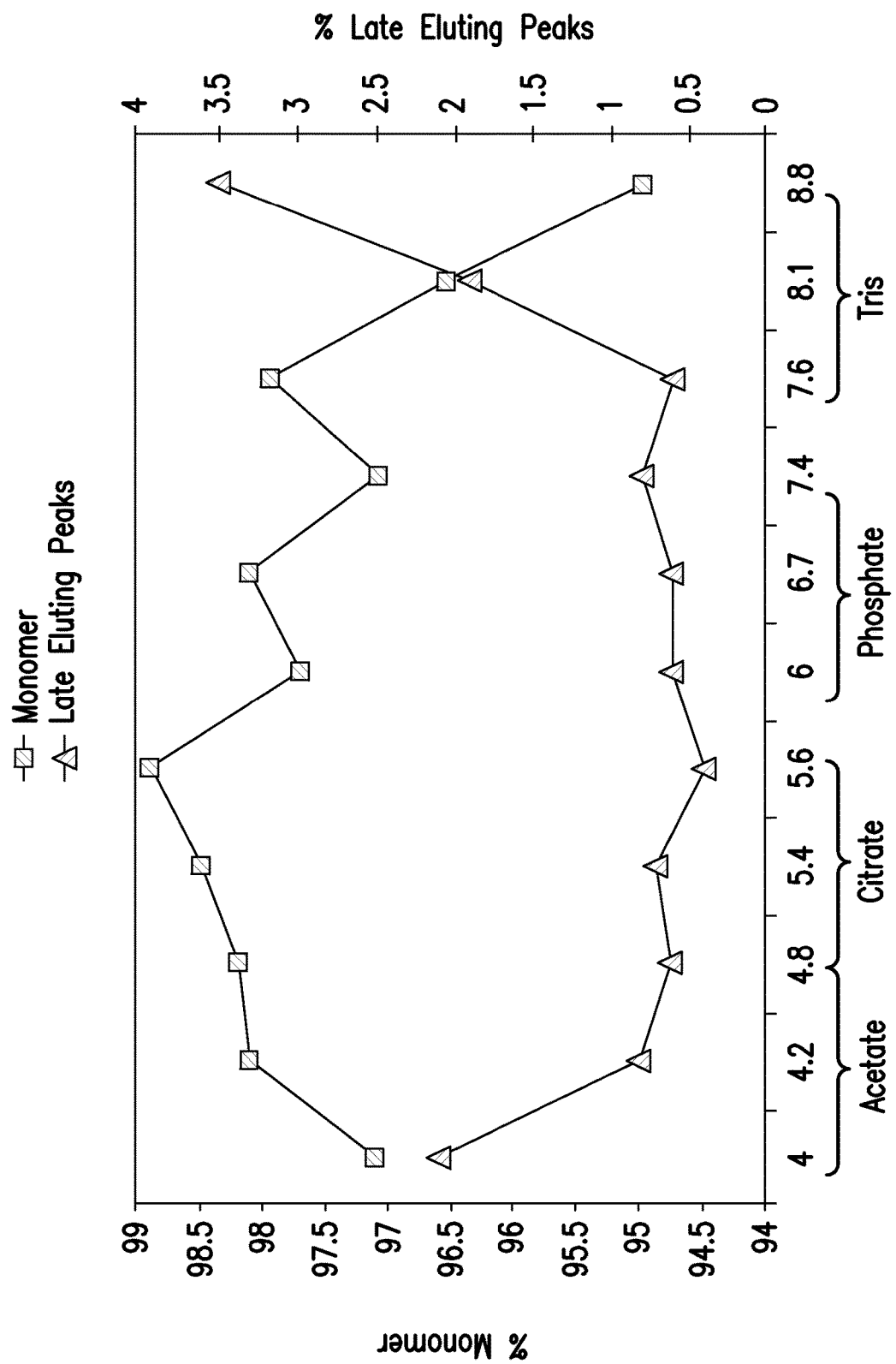
FIG. 1B shows percent monomer and percent late-eluting peaks, as measured by HP-SEC, as a function of pH for several different buffers (acetate, citrate, phosphate and Tris). Brief discussions of DSC and HP-SEC are provided Examples 2 and 3, respectively.
Figure 1C:
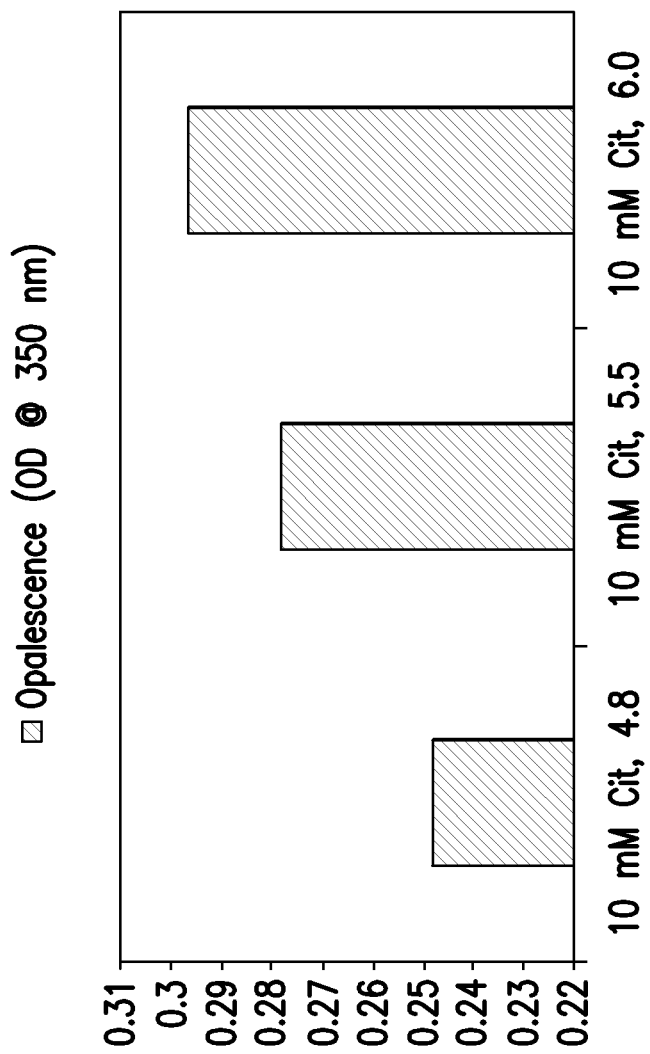
FIGS. 1C-1E show various properties of 10 mM citrate formulations as a function of pH, including opalescence ($OD_{350}$), hydrodynamic size (nm) distribution, as measured by dynamic light scattering (DLS), and melting temperature, as determined by DSC, respectively. Brief discussions of DLS and DSC are provided Examples 4 and 2, respectively.
Figure 1D:
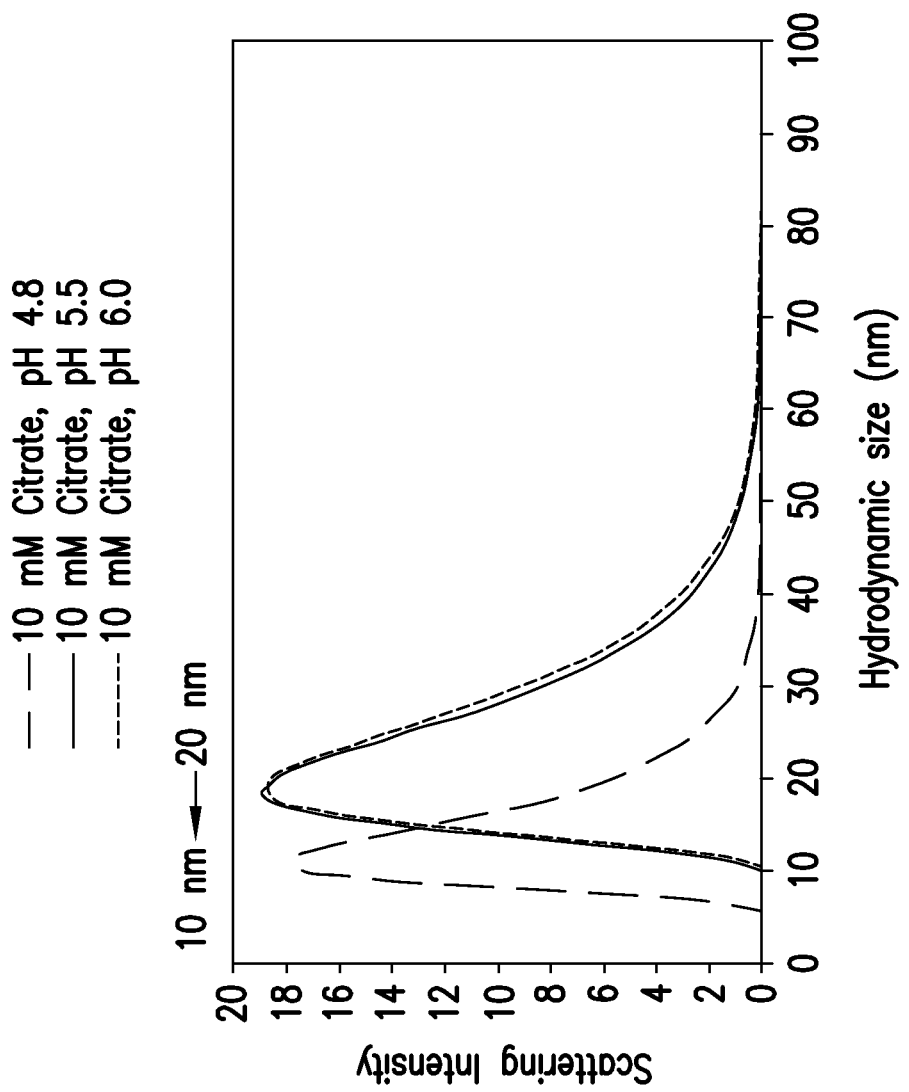
Figure 1E:
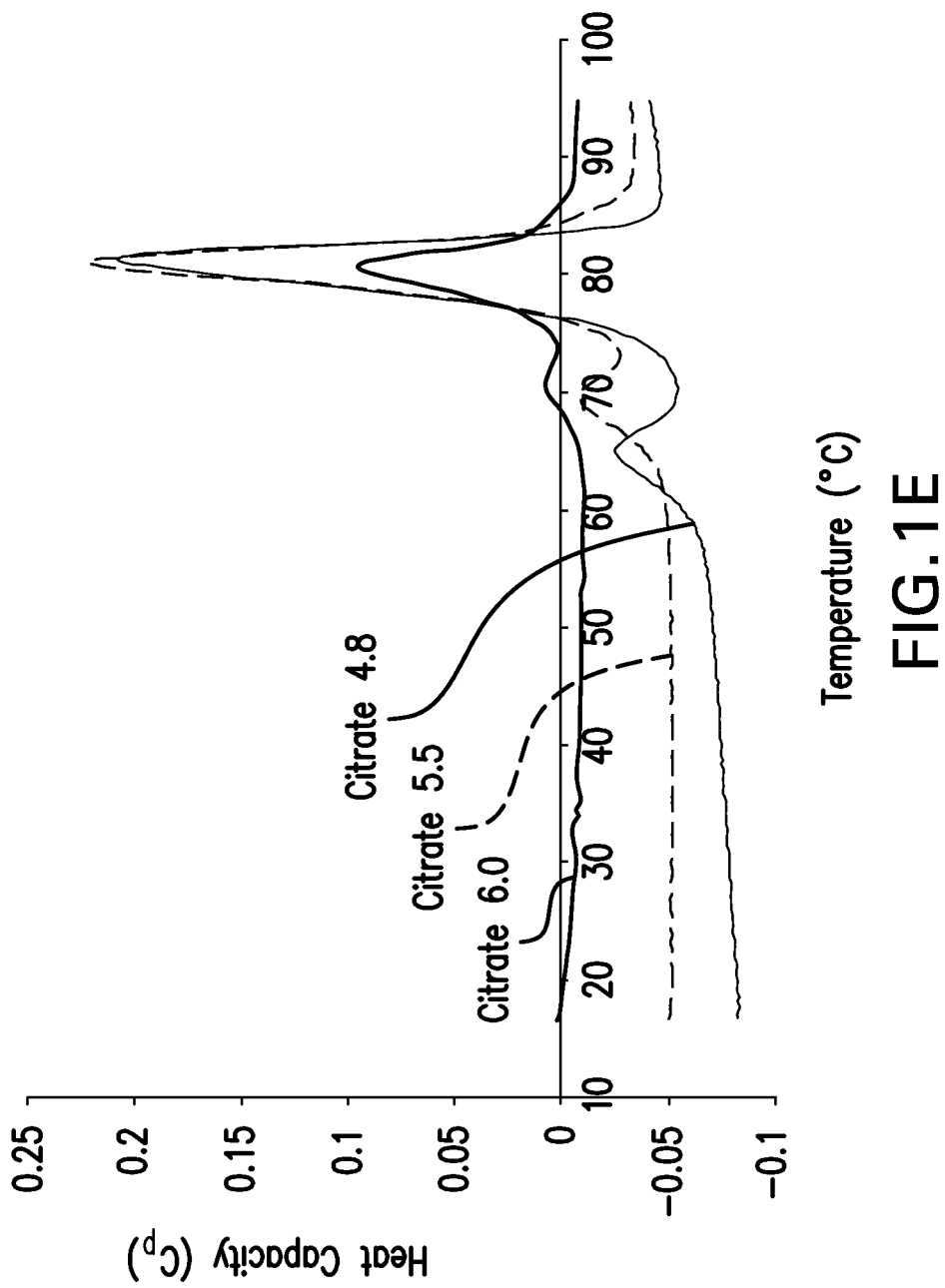
Figure 1F:
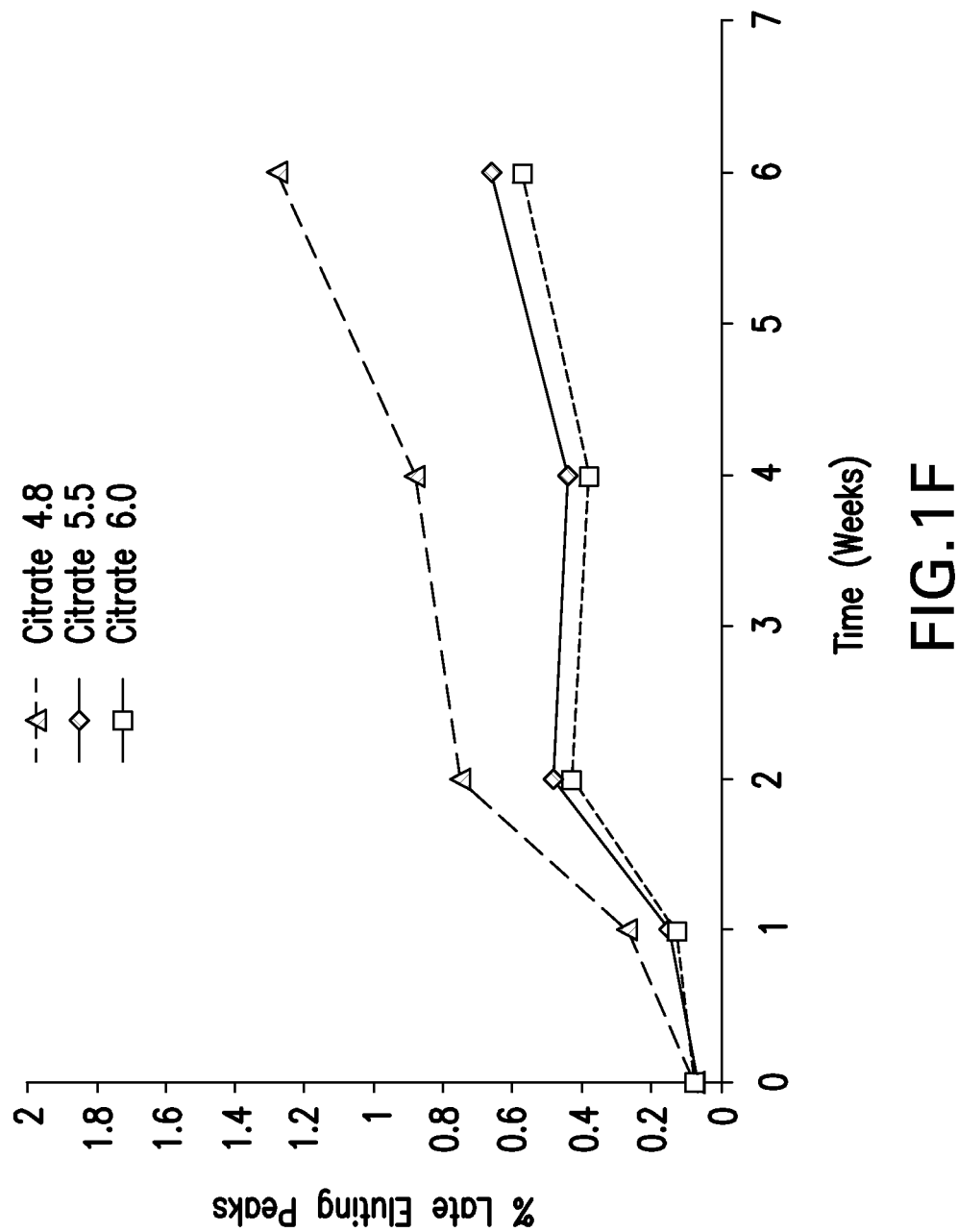
FIGS. 1F and 1G show percentage of late eluting peaks, and percentage of main peak, respectively, over time, as determined by high performance ion exchange chromatography (HP-IEX). A brief discussion of HP-IEX is provided Example 5.
Figure 1G:
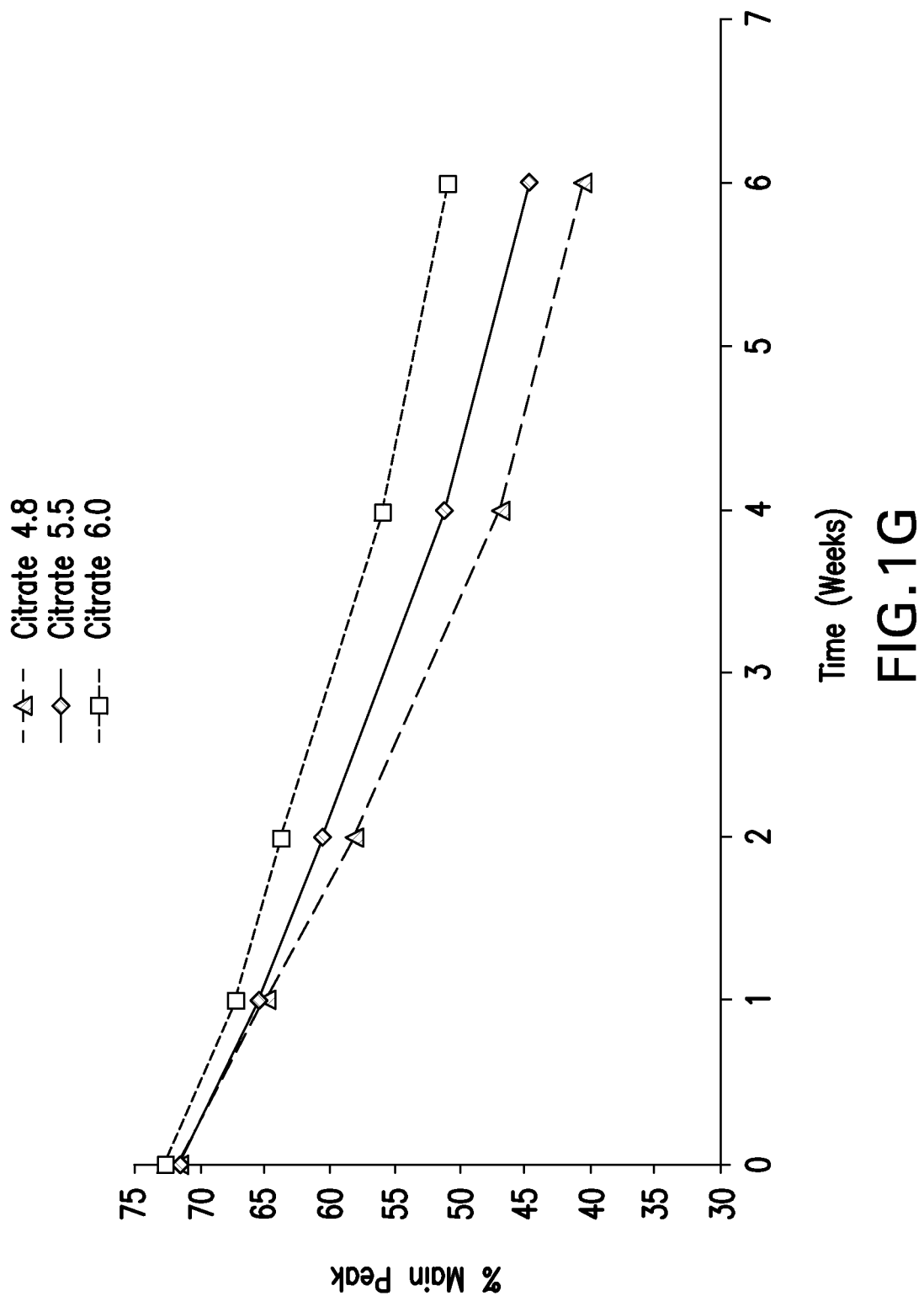

Initial pre-formulation experiments at 1 mg/mL hum13B8-b revealed that the percent purity, as measured by reverse phase high performance liquid chromatography (RP-HPLC), increased up to about pH 6.0 and then remained steady up to pH 8.8. See FIG. 1A. However, the unfolding temperature of the antibody peaked around pH 5. See FIG. 1A. Comparison of buffer species between acetate, citrate, phosphate and TRIS showed that citrate buffer at pH 5.5 gave the highest percentage of monomer, and the lowest percentage of late-eluting peaks. See FIG. 1B. Although optimal biochemical and biophysical stability were observed in citrate buffer at pH 5.5, concentration of antibody in citrate buffer to >65 mg/mL antibody gave rise to substantial opalescence (data not shown). Opalescence is undesirable due to the potential for decreased patient acceptance, which is of particular concern for a drug that may be formulated for self-administration. Although this opalescence was reversible upon dilution and lowering the pH to 4.8 in citrate buffer (FIG. 1C), and lowering the pH also lowered the hydrodynamic diameter (FIG. 1D), lowering the pH also decreased the thermal and biochemical stability of the solution, as reflected by an increased proportion of low-melting forms (FIG. 1E), increased accumulation of late-eluting peaks over time, as measured by HP-SEC (FIG. 1F), and a decrease in main peak over time, as measured by HP-IEX (FIG. 1G).

Figure 1H:
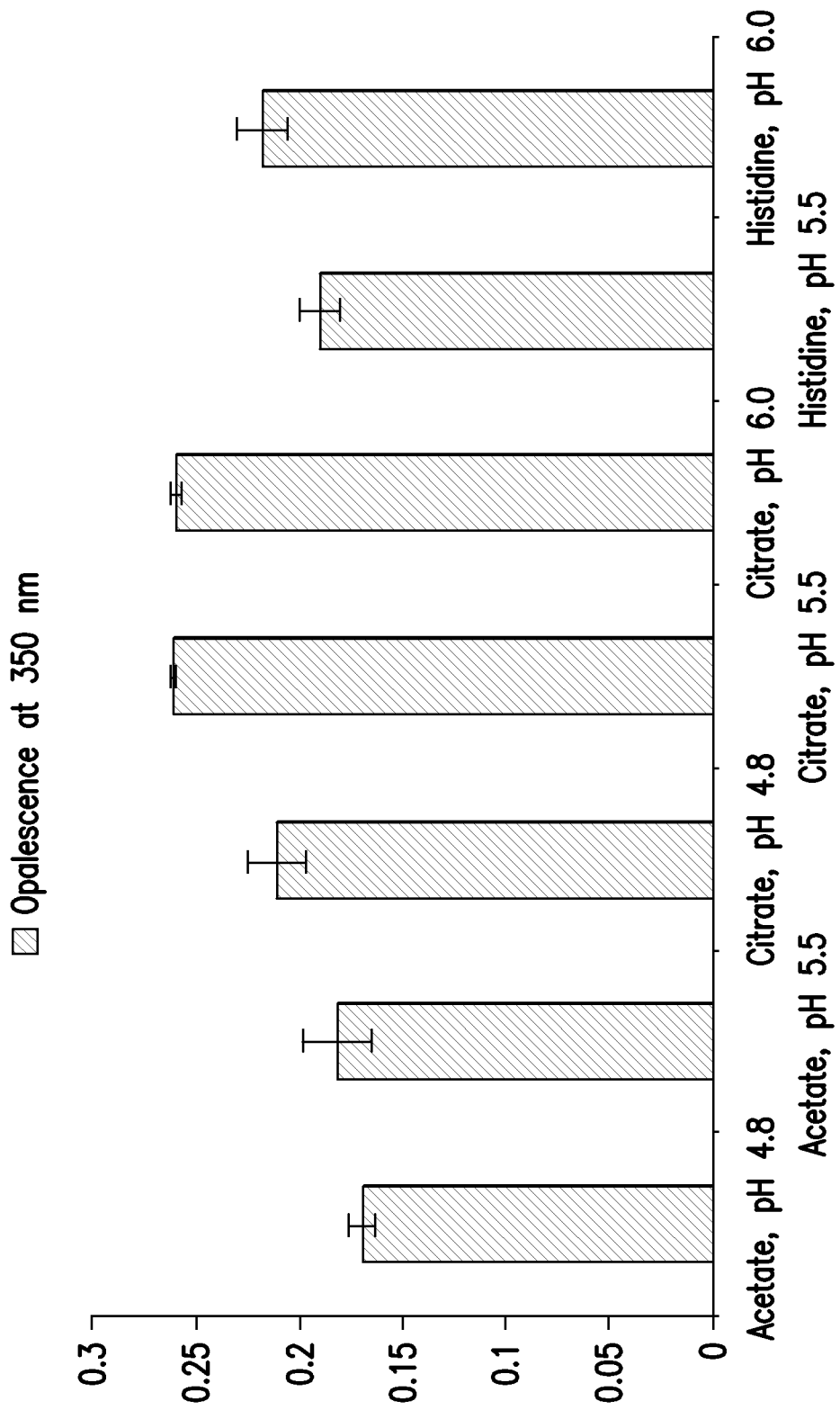
Figure 1I:
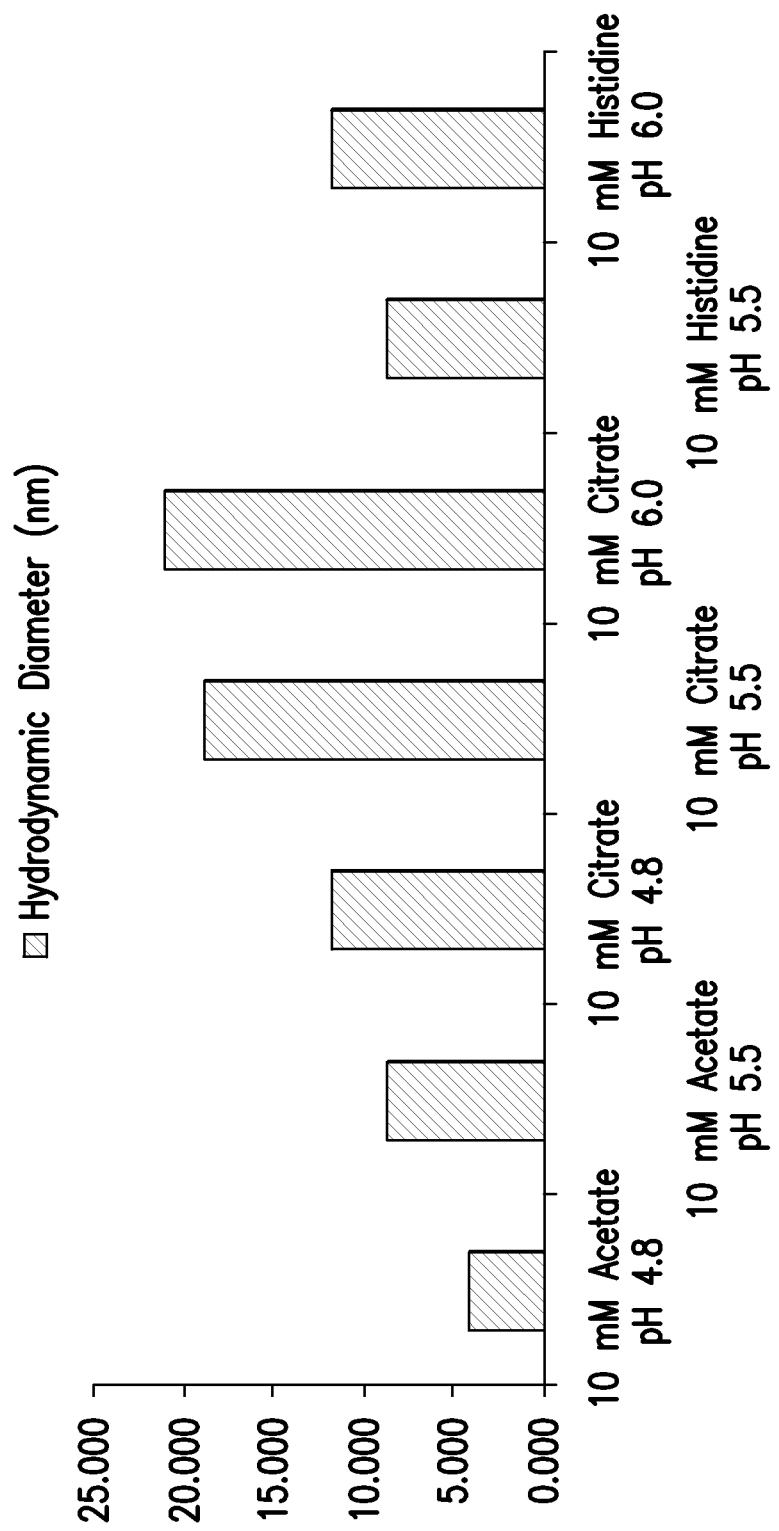
Figure 1J:
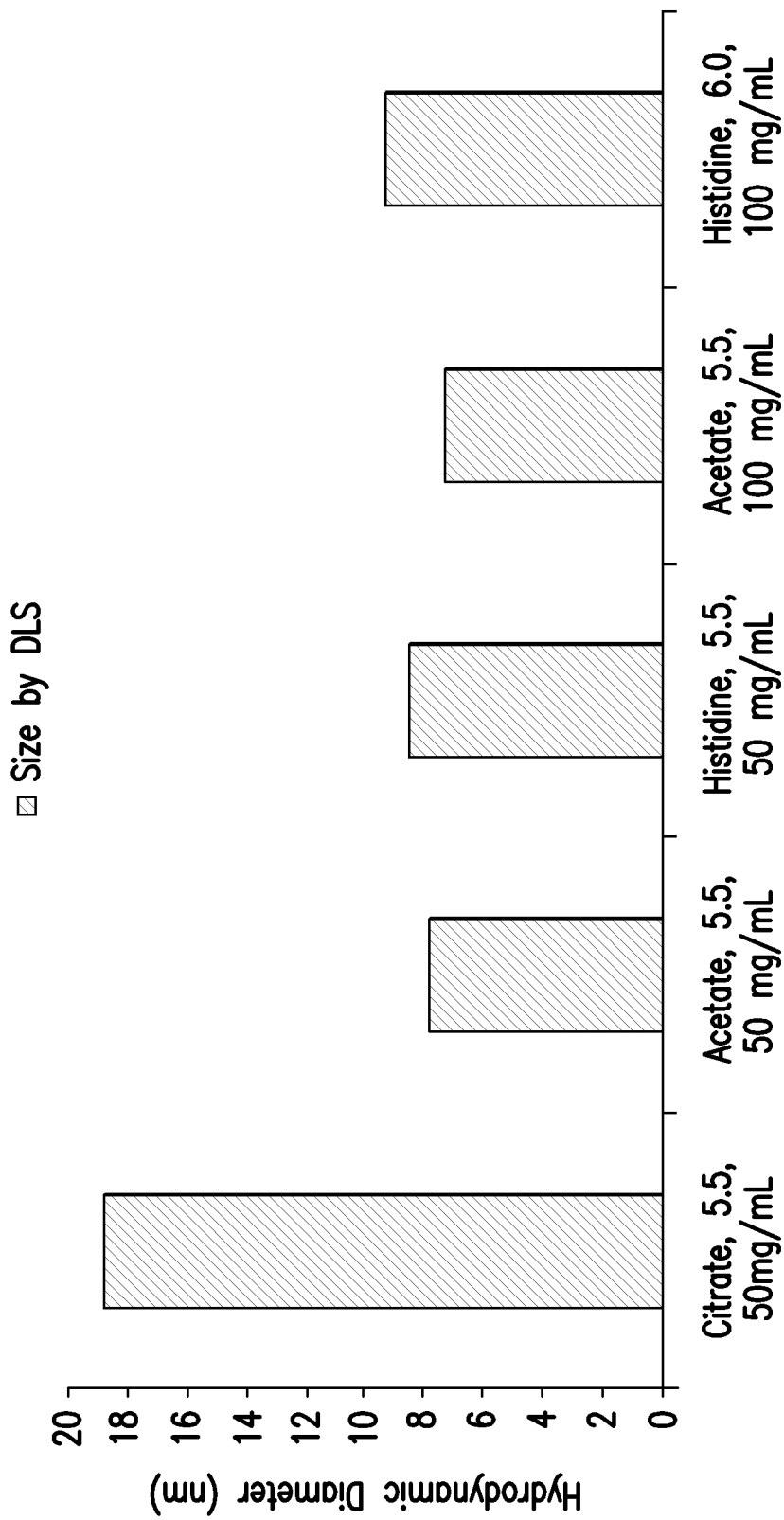
FIG. 1J shows the hydrodynamic size (nm) distribution for more concentrated antibody formulations (50 and 100 mg/ml), as determined by DLS. A brief discussion of DLS is provided Example 4.
Figure 1K:
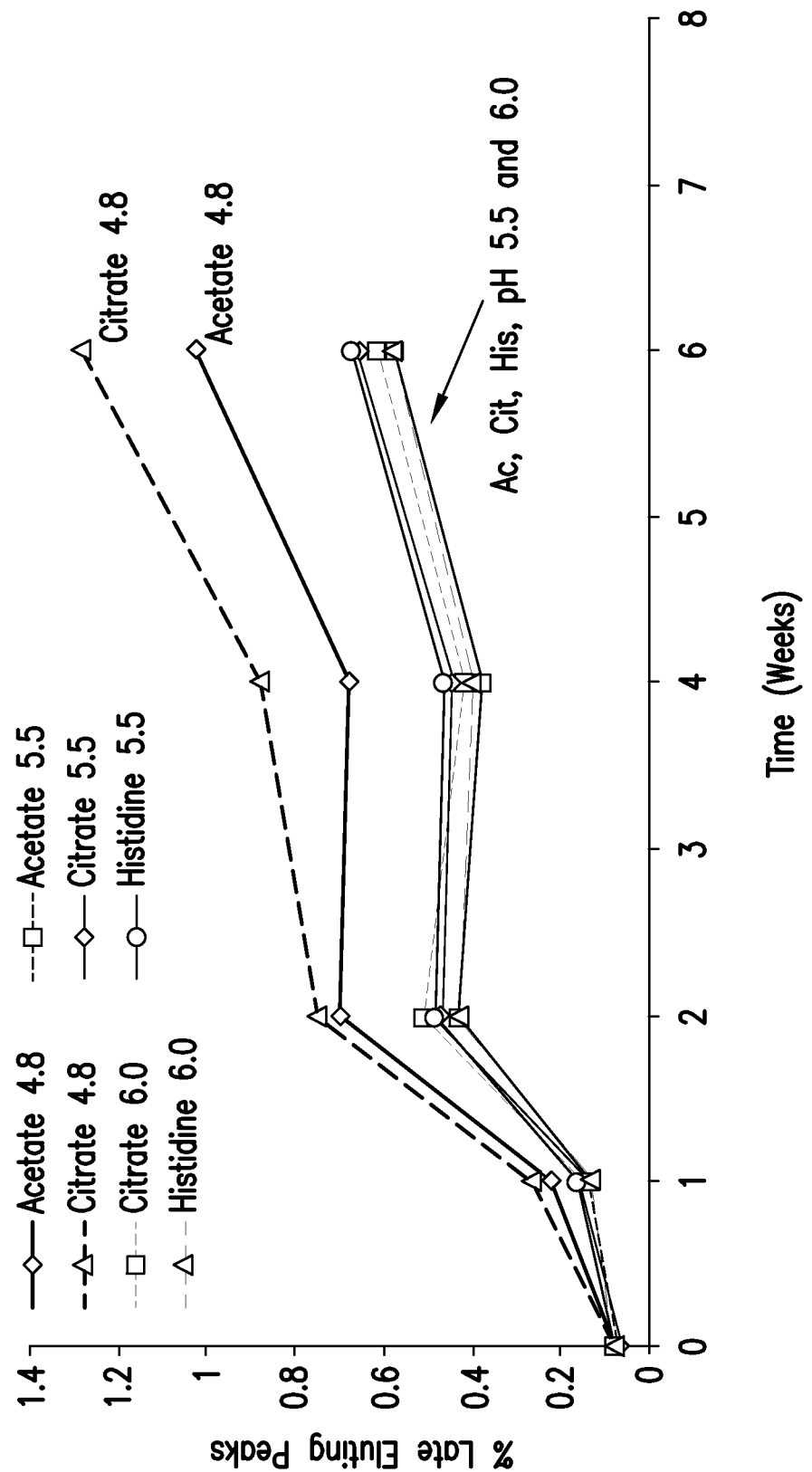
FIG. 1K shows the percentage of late eluting peaks in various buffers at different pHs over time, as determined by HP-SEC. A brief discussion of HP-SEC is provided Example 3.

Histidine was then considered as an alternative buffer system in an attempt to decrease opalescence and self-association without decreasing thermal and biochemical stability. Samples were prepared in 10 mM acetate (pH 4.8 and 5.6), 10 mM citrate (pH 4.8, 5.5 and 6.0), and 10 mM histidine (pH 5.5 and 6.0). Opalescence and hydrodynamic diameter were determined by $OD_{350}$ and DLS, respectively. See FIGS. 1H and 1I. Replacement of citrate with either acetate or histidine minimized opalescence and decreased self-association without compromising biochemical stability. At higher antibody concentrations (50 to 100 mg/mL), acetate (pH 5.5) and histidine (pH 6.0) formulations were clear and did not have the increased hydrodynamic size that had been observed with citrate (pH 5.5). See FIG. 1J. Low pH (4.8) citrate and acetate formulations also led to increased accumulation of late-eluting peaks during storage under RH4 conditions (40° C., 75% relative humidity), as measured by size exclusion chromatography (SEC). See FIG. 1K.

Figure 2A:
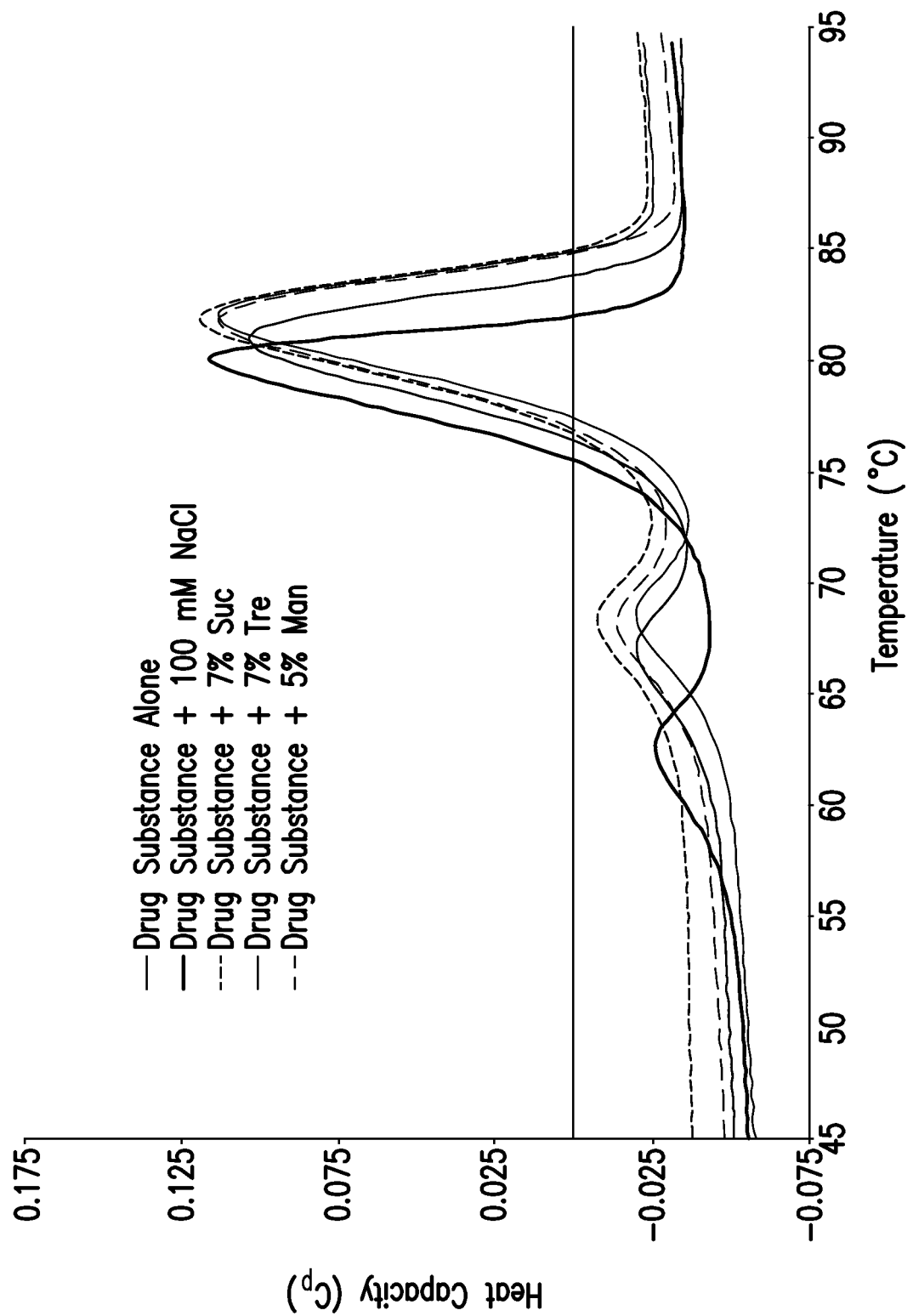
FIGS. 2A and 2B show the unfolding temperature, as determined by DSC, and changes in opalescence, respectively, for formulations of hum13B8-b containing various excipients (100 mM NaCl, 7% sucrose, 7% trehalose and 6% mannitol). DS refers to drug substance. A brief discussion of DSC is provided Example 2.
Figure 2B:
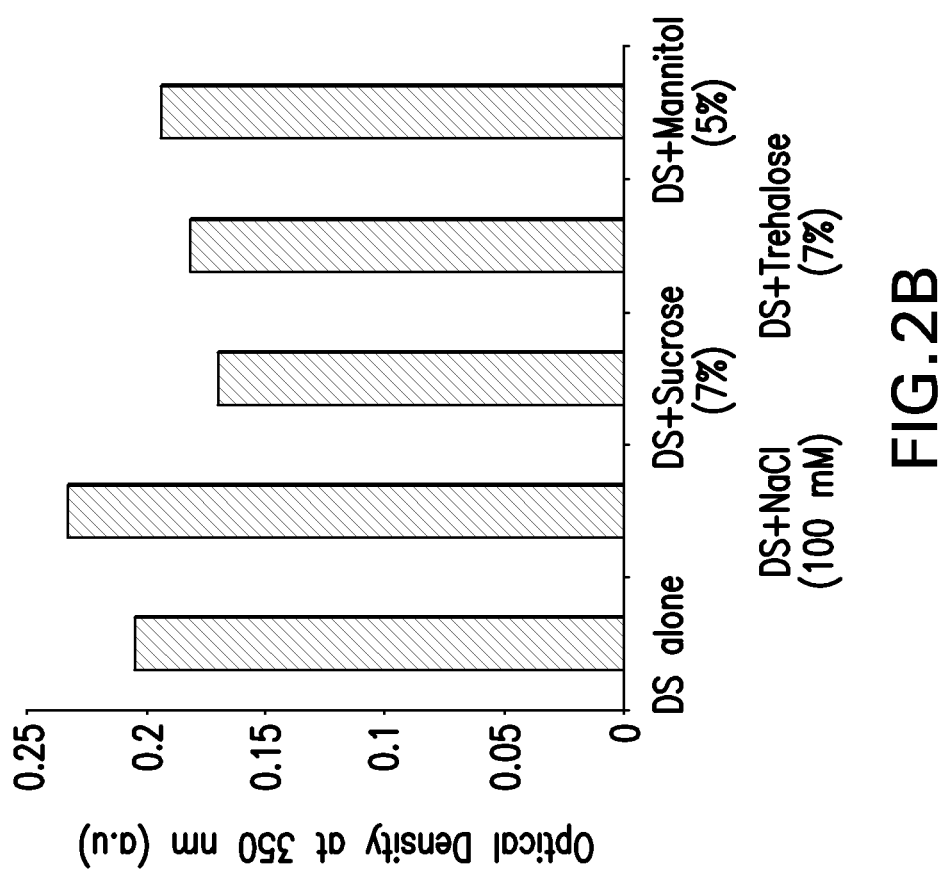
Figure 3A:
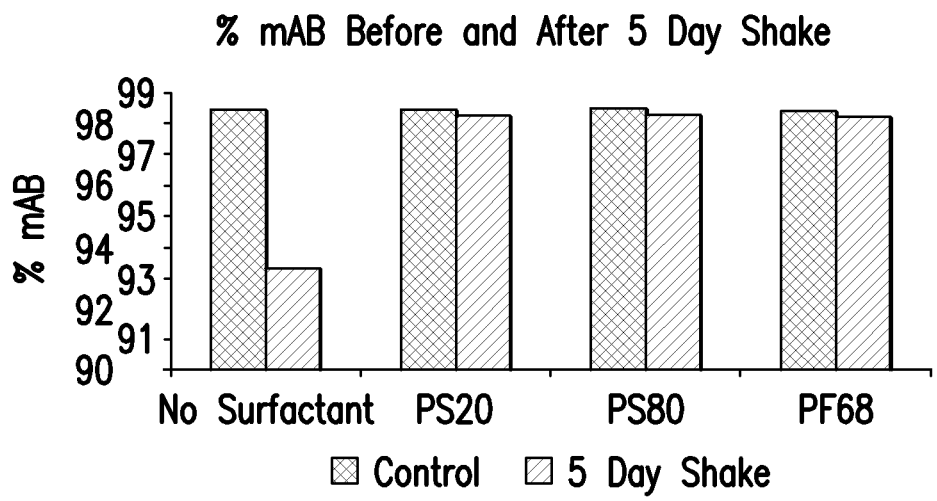
FIGS. 3A and 3B show percent antibody and percent early eluting peaks, as determined by HP-SEC, respectively.
Figure 3B:
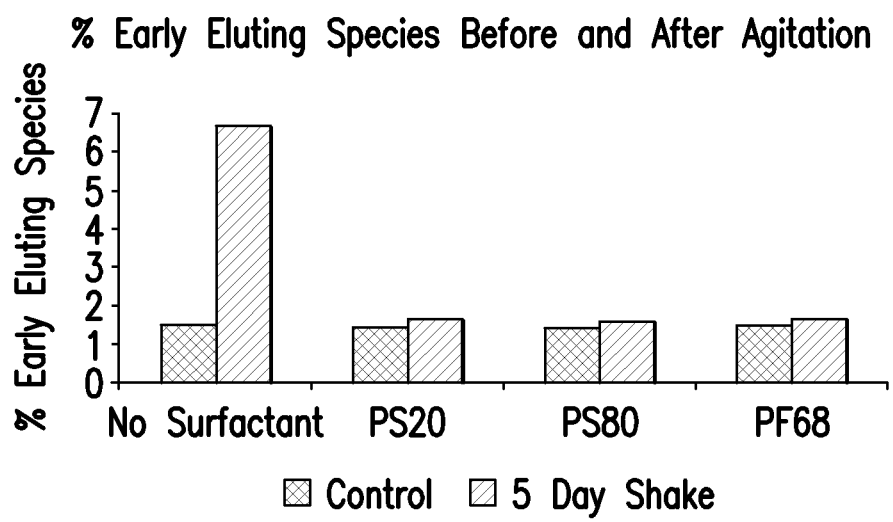
Figure 3C:
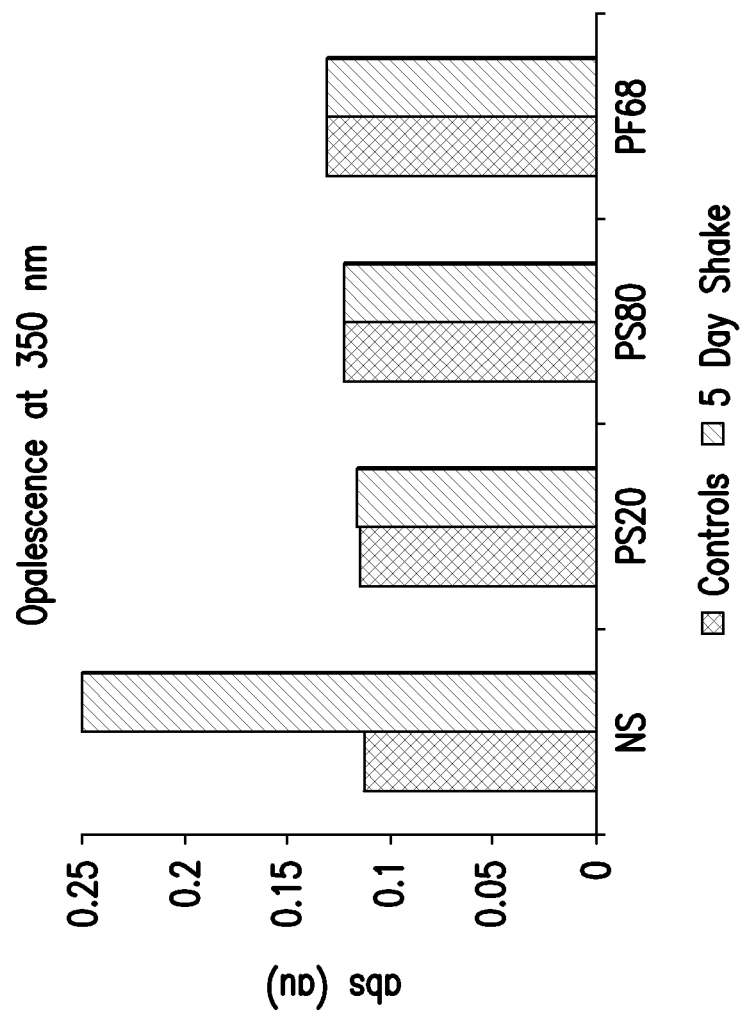
FIG. 3C shows opalescence, before and after five days of shaking, as a function of the presence or absence of surfactant (0.05% polysorbate 20, 0.05% polysorbate 80, or Pluronic F-68). The 5 Day Shake value for the no surfactant (NS) sample is actually over 3, and thus well off-scale. A brief discussion of HP-SEC is provided Example 3.

Various excipients (100 mM NaCl, 7% sucrose, 7% trehalose and 6% mannitol) were also tested for their effects on unfolding temperature (FIG. 2A) and opalescence (FIG. 2B). Seven percent sucrose was added to render formulations isotonic, to decrease opalescence, and to increase thermal stability (increase $T_m$). The surfactants polysorbate-20 (PS20), polysorbate-80 (PS80) and PLURONIC® F-68 were also tested for their effects on aggregation (FIGS. 3A and 3B) and opalescence (FIG. 3C). Polysorbate 80 was added to minimize aggregation due to agitation-induced stress.

These results led to a change in preferred buffer system. Anti IL-23 had exhibited self-association and opalescence at high concentrations in citrate pH 5.5 and pH 6.0. Replacing citrate with acetate (pH 5.5) or histidine (pH 6.0) minimized opalescence without compromising thermal and biochemical stability. Sucrose (7%) was added to render the formulations isotonic. Sucrose (7%) also decreased opalescence and increased thermal stability (increased Tm) and decreased percentage loss in monomer during accelerated stability studies (data not shown). Polysorbate 80 (0.05%) was added to minimize aggregation due to shaking stress.

A histidine based formulation comprising 10 mM histidine (pH 6.0), 7% sucrose and 0.05% PS-80 was selected as the preferred high concentration formulation of hum13B8-b. Various solution properties, including viscosity, density, osmolarity, and particulates, were determined for 10 mM histidine (pH 6.0) formulation. See Table 1. The observed room temperature viscosity (5.65 cP) is acceptable for use in prefilled syringes and autoinjectors.

TABLE 1

Solution Properties of Histidine Formulation

| Solution Property | Histidine (pH 6.0) |
|---|---|
| Viscosity (cP) | 5.65 (25° C.) |
| | 14.46 (5° C.) |
| Density (g/cm3) | 1.06 |
| Osmolality | 266 |
| Sub-visible Particles | 25 (>10 µm) |
| | 2 (>25 µm) |

V. Stability of High Concentration Solution Formulations of Humanized Anti-IL-23p19 Antibody 13B8-b Long term stability of the selected formulations of the present invention was studied after 3-24 months of storage under a variety of storage conditions. Samples were incubated in 2 ml glass vials (FIG. 4), in 30 ml bags (bulk storage) (FIGS. 5 and 6), or in pre-filled syringes (single-dose commercial packaging) (FIG. 7) at a variety of temperatures and humidity levels. Samples were analyzed for the presence of degradation and aggregation products by such methods as high-performance size exclusion chromatography (HP-SEC), ion exchange chromatography (HP-IEX), SDS capillary electrophoresis (CE-SDS, reducing and non-reducing), and peptide mapping. Antibody stability was measured by differential scanning calorimetry (DSC). Biological activity was assessed by IL-23 binding ELISA and a cell-based functional assay. Antibody concentration was determined by UV absorption at 280 nm. Opalescence was determined by measuring optical density at 350 nm ($OD_{350}$). Results are provided at FIGS. 4-7.

Figure 4C:
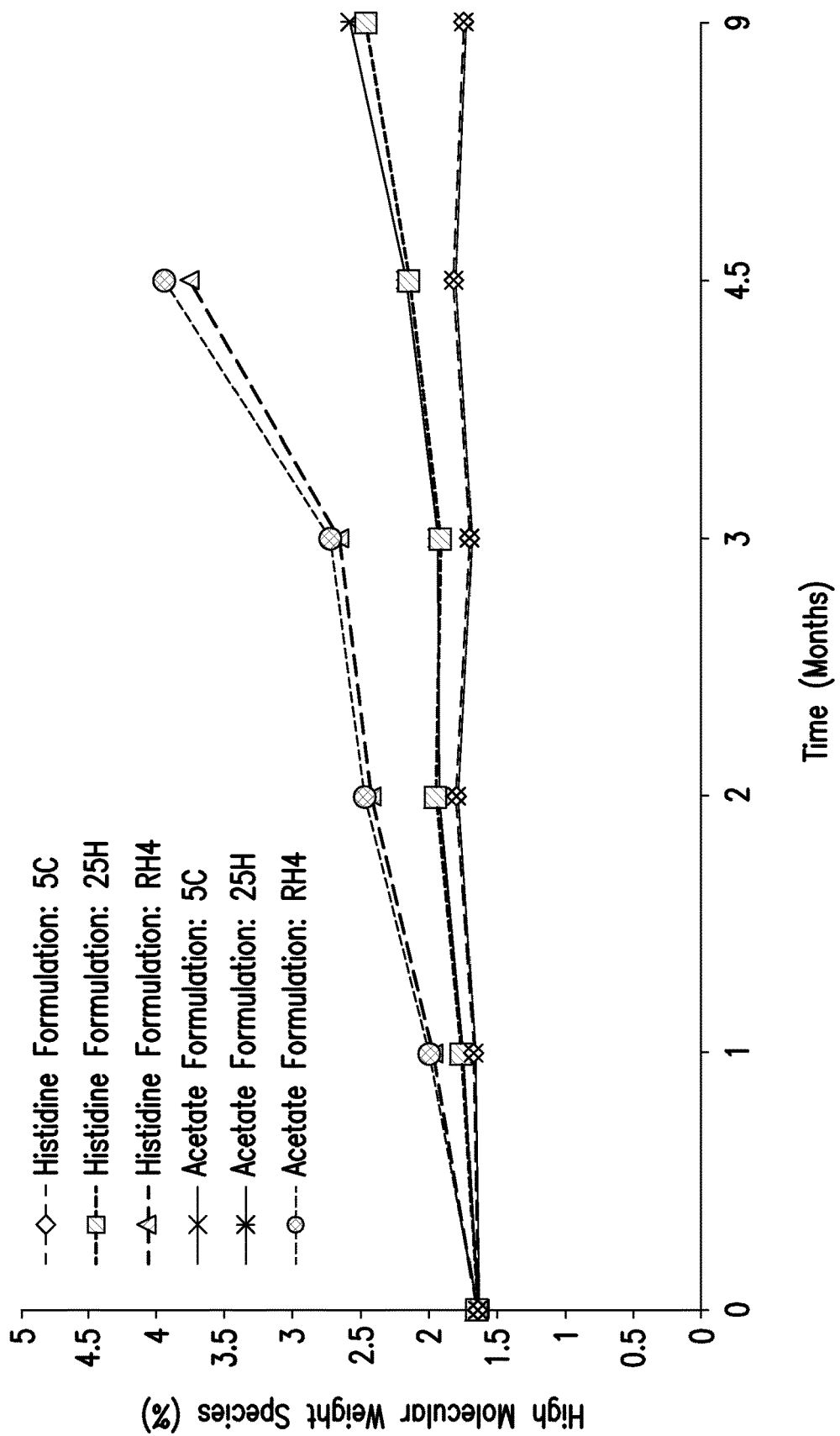
Figure 4D:
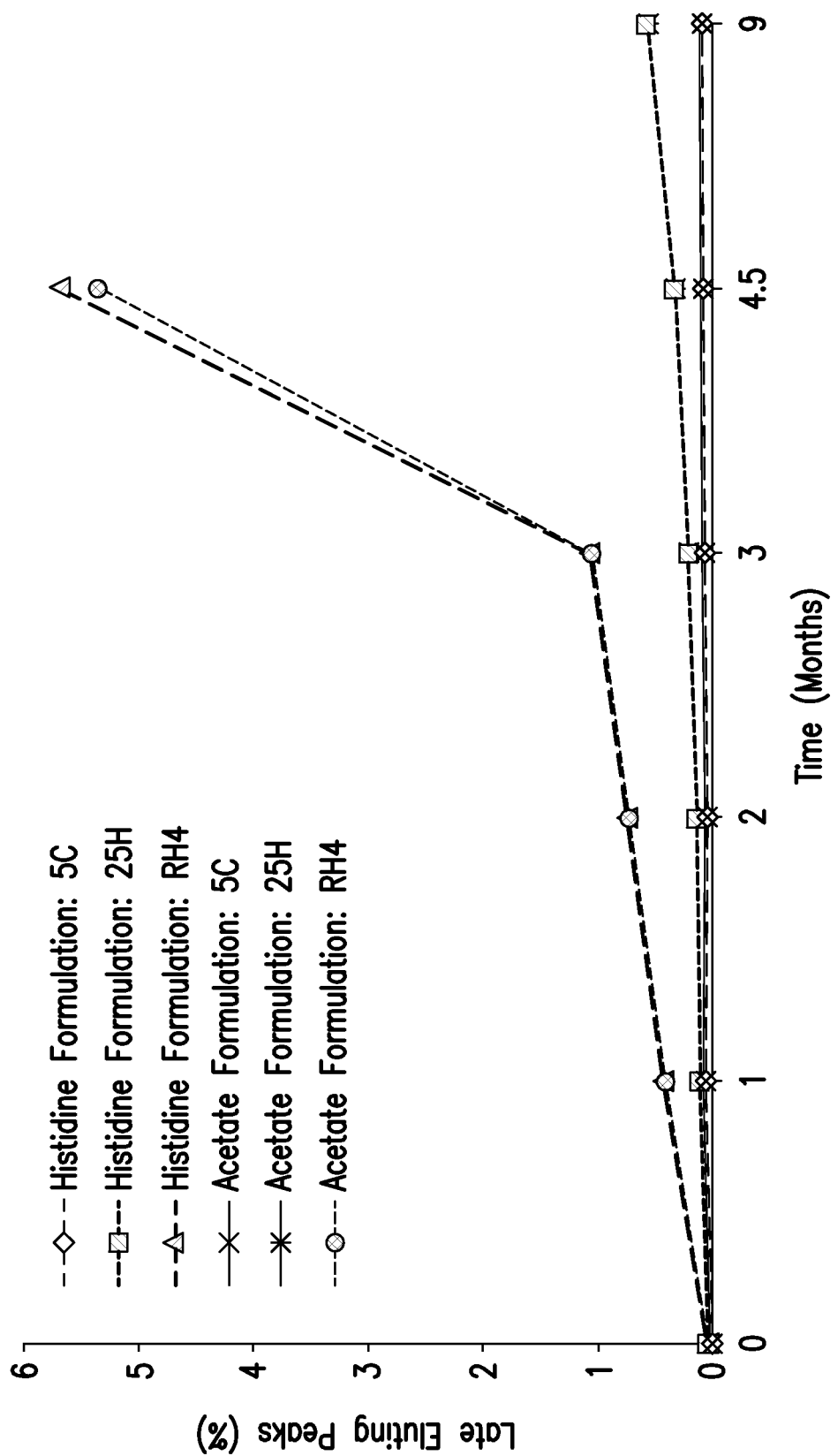
Figure 4E:
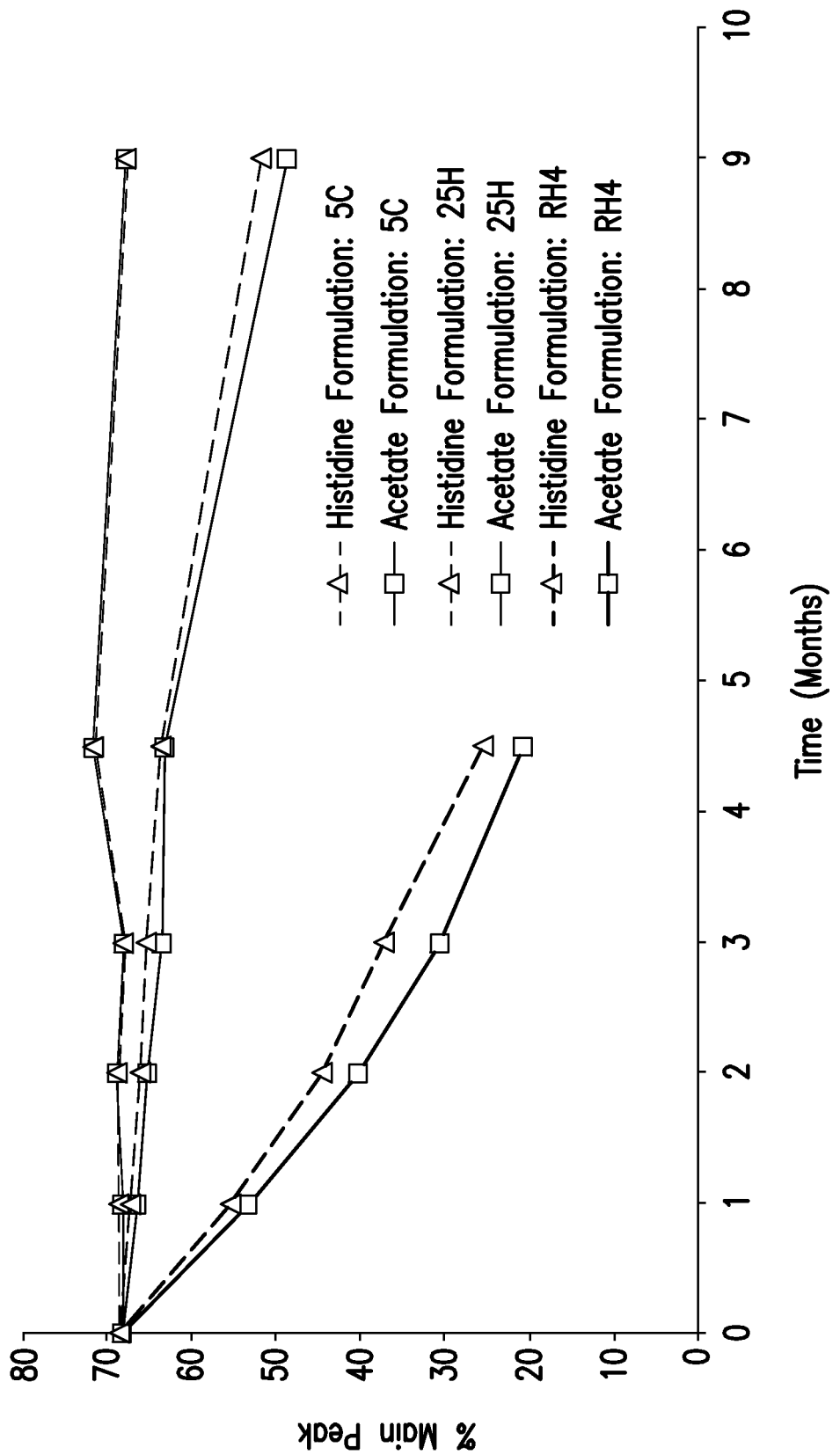
FIGS. 4E and 4F are plots of results of HP-IEX experiments that monitor antibody stability by measuring percentages of the main peak and acidic variants, respectively. A brief discussion of HP-IEX is provided Example 5.
Figure 4F:
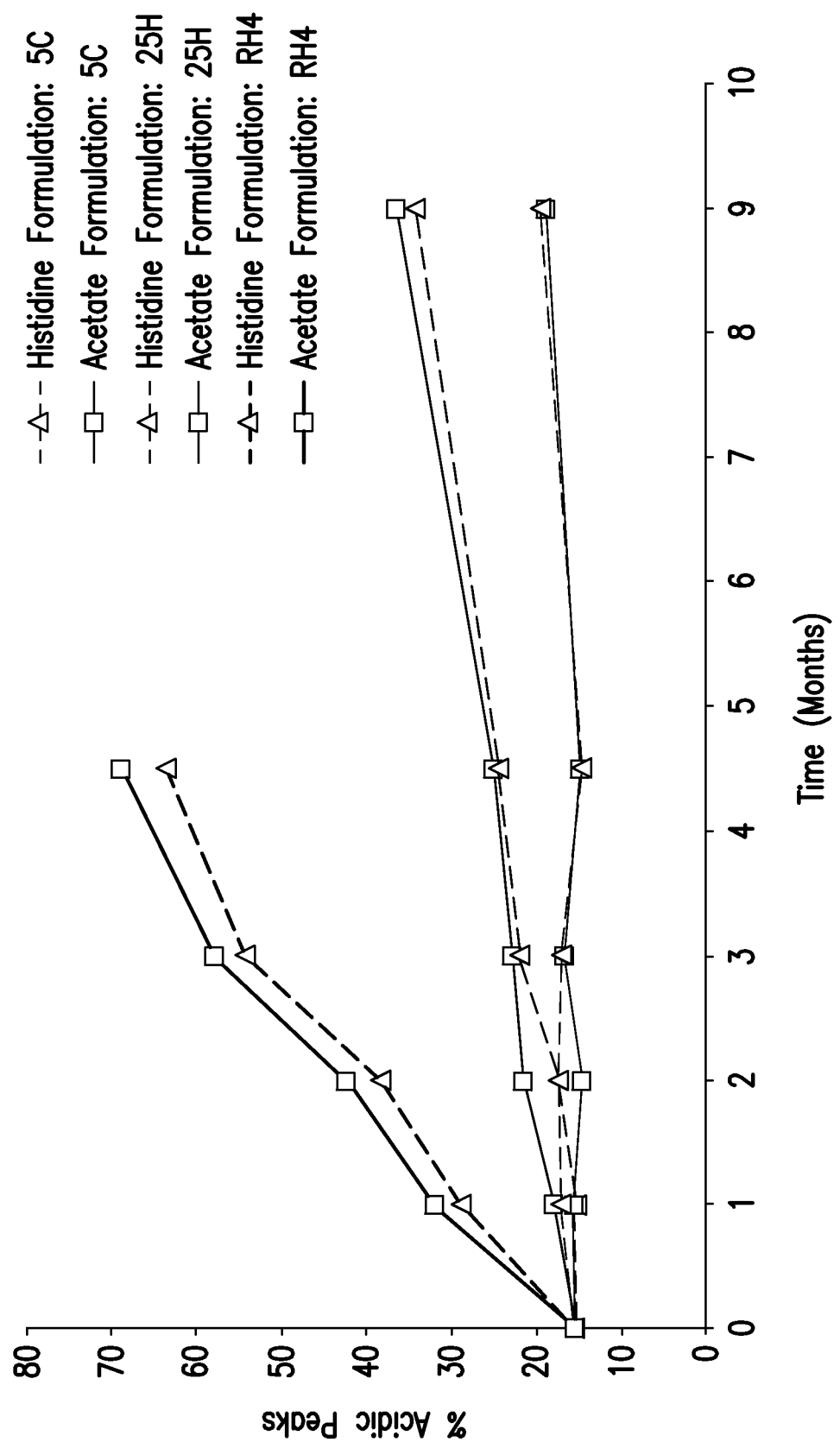
Figure 4G:
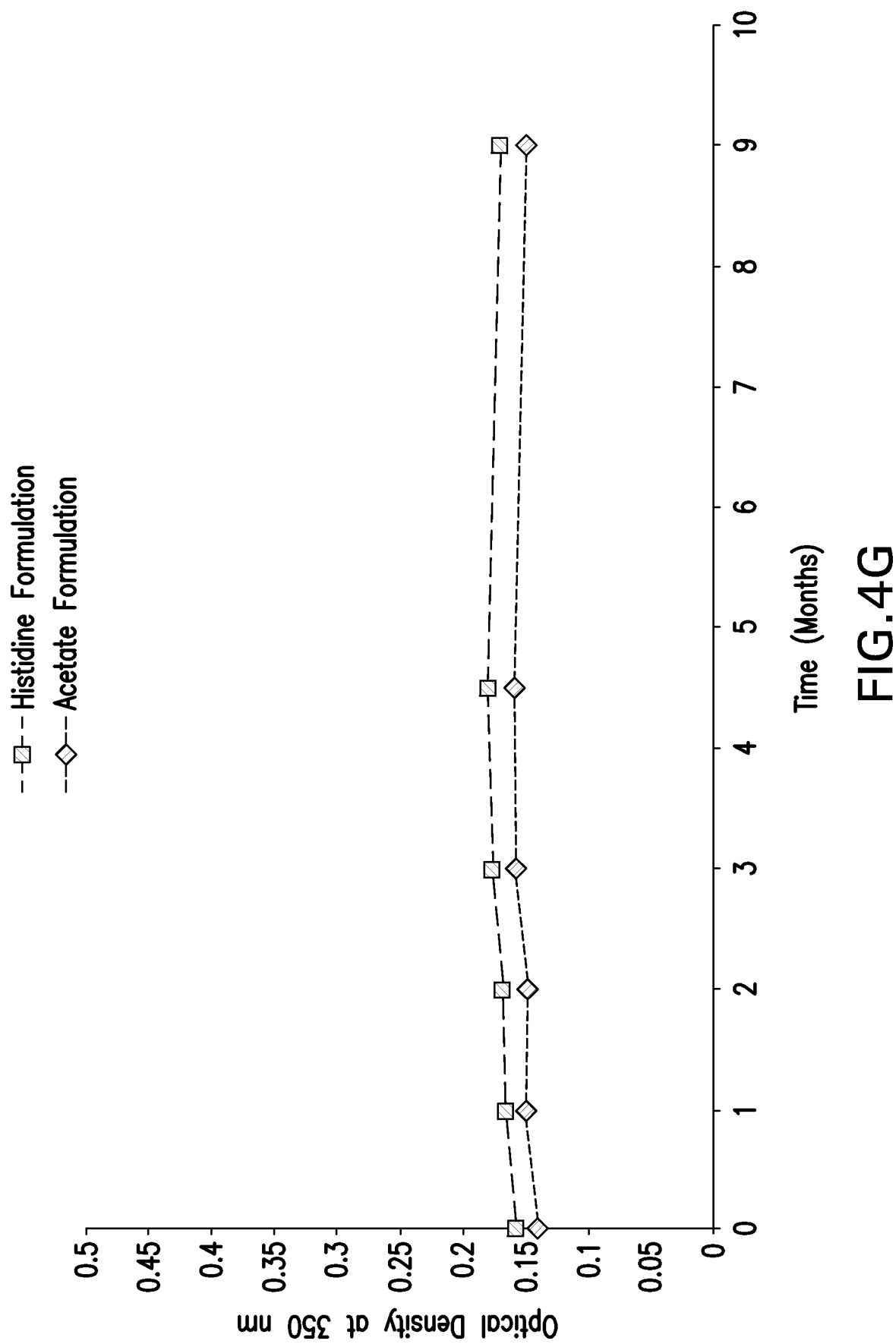
Figure 4I:
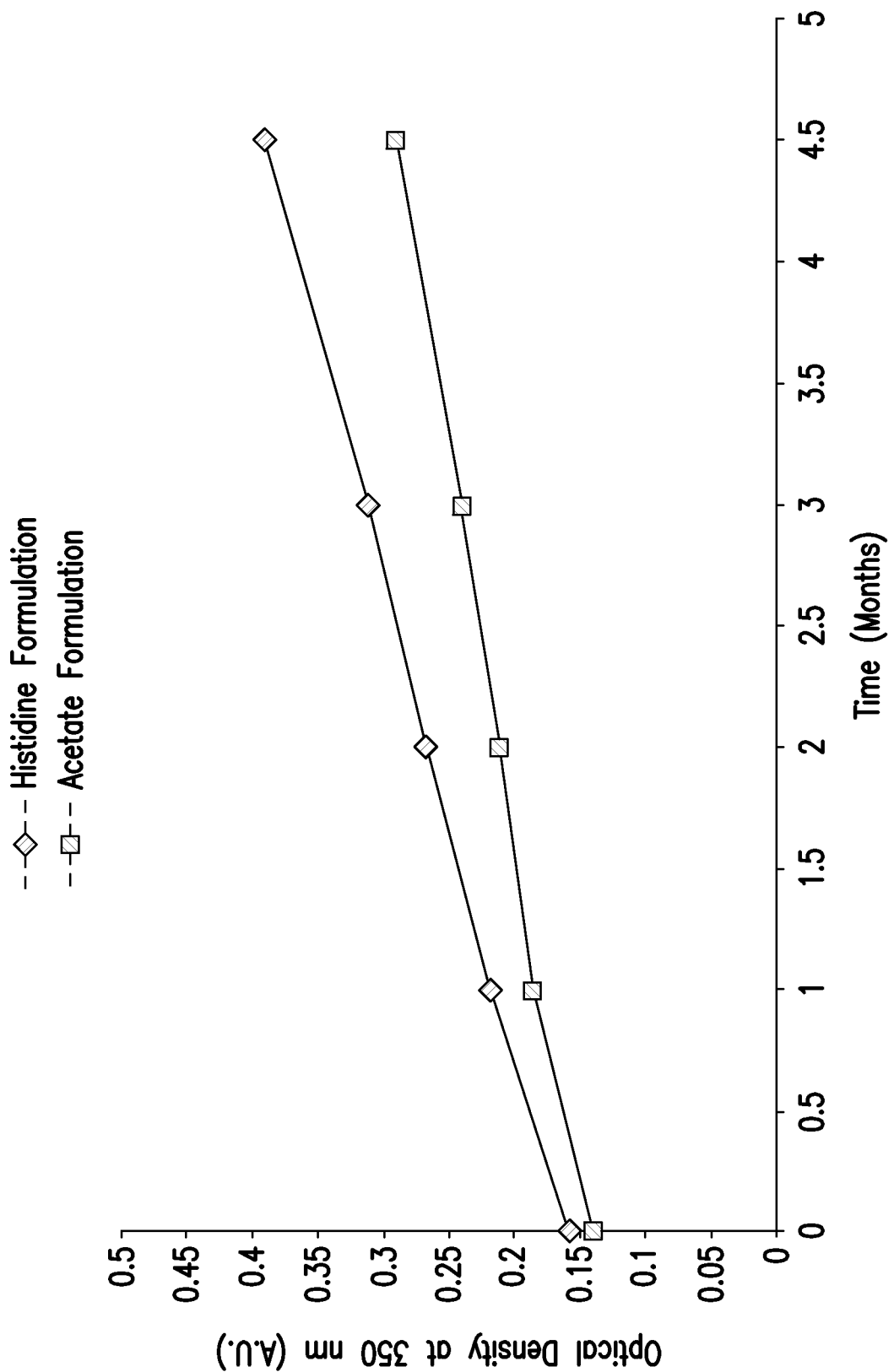
Figure 4J:
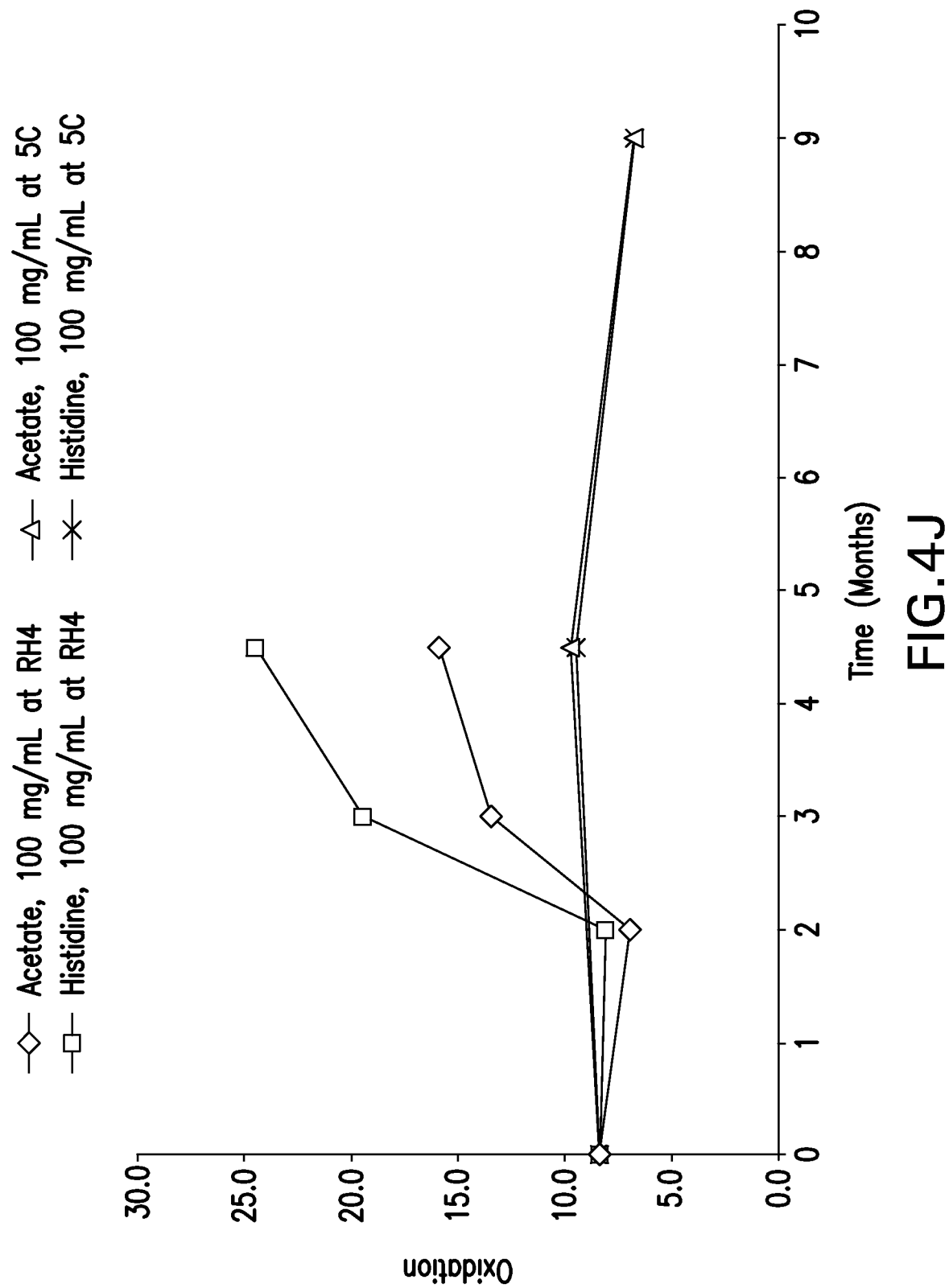
FIGS. 4J and 4K show oxidation, as measured by peptide mapping, after storage at RH4 (40° C., 75% relative humidity) and 5° C., and at 40° C. and 5° C., respectively. A brief discussion of peptide mapping is provided Example 6.
Figure 4K:
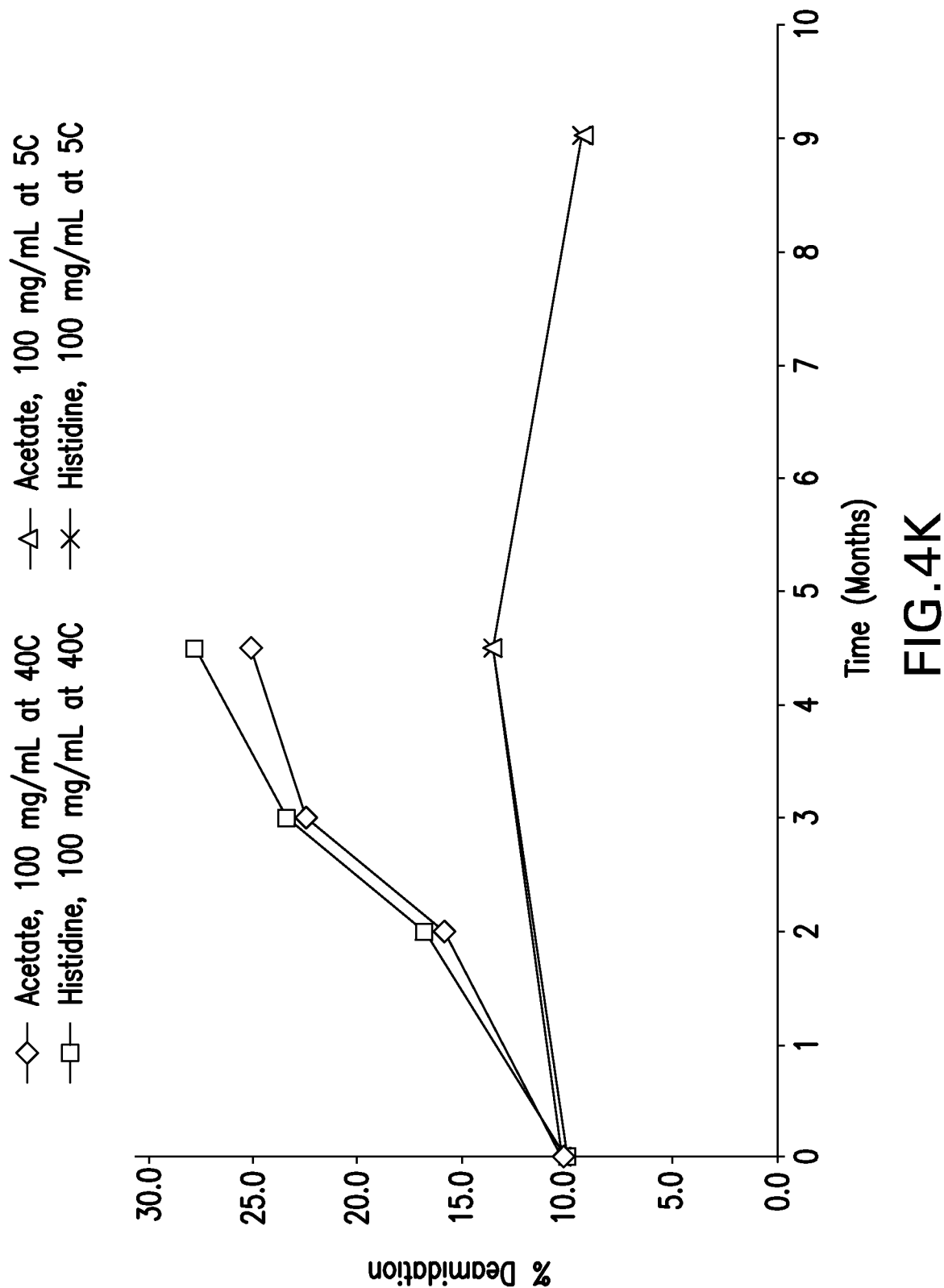
Figure 4L:
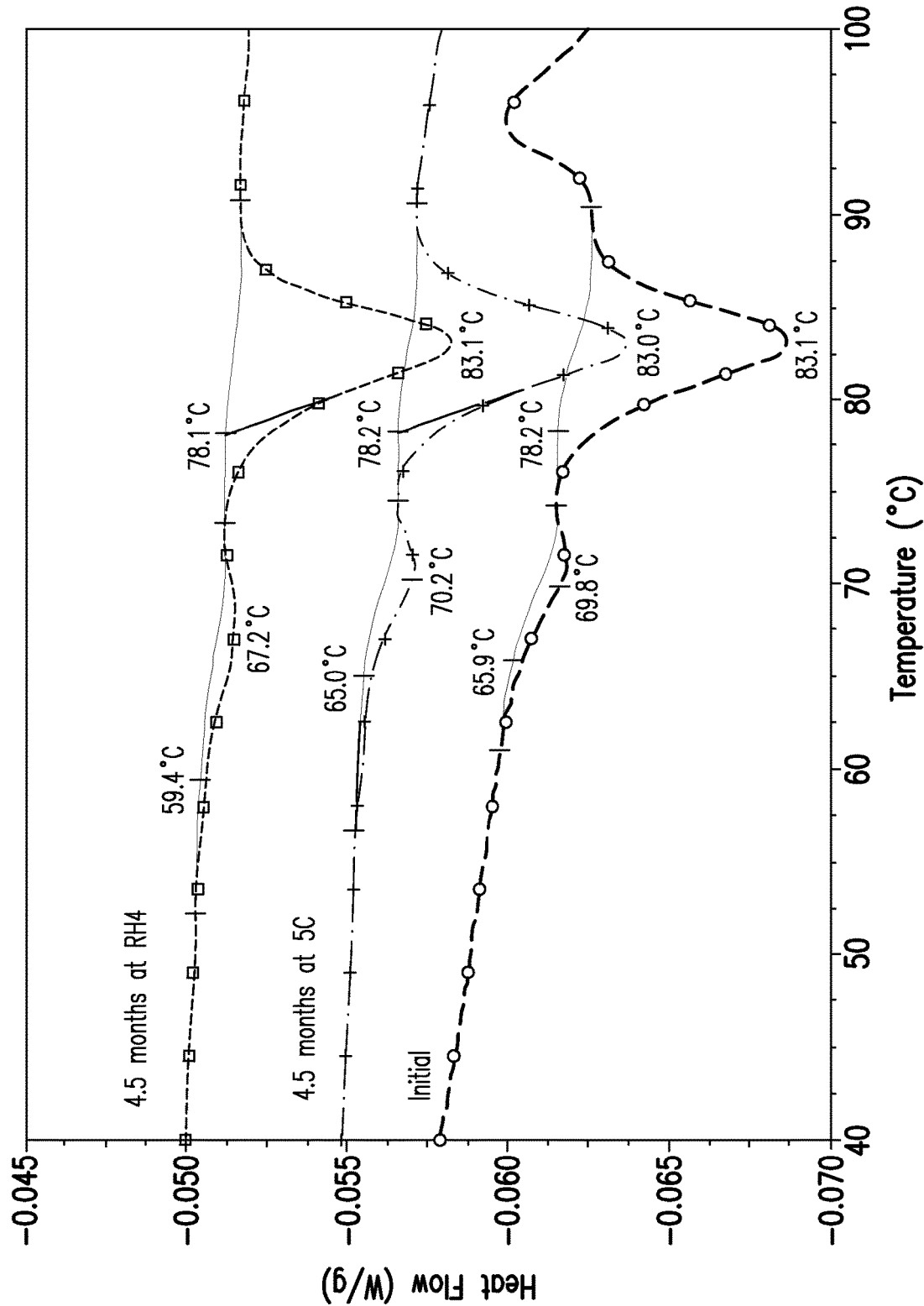
FIGS. 4L and 4M are unfolding plots from DSC experiments on acetate and histidine formulations, respectively, for initial samples and samples stored 4.5 months at 5° C. or RH4 conditions. A brief discussion of DSC is provided Example 2.
Figure 4M:
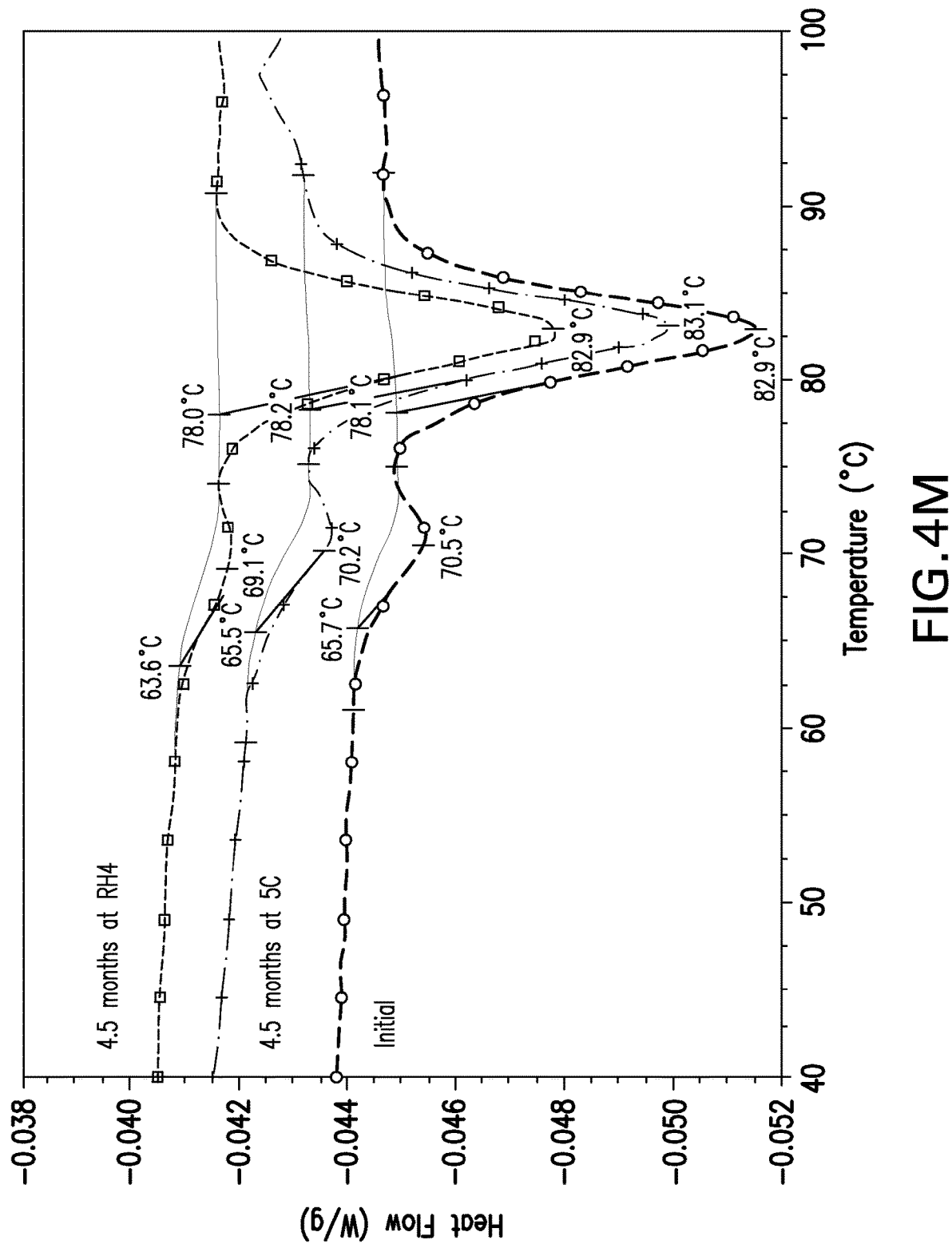

In a first set of experiments, 1.5 ml samples were placed in 2.0 ml glass vials and analyzed after storage under various conditions. Results are presented at FIG. 4. Very little degradation or aggregation was observed in samples stored at 5° C. and ambient humidity, which corresponds to typical refrigeration conditions. FIGS. 4A-4F. Accelerated degradation conditions, such as RH4 (40° C., 75% relative humidity), which were included as a positive control for sample degradation, showed the expected loss of monomer and rise of degradation and aggregation products starting as soon at the first time point (one month). FIGS. 4A-4F. Opalescence was stable at 5° C. (FIG. 4G), but increased at 25° C. and 40° C. (FIGS. 4H and 4I). Oxidation was similarly minimal at 5° C., but significant under RH4 conditions, or at 40° C. FIGS. 4J and 4K. These results indicate that although the experiments were capable of detecting degradation by a number of assays, as evidenced, e.g., by the RH4 results, storage under typical refrigeration conditions led to little or no loss in product quality over at least about nine months of storage.

In a second set of experiments, samples were placed in 30 ml ethylene-vinyl-acetate (EVA) fluid contact layer CELSIUS®-Pak bags (Sartorius, Goettingen, Germany) and analyzed after storage under various conditions. Results are presented at FIGS. 5 and 6. These experiments were designed primarily to assess stability of drug substance under typical bulk storage conditions.

Bulk storage samples were stored under three frozen conditions (−80°, −45° C. and −20° C.) and refrigerated (2°-8° C.). Representative data are provided at FIG. 5 for samples stored at 5° C. (±3° C.) and −45° C. for up to 18 months. Slight increases in concentration were observed over 12 months of storage (FIG. 5A), presumably due to evaporation from storage bags in the 5° C. samples. There were no significant trends regarding biological activity (FIGS. 5B and 5C), and protein-related impurities, degradation products and aggregates were generally within specifications for up to 18 months, particularly for samples stored frozen at −45° C. (FIGS. 5D-5L).

Stability in bulk storage was also assessed at higher temperatures. Representative data are provided at FIG. 6 for samples stored at 5° C. (±3° C.), 25° C., 25H, 40° C. and RH4 for up to 12 months. Refrigerated samples showed stable biological activity over 12 months, whereas samples stored at room temperature (25°) actually showed apparent increases in biological potency, an effect that is likely due to net concentration due to evaporation. FIGS. 6A and 6B. Samples were stable over 12 months when stored at 5° C., but protein-related impurities, (degradation products and aggregates) increased over time for samples stored at 25° C. and 25H, and increased dramatically for samples stored at 40° C. and RH4 (accelerated degradation conditions). FIGS. 6C-6K.

In a third set of experiments, 1 ml samples of 100 mg/ml antibody formulation were placed in syringes (BD Hypak Physiolis Pre-Filled Syringes) and analyzed after storage under various conditions. Results are presented at FIG. 7 for samples stored at 5° C. (±3° C.) for up to 24 months. Antibody concentrations remained essentially unchanged (FIG. 7A), as did biological activity (FIGS. 7B and 7C). Levels of high molecular weight species, percent monomer, low molecular weight species, percent main antibody peak, acidic variants, basic variants, post main peak species, main IgG, and heavy and light chains (FIGS. 7D-7L, respectively) all remained essentially stable over at least 12-24 months.

The long term stability experiments presented in FIGS. 4-7 reveal that the histidine formulation of hum13B8-b of the present invention is stable, with regard to both biological activity and physical integrity, at high antibody concentrations under typical storage conditions, whether in frozen in bulk solution or refrigerated, such as in a pre-filled syringe.

Results obtained under accelerated degradation conditions, such as RH4 and 25H, and other elevated temperature conditions, are intended merely to illustrate the possible breakdown products and pathways for antibody hum13B8-b, and do not reflect the degradation rates for antibody intended for therapeutic use. Major degradation routes for hum13B8-b found during accelerated degradation conditions include loss of purity observed by CE-SDS, increases in HMW and LMW species and decrease in the percentage monomer observed by HP-SEC. In addition, HP-IEX revealed increases in acidic variants and post-main peak species, with decreases in basic variants and the main peak. Extended storage of solution formulations of antibody drugs, such as hum13B8-b, at elevated temperature is very unlikely. Long term storage of hum13B8-b, for example, is likely to be stored in CELSIUS®-Pak bags frozen at −45° C., under which conditions quality attributes are expected to remain stable for at least 18 months. Pre-filled syringes or autoinjectors containing individual doses of hum13B8-b are likely to be stored at about 5° C. (±3° C.), and are also expected to remain stable for at least 18 months.

VI. Dosing and Administration

Although the high concentration solution formulations of the present invention are particularly suitable for high-dose subcutaneous administration, such formulations may also be administered in other ways. Suitable routes of administration may, for example, include oral, rectal, transmucosal, or intestinal administration; parenteral delivery, including intramuscular, intradermal, intramedullary injections, as well as intrathecal, direct intraventricular, intravenous, intraperitoneal, intranasal, or intraocular injections.

Alternately, one may administer the antibody in a local rather than systemic manner, for example, via injection of the antibody directly into an arthritic joint or pathogen-induced lesion characterized by immunopathology, often in a depot or sustained release formulation. Furthermore, one may administer the antibody in a targeted drug delivery system, for example, in a liposome coated with a tissue-specific antibody, targeting, for example, arthritic joint or pathogen-induced lesion characterized by immunopathology. The liposomes will be targeted to and taken up selectively by the afflicted tissue.

Subcutaneous administration may be performed by injection using a syringe, an autoinjector, an injector pen or a needleless injection device.

Although the high concentration solution formulations of the present invention are particularly advantageous for uses requiring a high concentration of antibody, there is no reason that the formulations can't be used at lower concentrations in circumstances where high concentrations are not required or desirable. Lower concentrations of antibody may be useful for low dose subcutaneous administration, or in other modes of administration (such as intravenous administration) where the volume that can be delivered is substantially more than 1 ml. Such lower concentrations can include 60, 50, 40, 30, 25, 20, 15, 10, 5, 2, 1 mg/ml or less.

Selecting an administration regimen for a therapeutic depends on several factors, including the serum or tissue turnover rate of the entity, the level of symptoms, the immunogenicity of the entity, and the accessibility of the target cells in the biological matrix. Preferably, an administration regimen maximizes the amount of therapeutic delivered to the patient consistent with an acceptable level of side effects. Accordingly, the amount of biologic delivered depends in part on the particular entity and the severity of the condition being treated. Guidance in selecting appropriate doses of antibodies, cytokines, and small molecules are available. See, e.g., Wawrzynczak (1996) *Antibody Therapy*, Bios Scientific Pub. Ltd, Oxfordshire, UK; Kresina (ed.) (1991) *Monoclonal Antibodies, Cytokines and Arthritis*, Marcel Dekker, New York, NY; Bach (ed.) (1993) *Monoclonal Antibodies and Peptide Therapy in Autoimmune Diseases*, Marcel Dekker, New York, NY; Baert et al. (2003) *New Engl. J. Med.* 348:601-608; Milgrom et al. (1999) *New Engl. J. Med.* 341:1966-1973; Slamon et al. (2001) *New Engl. J. Med.* 344:783-792; Beniaminovitz et al. (2000) *New Engl. J. Med.* 342:613-619; Ghosh et al. (2003) *New Engl. J. Med.* 348:24-32; Lipsky et al. (2000) *New Engl. J. Med.* 343:1594-1602; Physicians' Desk Reference 2003 (Physicians' Desk Reference, 57th Ed); Medical Economics Company; ISBN: 1563634457; 57th edition (November 2002).

Determination of the appropriate dose is made by the clinician, e.g., using parameters or factors known or suspected in the art to affect treatment or predicted to affect treatment. The appropriate dosage ("therapeutically effective amount") of the protein will depend, for example, on the condition to be treated, the severity and course of the condition, whether the protein is administered for preventive or therapeutic purposes, previous therapy, the patient's clinical history and response to the protein, the type of protein used, and the discretion of the attending physician. In some circumstances, a low initial does is selected and the dosage is increased by small increments thereafter until the desired or optimum therapeutic benefit is achieved relative to any negative side effects. Important diagnostic measures include those of symptoms of, e.g., the inflammation or level of inflammatory cytokines produced. The protein is suitably administered to the patient at one time or repeatedly. The protein may be administered alone or in conjunction with other drugs or therapies.

Antibodies can be provided by continuous infusion, or by doses at intervals of, e.g., one day, 1-7 times per week, one week, two weeks, monthly, bimonthly, quarterly, semiannually or annually, etc. A preferred dose protocol is one involving the maximal dose or dose frequency that avoids significant undesirable side effects. A total weekly dose is generally at least 0.05 µg/kg, 0.2 µg/kg, 0.5 µg/kg, 1 µg/kg, 10 µg/kg, 100 µg/kg, 0.2 mg/kg, 1.0 mg/kg, 2.0 mg/kg, 10 mg/kg, 25 mg/kg, 50 mg/kg body weight or more. See, e.g., Yang et al. (2003) *New Engl. J. Med.* 349:427-434; Herold et al. (2002) *New Engl. J. Med.* 346:1692-1698; Liu et al. (1999) *J. Neurol. Neurosurg. Psych.* 67:451-456; Portielji et al. (20003) *Cancer Immunol. Immunother.* 52:133-144.

VII. Uses

The present invention provides high concentration solution formulations of anti-human IL-23p19 mAb hum13B8-b for use in the treatment of inflammatory disorders and conditions, e.g., of the central nervous system, peripheral nervous system, and gastrointestinal tract, as well as autoimmune and proliferative disorders.

The formulations of the present invention can be used in the treatment of, e.g., multiple sclerosis (MS), including relapsing-remitting MS and primary progressive MS, Alzheimer's disease, amyotrophic lateral sclerosis (a.k.a. ALS; Lou Gehrig's disease), ischemic brain injury, prion diseases, and HIV-associated dementia, as well as neuropathic pain, posttraumatic neuropathies, Guillain-Barre syndrome (GBS), peripheral polyneuropathy, and nerve regeneration.

The formulations of the present invention can also be used in the treatment of inflammatory bowel disorders, e.g., Crohn's disease, ulcerative colitis, celiac disease, and irritable bowel syndrome. They can also be used in the treatment of inflammatory disorders such as graft-versus-host disease, psoriasis, atopic dermatitis, arthritis, including rheumatoid arthritis, osteoarthritis, and psoriatic arthritis, autoimmune disorders, such as systemic lupus erythematosus and type I diabetes, and proliferative disorders such as cancer. See, e.g., PCT patent application publications WO 04/081190; WO 04/071517; WO 00/53631; and WO 01/18051.

EXAMPLES

Example 1

Solution Formulation

In one embodiment, the solution formulation of hum13B8-b of the present invention is provided as a 100 mg/mL solution of antibody in 1.0 mL volume in a pre-filled syringe, or an autoinjector. The 1.0 mL volume is the extractable volume, rather than the fill volume, which may include sufficient overfill to ensure deliver of the full 1.0 mL dose. An exemplary recipe for 1.0 ml of the formulation of the present invention is provided at Table 2. In one embodiment, a drug product batch is prepared at 15-30 L scale, or about 15,000-30,000 doses.

TABLE 2

1.0 mL Solution Formulation

| Component | Grade | Quantity |
|---|---|---|
| hum13B8-b | product specifications | 100 mg |
| L-Histidine | Ph. Eur./USP | 0.683 mg |
| L-Histidine HCl | Ph. Eur. | 1.17 mg |
| Polysorbate 80 | Ph. Eur./NF/JP | 0.500 mg |
| Sucrose | Ph. Eur./NF/JP | 70.0 mg |
| Water for Injection | USP | q.s. |

In some embodiments the amounts of the buffer components (L-histidine and L-histidine HCl) deviate slightly from the weight amounts listed in Table 2 due to the need to adjust the pH to approximately 6.0. Specifically, in some embodiments more or less of either the acidic or basic forms of histidine, as compared with the amounts in Table 2, are added to adjust the pH to the desired value of about 6.0. In yet further embodiments amounts of L-histidine and L-histidine HCl approximating those in Table 2 are added to get the pH close to, but a little bit higher than, 6.0, and HCl is then added to lower the pH of the resulting formulation to about 6.0.

Example 2

Differential Scanning Calorimetry (DSC)

Valerian-Plotnikov differential scanning calorimetry (DSC) was used to monitor the thermal stability of antibodies in the formulations of the present invention. DSC directly measures heat changes that occur in proteins during controlled increase or decrease in temperature. A protein in solution is in equilibrium between the native (folded) conformation and its denatured (unfolded) state. DSC is used to determine the temperature at which 50% of the protein is denatured (thermal transition midpoint, $T_m$). Proteins with a higher $T_m$ are, in general, more stable. For example, a DSC curve is provided at FIG. 1E, which shows two transitions, the first ($T_m1$) occurring around 64-70° C., depending on the pH, and the second, main transition ($T_m2$) around 80° C. The main transition can be ascribed to unfolding of the Fc fragment. The thermal events preceding the main transition (i.e. at lower temperature) are likely due to unfolding of several other domains within the antibody (e.g. Fab), which is in line with the expected structural elements of IgG1 antibodies described in literature. Vermeer (2000) *Biophys. J.* 78:394.

Example 3

High Performance Size Exclusion Chromatography (HP-SEC)

The percentage of high molecular weight (HMW) species, low molecular weight (LMW) species and monomer in hum13B8-b formulations of the present invention were detected by HP-SEC. The test solution was diluted and separated by HPLC using a size exclusion column (YMC-pack Diol-200, 200 Å pore size, 300×8.0 mm, 5 µm, or equivalent; YMC Co. Ltd., Kyoto, Japan). The peak areas are used to determine the percentage monomer, HMW species and LMW species.

Elution peaks from SEC were characterized using multi-angle laser light scattering (SEC-MALLS), which can be used to estimate the molecular weight and to monitor aggregates. After separation of the monomer peak from fragments and aggregates on the SEC column, the sample is passed through ultra violet (UV), MALLS and refractive index (RI) detectors, enabling the calculation of analyte concentration and subsequent estimation of its molecular weight (MW). The intensity of the scattered light (detected by MALLS) is proportional to the product of the protein concentration (determined by RI) and the molecular weight. SEC-MALLS shows a predominant main peak with a molecular weight of approximately 138 kDa. This corresponds fairly well with the calculated theoretical molecular weight of the monomer of hum13B8-b, and also the mass of the monomer of hum13B8-b as detected using mass spectrometry, when taking the chromatographic resolution of SEC and the accuracy of light scattering detection into account. A high molecular weight species (HMW1), which has an molecular weight of approximately 300 kDa, likely represents a dimer species. A second HMW peak (HMW2), which is not observed in all batches, contains species with an estimated molecular weight of approximately 465 kDa, corresponding to a trimer species. A low molecular weight species (LMW) is detected with an approximate molecular weight of 108-117 kDa, which may represent a fragmentation product, for example, the product of hinge fragmentation.

Example 4

Dynamic Light Scattering (DLS)

Dynamic light scattering (DLS) is a technique that can provide insight into the size distribution profile of monoclonal antibodies in a range of 0.5 nm to 6 µm in solution. Monoclonal antibody hum13B8-b shows an average hydrodynamic diameter of approximately 9.5 nm in intensity (and 6.5 nm in volume). This is consistent with values for other monoclonal antibodies. Higher ionic strength formulations tend to have lower hydrodynamic diameters than low ionic strength formulations, and can be influenced by other solution parameters such as buffer and pH. See FIGS. 1I and 1J. Antibodies in the formulations of the present invention are essentially monodisperse. The hydrodynamic diameter for the antibodies of the present invention is reversible, as evidenced by experiments in which an antibody is diluted into a buffer of higher or lower ionic strength (data not shown). These results suggest that the hydrodynamic diameter will equilibrate to the local surroundings of the injection site when administered to a subject.

Example 5

High Performance Cation Exchange Chromatography (HP-IEX)

Charge variants for hum13B8-b were detected by HP-IEX, which relies on electrostatic interactions between proteins in a sample and charges immobilized on a resin. Positively charged hum13B8-b variants are bound to a negatively charged resin on a weak cation exchange column (Dionex ProPac WCX-10, 4×250 mm, or equivalent; Thermo Scientific, Bannockburn, Ill., USA) and are separated by HPLC. Antibody is eluted by increasing the pH and the salt concentration, effectively decreasing the charge of the antibody variants and replacing them with ions of equivalent charge. The presence of hum13B8-b and variants in the eluent are determined by UV detection. The peak areas are used to determine the percentage Acidic Variants, Main Peak, Post-Main Peak and Basic Variants.

All species detected before the main peak, eluting around 23 minutes, are referred to as Acidic Variants, while those eluting after the Main Peak are referred to as Basic Variants. Analysis of the Acidic Variants and Acidic Peaks reveals that they have no N- or C-terminal modifications, whereas the Main Peak exhibits full lysine cleavage at the C-terminus and full pyroglutamate formation at the N-terminus. The Main Peak retains full biological activity. The Post-Main Peak exhibits full lysine cleavage and limited proline α-amidation at the C-terminus, full pyroglutamate formation at the N-terminus, oxidation of Met251 and Met427, and exhibits reduced potency as measured by binding ELISA. Basic Peak 1 exhibits full lysine cleavage and some proline α-amidation at the C-terminus, and full pyroglutamate formation at the N-terminus. Basic Peak 3, the most abundant of the Basic Peaks, exhibits full lysine cleavage at the C-terminus and incomplete pyroglutamate formation at the N-terminus. Basic Variants exhibit full lysine cleavage and variable levels of proline α-amidation at the C-terminus, and incomplete to complete pyroglutamate formation at the N-terminus. The majority of charge variants retain biological activity.

Example 6

Peptide Mapping

Peptide mapping provides information on the primary structure of hum13B8-b, and can be used to assess whether oxidation has taken place. To increase sequence coverage two different enzymatic peptide maps were used to characterize hum13B8-b. The first was peptide mapping after endoproteinase Lys-C digestion. A peptide map was obtained by treating a sample of hum13B8-b with guanidine hydrochloride to denature the protein, and with 1,4-dithiothreitol (DTT) to reduce disulfide bonds. Samples were then treated with iodoacetamide (IAM) to alkylate free thiols resulting from the DTT treatment. Samples were then digested with endoproteinase Lys-C. Analysis of the resulting peptides was performed using reversed-phase liquid chromatography (Xbridge C18, 5 µm, 130 Å pore size, 2.1×150 mm or equivalent; Waters Corporation, Milford, Mass., USA) coupled to electrospray mass spectrometry. The peptide sequences originating from the light (L) and heavy (H) chains, as well as their masses that were detected using mass spectrometry, are given in Table 3. Retention times were determined by ultraviolet absorption at 214 nm during chromatography over 90 minutes. Masses were corrected for the alkylation of cysteine residues by adding a net mass of 57 Da per IAM-alkylated cysteine residue. Five peptides originating from the complementarity-determining region (CDR) of hum13B8-b are of particular interest. Common post-translationally modified peptides, such as the pyroglutamated N-terminal heavy chain peptide, the lysine-clipped C-terminal heavy chain peptide and several methionine-oxidized and deamidated peptides were observed as well. None of these modifications are found in the CDRs of the molecule. Routine peptide mapping experiments may be performed without use of mass spectrometry, and retention times of observed peaks can be used to compare samples, such as a stability (test) sample and a control (reference) sample.

A second peptide mapping method, employing trypsin digestion, was developed to add coverage over residues 64-120 of the heavy chain, which was not well represented in the Lys-C peptide map. In addition to the cleavage site C-terminal of lysine residues that is shared with endoproteinase C, trypsin also cleaves C-terminal of arginine residues (unless the next residue is P), resulting in a set of smaller peptides. The peptides arising from residues 64 to 120 of the heavy chain were detected using reversed phase liquid chromatography coupled to UV absorbance detection and mass spectrometry (for peak annotation). Relevant tryptic peptide fragments of hum13B8-b are included in Table 3.

TABLE 3

Peptide Mapping with Endoproteinase Lys-C and Trypsin

| Chain | Peptide | Retention time (min) | Observed mass (Da) | Remarks |
|---|---|---|---|---|
| H | 13-19 | 17.15 | 685.42 | |
| H | 334-337 | 8.94 | 447.27 | |
| H | 213-217 | 13.12 | 599.37 | |
| H | 14-19 | 17.15 | 557.32 | |
| H | 409-413 | 23.95 | 574.34 | |
| H | 439-445 | 35.96 | 659.35 | C-terminus -K |
| H | 326-333 | 37.23 | 837.50 | |
| H | 1-12 | 41.37 | 1267.68 | 1pE |
| H | 340-359 | 43.49 | 2310.19 | |
| H | 338-359 | 43.49 | 2509.32 | |
| H | 133-146 | 43.81 | 1320.68 | |
| H | 414-438 | 45.04 | 3059.36 | M427 oxidized |
| H | 360-369 | 47.39 | 1160.62 | |
| H | 121-132 | 47.97 | 1185.65 | |
| H | 274-287 | 50.08 | 1676.80 | |
| H | 414-438 | 52.65 | 3043.37 | |
| H | 370-391 | 56.90 | 2544.09 | N383 isoD |
| H | 370-391 | 57.27 | 2543.10 | |
| H | 370-391 | 58.13 | 2544.10 | N383 D |
| H | 248-273 | 60.30 | 2970.41 | M251 oxidized |
| H | 392-408 | 62.47 | 1872.92 | |
| H | 248-273 | 63.11 | 2954.42 | |
| H | 288-316 | 70.98 | 5066.36 | |
| H | 288-316 | 71.19 | 4904.28 | |
| H | 288-316 | 71.39 | 4758.17 | |
| H | 222-247 | 71.74 | 2843.43 | |
| H | 274-325 | 73.05 | 6096.43 | |
| H | 222-245 | 73.88 | 2618.29 | |
| H | 147-209 | 82.40 | 6712.66 | |
| H | 13-63 | 93.78 | 5696.78 | |
| H | 20-63 | 95.45 | 5029.36 | CDR-derived |
| H | 24-63 | 96.01 | 4555.12 | CDR-derived |
| L | 184-188 | 9.76 | 624.28 | |
| L | 208-214 | 19.92 | 868.36 | |
| L | 104-107 | 22.96 | 487.30 | |
| L | 146-149 | 26.46 | 559.32 | CDR-derived |
| L | 150-169 | 29.11 | 2134.95 | |
| L | 191-207 | 39.01 | 1874.92 | |
| L | 46-52 | 40.79 | 833.51 | CDR-derived |
| L | 170-183 | 47.39 | 1501.76 | |
| L | 108-126 | 64.81 | 2101.11 | |
| L | 1-42 | 68.14 | 4765.28 | |
| L | 127-145 | 68.79 | 2125.05 | |
| L | 1-39 | 68.90 | 4483.13 | |
| L | 53-103 | 77.20 | 5559.57 | CDR-derived |

Example 7

Protein Concentration by UV Spectroscopy

The protein concentration of antibody hum13B8-b in solution formulations of the present invention is determined by UV spectroscopy. The determination is based on the absorbance of UV light at 280 nm by amino acids like tryptophan, tyrosine and cysteine residues. The absorbance at 280 nm is corrected for light scattering using the absorbance at 320 nm. The method comprises a gravimetrical dilution of the sample in water, and recording of a UV spectrum to establish the absorbance at 280 nm and the absorbance at 320 nm. These absorbance values and the experimentally determined extinction coefficient of 1.44 mL mg$^{-1}$ cm$^{-1}$ are used to calculate the hum13B8-b concentration.

Example 8

Biological Activity—Cell-Based Functional Assay

A functional cell-based assay was developed to assess the ability of hum13B8-b in formulations of the present invention to block biological activities of human IL-23. This assay evaluates the ability of hum13B8-b to inhibit the IL-23-induced STAT3 activation in an IL-23 responsive cell line (Kit 225). Serial dilutions of a hum13B8-b reference material and test sample are incubated with a fixed concentration of human IL-23, followed by incubation with Kit225 IL-23-responsive cells. Inhibition of STAT3 phosphorylation by hum13B8-b is measured in cell lysates by ELISA using STAT3 capture and anti-p-STAT3 detection antibody pair, followed by incubation with peroxidase conjugated anti-IgG and addition of chemiluminescent substrate. An inhibition response curve ("standard curve") is generated using a non-linear regression four parameter logistic fit, where the IC50 value represents the concentration of anti-IL-23 that inhibits 50% of the maximum response. Relative potency of the test sample is assessed by comparison of the inhibition response curve of the test sample to the standard curve of and calculated as percent of reference. Relative potency values for multiple replicates of the same sample are combined into a single reportable value—a geometric mean of the relative potency.

Example 9

Biological Activity—Binding ELISA

The affinity of hum13B8-b in the formulations of the present invention for human IL-23 is assessed in an equilibrium binding ELISA, where serial dilutions of reference material and test samples are applied to assay plates coated with human IL-23 cytokine. This assay may be used, for example, to assess retention of biological activity in various potential therapeutic formulations. Relative potency of the test sample is assessed by comparison of the dose response curve of the test sample to the dose response curve of reference material and calculated as percent of reference.

ELISAs are performed by methods well known in the art. Briefly, serial dilutions of hum13B8-b in a formulation of the present invention are added to wells of a microtiter plate that had been previously coated with human IL-23 protein and then blocked. After an incubation period, wells are washed and a peroxidase-conjugated goat anti-human IgG (Fc) detection antibody reagent is added. Wells are again washed, and a chemiluminescent peroxidase substrate is added. Signal is read out by chemiluminescence. A sigmoidal dose response curve is generated using non-linear regression four parametric logistic fit, where the EC50 value represents concentration needed to achieve 50% of the maximum IL-23 binding signal. Relative biological potency is calculated by comparing results obtained with test samples with a standard curve based on signal levels obtained with a reference sample. Results are presented as percent biological potency as compared with the reference antibody solution. Relative potency values for multiple replicates of the same sample are combined into a single reportable value—a geometric mean of the relative potency.

Example 10

SDS Capillary Electrophoresis (CE-SDS)

Capillary electrophoresis with sodium dodecyl sulfate (CE-SDS) separates proteins based on size. CE-SDS can be performed under non-reducing conditions or under reducing conditions. Non-reducing CE-SDS resolves intact antibodies from other species in the sample, whereas reducing CE-SDS resolves the dissociated heavy and light chains from each other, and also from other potential species in the sample. See, e.g., Rustandi et al. (2008) *Electrophoresis* 29:3612.

Non-reducing CE-SDS involves heat denaturation of samples of antibody hum13B8-b in the presence of N-ethylmaleimide, to alkylate free cysteine residues, and SDS. Subsequently, the sample is separated in a capillary containing a replaceable SDS polymer matrix, which provides the sieving selectivity for the separation. All peaks in the test sample are integrated and the peak areas are used to determine the percentage Main IgG (intact antibody) in the sample.

Reducing CE-SDS involves heat denaturation of samples of antibody hum13B8-b in the presence of 2-mercaptoethanol, to reduce disulfide bonds, and SDS. Subsequently, the sample is separated in a capillary containing a replaceable SDS polymer matrix, which provides the sieving selectivity for the separation. All peaks in the test sample are integrated and the peak areas are used to determine the percentage intact heavy and light chains in hum13B8-b.

Example 11

Sedimentation Velocity Analytical Ultracentrifugation (SV-AUC)

SV-AUC was used to investigate the quaternary structure of the hum13B8-b antibody in the formulations of the present invention. SV-AUC measures the rate at which molecules sediment in response to a centrifugal force. This sedimentation rate provides information on the molecular weight of molecules present in the sample. Hum13B8-b predominantly sediments as one species with a sedimentation coefficient ($s_{20,w}$) of 7.0S. This species has an estimated molecular weight of approximately 150 kDa, which is in line with the expected molecular weight of the monomer. The frictional ratio, which is dependent on the hydration and shape of the macromolecule, is similar between lots.

Example 12

Extended Stability of Antibody Formulations

Additional long-term stability data were obtained for antibody formulations of the present invention. Exemplary stability data up to 24 months are presented in Tables 4-9 below for Lots E and D.

TABLE 4

| Lot D | Storage Condition 5 C. | | | | | | |
|---|---|---|---|---|---|---|---|
| | Stability Test Interval (Months) | | | | | | |
| Test | Initial | 1 M | 3 M | 6 M | 12 M | 18 M | 24 M |
| Assay - UV (A280 nm) mg/mL | 95.1 | 96.1 | 100.4 | 99.4 | 93.6 | 97.7 | 103.8 |
| HP-IEX [%] | | | | | | | |
| Acidic Variants | 10.1 | 10.2 | 10.2 | 10.6 | 9.3 | 11.5 | 11.6 |
| Acidic 1 Peak | 9.7 | 9.8 | 10.7 | 10.5 | 10.7 | 11.4 | 11.5 |
| Pre-Main Peak | | | | | | | |
| Main peak | 63.2 | 63.3 | 62.3 | 62.0 | 62.2 | 60.3 | 60.4 |
| Post-Main Peak | | | | | | | |
| Basic 1 peak | 9.3 | 8.9 | 8.9 | 9.2 | 9.7 | 9.0 | 8.7 |
| Basic 2 peak | 3.9 | 4.0 | 4.4 | 3.9 | 2.9 | 3.4 | 3.1 |
| Basic variants | 3.8 | 3.2 | 3.5 | 3.8 | 5.3 | 3.9 | 4.0 |
| Other | ND | 0.6 | ND | ND | ND | 0.5 | 0.6 |
| HP-SEC [%] | | | | | | | |
| High Molecular Weight Species | 0.79 | 0.83 | 0.95 | 0.51 | 0.84 | 1.16 | 1.24 |
| Monomer | 99.2 | 99.1 | 99.0 | 99.5 | 98.9 | 98.6 | 98.5 |
| Late Eluting Peaks | NQ | 0.11 | 0.07 | NQ | 0.25 | <QL | 0.27 |
| HIAC [particles/mL] | | | | | | | |
| 2 µM | 2827 | 1805 | 11905 | 3701 | 2895 | 1081 | 1879 |
| 5 µM | 292 | 168 | 1474 | 712 | 612 | 201 | 644 |
| 10 µM | 35 | 32 | 326 | 211 | 168 | 36 | 123 |
| 25 µM | 0 | 1 | 13 | 9 | 6 | 2 | 4 |

ND—Not Detected;
NQ—Not Quantified;
QL—Quantification Limit;
5 C.: 5° C. (±3° C.);
QL = 0.25%

TABLE 5

| Lot D | Storage Condition 25H | | | | |
|---|---|---|---|---|---|
| | Stability Test Interval (Months) | | | | |
| Test | Initial | 1 M | 3 M | 6 M | 12 M |
| Assay - UV (A280 nm) mg/mL | 95.1 | 96.4 | 98.6 | 102.8 | 96.3 |
| HP-IEX [%] | | | | | |
| Acidic Variants | 10.1 | 11.5 | 15.3 | 18.5 | 25.4 |
| Acidic 1 Peak | 9.7 | 11.6 | 13.8 | 14.8 | 17.9 |
| Pre-Main Peak | | | | | |
| Main peak | 63.2 | 60.3 | 56.0 | 51.7 | 42.2 |
| Post-Main Peak | | | | | |
| Basic 1 peak | 9.3 | 9.5 | 8.5 | 8.7 | 8.7 |
| Basic 2 peak | 3.9 | 3.3 | 2.2 | 1.7 | 1.6 |
| Basic variants | 3.8 | 3.8 | 3.6 | 4.5 | 4.2 |
| Other | ND | ND | 0.5 | ND | ND |
| HP-SEC [%] | | | | | |
| High Molecular Weight Species | 0.79 | 1.47 | 2.05 | 1.35 | 2.69 |
| Monomer | 99.2 | 98.4 | 97.7 | 97.9 | 96.2 |
| Late Eluting Peak | NQ | 0.14 | 0.30 | 0.77 | 1.15 |

ND—Not Detected;
NQ—Not Quantified;
25H: 25° C./60% Relative Humidity

TABLE 6

| Lot D | Storage Condition RH4 | | | |
|---|---|---|---|---|
| | Stability Test Interval (Months) | | | |
| Test | Initial | 1 M | 3 M | 6 M |
| Assay - UV (A280 nm) mg/mL | 95.1 | 95.0 | 103.6 | 102.7 |
| HP-IEX [%] | | | | |
| Acidic Variants | 10.1 | 20.4 | 46.3 | 58.4 |
| Acidic 1 Peak | 9.7 | 15.9 | 17.8 | 15.0 |
| Pre-Main Peak | | | | |
| Main peak | 63.2 | 49.4 | 24.7 | 15.8 |
| Post-Main Peak | | | | |
| Basic 1 peak | 9.3 | 8.2 | 5.0 | 5.8 |
| Basic 2 peak | 3.9 | 1.5 | 1.8 | ND |
| Basic variants | 3.8 | 3.7 | 4.4 | 5.0 |
| Other | ND | 0.8 | ND | ND |
| HP-SEC [%] | | | | |
| High Molecular Weight Species | 0.79 | 2.34 | 4.91 | 3.68 |
| Monomer | 99.2 | 97.1 | 93.3 | 93.3 |
| Late Eluting Peaks | NQ | 0.56 | 1.74 | 3.00 |

ND—Not Detected;
NQ—Not Quantified;
RH4: 40° C./75% Relative Humidity

TABLE 7

| | Storage Condition 5 C. | | | | | | |
|---|---|---|---|---|---|---|---|
| Lot E | Stability Test Interval (Months) | | | | | | |
| Test | Initial | 1 M | 3 M | 6 M | 12 M | 18 M | 24 M |
| Assay - UV (A280 nm) [mg/mL] | 94.1 | 97.5 | 97.3 | 99.0 | 91.9 | 101.3 | 98.2 |
| HP-IEX [%] | | | | | | | |
| Acidic Variants | 8.1 | 7.7 | 7.8 | 8.0 | 7.9 | 8.5 | 8.6 |
| Acidic 1 Peak | 8.3 | 8.8 | 8.8 | 8.8 | 9.1 | 9.5 | 9.6 |
| PreMain Peak | | | | | | | |
| Main peak | 66.0 | 66.0 | 66.0 | 65.8 | 65.6 | 65.2 | 65.2 |
| PosMain Peak | | | | | | | |
| Basic 1 peak | 9.5 | 9.5 | 9.7 | 9.8 | 9.9 | 9.4 | 9.4 |
| Basic 2 peak | 4.3 | 4.7 | 4.2 | 4.0 | 3.7 | 3.6 | 3.3 |
| Basic variants | 3.3 | 3.3 | 3.4 | 3.5 | 3.6 | 3.4 | 3.4 |
| Other | 0.5 | ND | ND | ND | ND | 0.5 | 0.5 |
| HP-IEX [%] | | | | | | | |
| Acidic Variants | 16.9 | NT | 17.2 | 17.8 | 18.2 | NT | 19.1 |
| Main Peak | 63.8 | NT | 63.5 | 62.7 | 63.1 | NT | 63.3 |
| Post Main Peak | 2.0 | NT | 2.1 | 2.4 | 2.1 | NT | 1.9 |
| Basic Variants | 17.3 | NT | 17.1 | 17.0 | 16.8 | NT | 15.8 |
| Binding ELISA | 112 | NT | NT | 96 | NT | NT | NT |
| Potency relative to control [%] | | | | | | | |
| Binding ELISA | NT | NT | NT | NT | 98 | 100 | 103 |
| Potency relative to control [%] | | | | | | | |
| Biological potency by Cell-based functional assay | NT | NT | NT | NT | 113 | 106 | 90 |
| HP-SEC [%] | | | | | | | |
| High Molecular Weight Species | 0.21 | 0.27 | 0.17 | 0.37 | 0.37 | 0.46 | 0.51 |
| Monomer | 99.8 | 99.7 | 99.8 | 99.5 | 99.5 | 99.3 | 99.3 |
| Late Eluting Peaks | NQ | 0.05 | NQ | 0.13 | <QL | <QL | <QL |
| HP-SEC [%] | | | | | | | |
| High Molecular Weight Species | NT | NT | NT | NT | NT | NT | 0.47 |
| Monomer | NT | NT | NT | NT | NT | NT | 99.2 |
| Late Eluting Peaks | NT | NT | NT | NT | NT | NT | 0.36 |
| HIAC [particles/mL] | | | | | | | |
| 2 μm | 1646 | 2307 | 2759 | 2240 | 5752 | 923 | 4491 |
| 5 μm | 199 | 343 | 524 | 240 | 1352 | 265 | 1733 |
| 10 μm | 15 | 96 | 136 | 30 | 275 | 48 | 585 |
| 25 μm | 0 | 3 | 4 | 1 | 15 | 0 | 11 |
| CE-SDS (Non-reduced) [%] | | | | | | | |
| Total Purity | NT | NT | NT | NT | NT | NT | 96.6 |
| CE-SDS (Reduced) [%] | | | | | | | |
| Total Purity | NT | NT | NT | NT | NT | NT | 96.6 |

ND—Not Detected;
NQ—Not Quantified;
NT—Not tested;
QL—Quantification Limit;
QL = 0.25%;
5 C.: 5° C. (±3° C.)

TABLE 8

| | Storage Condition 25H | | | | |
|---|---|---|---|---|---|
| Lot E | Stability Test Interval (Months) | | | | |
| Test | Initial | 1 M | 3 M | 6 M | 12 M |
| Assay - UV (A280 nm) [mg/mL] | 94.1 | 98.0 | 98.2 | 96.0 | 92.9 |
| HP-IEX [%] | | | | | |
| Acidic Variants | 8.1 | 9.1 | 10.9 | 14.5 | 20.0 |
| Acidic 1 Peak | 8.3 | 9.4 | 11.2 | 13.6 | 16.8 |
| Pre-Main Peak | | | | | |
| Main peak | 66.0 | 64.3 | 61.8 | 56.8 | 49.5 |
| Post-Main Peak | | | | | |
| Basic 1 peak | 9.5 | 9.6 | 9.9 | 9.5 | 7.7 |
| Basic 2 peak | 4.3 | 4.1 | 2.3 | 1.8 | 0.9 |
| Basic variants | 3.3 | 3.4 | 3.5 | 3.8 | 3.9 |
| Other | 0.5 | ND | ND | ND | 1.1 |
| Binding ELISA | 112 | NT | NT | 99 | NT |
| Potency relative to control [%] | | | | | |

TABLE 8-continued

Storage Condition 25H

| Lot E | Stability Test Interval (Months) | | | | |
|---|---|---|---|---|---|
| Test | Initial | 1 M | 3 M | 6 M | 12 M |
| Binding ELISA Potency relative to control [%] | NT | NT | NT | NT | 105 |
| Biological potency by Cell-based functional assay HP-SEC [%] | NT | NT | NT | NT | 103 |
| High Molecular Weight Species | 0.21 | 0.51 | 0.49 | 1.19 | 1.87 |
| Monomer | 99.8 | 99.4 | 99.1 | 98.3 | 97.6 |
| Low Molecular Weight Species | NQ | 0.12 | 0.43 | 0.50 | 0.86 |

ND—Not Detected;
NT—Not tested;
NQ—Not Quantified;
25H: 25° C./60% Relative Humidity.

TABLE 9

Storage Condition RH4

| Lot E | Stability Test Interval (Months) | | | |
|---|---|---|---|---|
| Test | Initial | 1 M | 3 M | 6 M |
| Assay - UV (A280 nm) [mg/mL] | 94.1 | 94.9 | 98.4 | 95.5 |
| HP-IEX [%] | | | | |
| Acidic Variants | 8.1 | 18.5 | 36.3 | 56.7 |
| Acidic 1 Peak | 8.3 | 15.1 | 19.4 | 16.5 |
| PreMain Peak | | | | |
| Main peak | 66.0 | 51.6 | 32.6 | 16.9 |
| PostMain Peak | | | | |
| Basic 1 peak | 9.5 | 8.8 | 7.3 | 5.5 |
| Basic 2 peak | 4.3 | 1.7 | 0.4 | ND |
| Basic variants | 3.3 | 3.6 | 4.1 | 4.4 |

TABLE 9-continued

Storage Condition RH4

| Lot E | Stability Test Interval (Months) | | | |
|---|---|---|---|---|
| Test | Initial | 1 M | 3 M | 6 M |
| Other | 0.5 | 0.7 | ND | ND |
| Binding ELISA Potency relative to control [%] | 112 | NT | NT | 104 |
| HP-SEC [%] | | | | |
| High Molecular Weight Species | 0.21 | 1.39 | 1.66 | 4.86 |
| Monomer | 99.8 | 98.1 | 96.7 | 92.7 |
| Low Molecular Weight Species | NQ | 0.51 | 1.60 | 2.44 |

ND—Not Detected;
NQ—Not Quantified;
NT—Not tested;
RH4: 40° C./75% Relative Humidity Table 10 lists the sequences in the sequence listing.

TABLE 10

Sequence Identifiers

| SEQ ID NO: | Description |
|---|---|
| 1 | hum13B8-b HC |
| 2 | hum13B8-b LC |
| 3 | 13B8-b CDRH1 |
| 4 | 13B8-b CDRH2 |
| 5 | 13B8-b CDRH3 |
| 6 | 13B8-b CDRL1 |
| 7 | 13B8-b CDRL2 |
| 8 | 13B8-b CDRL3 |
| 9 | human IL-23p19 |
| 10 | hum13B8-b HC DNA |
| 11 | hum13B8-b LC DNA |
| 12 | Heavy Chain Signal Sequence |
| 13 | Light Chain Signal Sequence |

What is claimed is:

1. A stable solution formulation of anti-IL-23p19 antibody hum13B8-b comprising:
   a) 100 mg/ml anti-IL-23p19 antibody hum13B8-b;
   b) about 10 mM histidine buffer, pH 6.0±0.3;
   c) 0.05% polysorbate 80; and
   d) 7% sucrose;
   wherein the anti-IL-23p19 antibody hum13B8-b comprises:
      i) a heavy chain polypeptide comprising the amino acid sequence of SEQ ID NO: 1; and
      ii) a light chain polypeptide comprising the amino acid sequence of SEQ ID NO: 2; and
   wherein the formulation is stable for at least 18 months at 5°±3° C.

2. The stable solution formulation of claim 1, wherein the histidine comprises L-histidine and L-histidine HCl.

3. A method of treating psoriasis comprising subcutaneous administration of the stable solution formulation of claim 1 at quarterly intervals.

4. The method of treating psoriasis of claim 3, wherein the subcutaneous administration is performed by injection using a syringe, an autoinjector, an injector pen or a needleless injection device.

5. A stable solution formulation of anti-IL-23p19 antibody hum13B8-b comprising:
   a) 100 mg/ml anti-IL-23p19 antibody hum13B8-b;
   b) about 10 mM histidine buffer, pH 6.0±0.3;
   c) 0.05% polysorbate 80; and
   d) 7% sucrose;
   wherein the anti-IL-23p19 antibody hum13B8-b comprises:
      i) a heavy chain polypeptide comprising the amino acid sequence of SEQ ID NO: 1; and
      ii) a light chain polypeptide comprising the amino acid sequence of SEQ ID NO: 2; and
   wherein the formulation is stable for at least 3 months at 25°±5° C. and 60% relative humidity.

6. The stable solution formulation of claim 5, wherein the histidine comprises L-histidine and L-histidine HCl.

* * * * *

SEQUENCE LISTING

```
<160> NUMBER OF SEQ ID NOS: 13

<210> SEQ ID NO 1
<211> LENGTH: 446
<212> TYPE: PRT
<213> ORGANISM: Artificial Sequence
<220> FEATURE:
<223> OTHER INFORMATION: Human frameworks, rodent CDRs
<220> FEATURE:
<221> NAME/KEY: DOMAIN
<222> LOCATION: (1)..(116)
<223> OTHER INFORMATION: Variable Domain

<400> SEQUENCE: 1

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ile Phe Ile Thr Tyr
                20                  25                  30

Trp Met Thr Trp Val Arg Gln Ala Pro Gly Gln Gly Leu Glu Trp Met
            35                  40                  45

Gly Gln Ile Phe Pro Ala Ser Gly Ser Ala Asp Tyr Asn Glu Lys Phe
        50                  55                  60

Glu Gly Arg Val Thr Met Thr Thr Asp Thr Ser Thr Ser Thr Ala Tyr
65                  70                  75                  80
```

-continued

```
Met Glu Leu Arg Ser Leu Arg Ser Asp Asp Thr Ala Val Tyr Tyr Cys
                85                  90                  95

Ala Arg Gly Gly Gly Gly Phe Ala Tyr Trp Gly Gln Gly Thr Leu Val
            100                 105                 110

Thr Val Ser Ser Ala Ser Thr Lys Gly Pro Ser Val Phe Pro Leu Ala
        115                 120                 125

Pro Ser Ser Lys Ser Thr Ser Gly Gly Thr Ala Ala Leu Gly Cys Leu
    130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Gln Thr Tyr Ile Cys Asn Val Asn His Lys Pro Ser Asn Thr
        195                 200                 205

Lys Val Asp Lys Lys Val Glu Pro Lys Ser Cys Asp Lys Thr His Thr
    210                 215                 220

Cys Pro Pro Cys Pro Ala Pro Glu Leu Leu Gly Gly Pro Ser Val Phe
225                 230                 235                 240

Leu Phe Pro Pro Lys Pro Lys Asp Thr Leu Met Ile Ser Arg Thr Pro
                245                 250                 255

Glu Val Thr Cys Val Val Val Asp Val Ser His Glu Asp Pro Glu Val
            260                 265                 270

Lys Phe Asn Trp Tyr Val Asp Gly Val Glu Val His Asn Ala Lys Thr
        275                 280                 285

Lys Pro Arg Glu Glu Gln Tyr Asn Ser Thr Tyr Arg Val Val Ser Val
    290                 295                 300

Leu Thr Val Leu His Gln Asp Trp Leu Asn Gly Lys Glu Tyr Lys Cys
305                 310                 315                 320

Lys Val Ser Asn Lys Ala Leu Pro Ala Pro Ile Glu Lys Thr Ile Ser
                325                 330                 335

Lys Ala Lys Gly Gln Pro Arg Glu Pro Gln Val Tyr Thr Leu Pro Pro
            340                 345                 350

Ser Arg Asp Glu Leu Thr Lys Asn Gln Val Ser Leu Thr Cys Leu Val
        355                 360                 365

Lys Gly Phe Tyr Pro Ser Asp Ile Ala Val Glu Trp Glu Ser Asn Gly
    370                 375                 380

Gln Pro Glu Asn Asn Tyr Lys Thr Thr Pro Pro Val Leu Asp Ser Asp
385                 390                 395                 400

Gly Ser Phe Phe Leu Tyr Ser Lys Leu Thr Val Asp Lys Ser Arg Trp
                405                 410                 415

Gln Gln Gly Asn Val Phe Ser Cys Ser Val Met His Glu Ala Leu His
            420                 425                 430

Asn His Tyr Thr Gln Lys Ser Leu Ser Leu Ser Pro Gly Lys
        435                 440                 445

<210> SEQ ID NO 2
<211> LENGTH: 214
<212> TYPE: PRT
<213> ORGANISM: Artificial Sequence
<220> FEATURE:
<223> OTHER INFORMATION: Human frameworks, rodent CDRs
<220> FEATURE:
<221> NAME/KEY: DOMAIN
<222> LOCATION: (1)..(108)
```

<223> OTHER INFORMATION: Variable Domain

<400> SEQUENCE: 2

Asp Ile Gln Met Thr Gln Ser Pro Ser Ser Leu Ser Ala Ser Val Gly
1               5                   10                  15

Asp Arg Val Thr Ile Thr Cys Arg Thr Ser Glu Asn Ile Tyr Ser Tyr
            20                  25                  30

Leu Ala Trp Tyr Gln Gln Lys Pro Gly Lys Ala Pro Lys Leu Leu Ile
        35                  40                  45

Tyr Asn Ala Lys Thr Leu Ala Glu Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln His His Tyr Gly Ile Pro Phe
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 3
<211> LENGTH: 10
<212> TYPE: PRT
<213> ORGANISM: Mus musculus

<400> SEQUENCE: 3

Gly Tyr Ile Phe Ile Thr Tyr Trp Met Thr
1               5                   10

<210> SEQ ID NO 4
<211> LENGTH: 17
<212> TYPE: PRT
<213> ORGANISM: Artificial Sequence
<220> FEATURE:
<223> OTHER INFORMATION: Rodent CDR with one amino acid substitution

<400> SEQUENCE: 4

Gln Ile Phe Pro Ala Ser Gly Ser Ala Asp Tyr Asn Glu Lys Phe Glu
1               5                   10                  15

Gly

<210> SEQ ID NO 5
<211> LENGTH: 7
<212> TYPE: PRT
<213> ORGANISM: Mus musculus

<400> SEQUENCE: 5

```
Gly Gly Gly Gly Phe Ala Tyr
1               5

<210> SEQ ID NO 6
<211> LENGTH: 11
<212> TYPE: PRT
<213> ORGANISM: Mus musculus

<400> SEQUENCE: 6

Arg Thr Ser Glu Asn Ile Tyr Ser Tyr Leu Ala
1               5                   10

<210> SEQ ID NO 7
<211> LENGTH: 7
<212> TYPE: PRT
<213> ORGANISM: Mus musculus

<400> SEQUENCE: 7

Asn Ala Lys Thr Leu Ala Glu
1               5

<210> SEQ ID NO 8
<211> LENGTH: 9
<212> TYPE: PRT
<213> ORGANISM: Mus musculus

<400> SEQUENCE: 8

Gln His His Tyr Gly Ile Pro Phe Thr
1               5

<210> SEQ ID NO 9
<211> LENGTH: 170
<212> TYPE: PRT
<213> ORGANISM: Homo sapiens

<400> SEQUENCE: 9

Arg Ala Val Pro Gly Gly Ser Ser Pro Ala Trp Thr Gln Cys Gln Gln
1               5                   10                  15

Leu Ser Gln Lys Leu Cys Thr Leu Ala Trp Ser Ala His Pro Leu Val
                20                  25                  30

Gly His Met Asp Leu Arg Glu Glu Gly Asp Glu Glu Thr Thr Asn Asp
            35                  40                  45

Val Pro His Ile Gln Cys Gly Asp Gly Cys Asp Pro Gln Gly Leu Arg
        50                  55                  60

Asp Asn Ser Gln Phe Cys Leu Gln Arg Ile His Gln Gly Leu Ile Phe
65                  70                  75                  80

Tyr Glu Lys Leu Leu Gly Ser Asp Ile Phe Thr Gly Glu Pro Ser Leu
                85                  90                  95

Leu Pro Asp Ser Pro Val Gly Gln Leu His Ala Ser Leu Leu Gly Leu
                100                 105                 110

Ser Gln Leu Leu Gln Pro Glu Gly His His Trp Glu Thr Gln Gln Ile
            115                 120                 125

Pro Ser Leu Ser Pro Ser Gln Pro Trp Gln Arg Leu Leu Leu Arg Phe
        130                 135                 140

Lys Ile Leu Arg Ser Leu Gln Ala Phe Val Ala Val Ala Ala Arg Val
145                 150                 155                 160

Phe Ala His Gly Ala Ala Thr Leu Ser Pro
                165                 170
```

<210> SEQ ID NO 10
<211> LENGTH: 1398
<212> TYPE: DNA
<213> ORGANISM: Artificial Sequence
<220> FEATURE:
<223> OTHER INFORMATION: Human constant and framework regions, rodent
      CDRs

<400> SEQUENCE: 10

| | |
|---|---|
| atggctgtgc tggggctgct gttctgcctg gtgacattcc caagctgtgt gctgtcccag | 60 |
| gtgcagctgg tgcagtctgg cgctgaggtg aagaagcctg gcgcctccgt gaaggtctcc | 120 |
| tgcaaggctt ctggctacat cttcatcacc tactggatga cctgggtgcg gcaggcccct | 180 |
| ggccaggggc tggagtggat gggccagatc ttccctgcca gcggctctgc agactacaac | 240 |
| gagaagttcg aaggcagagt caccatgacc acagacacat ccaccagcac agcctacatg | 300 |
| gagctgagga gcctgagatc tgacgacacc gccgtgtatt actgtgccag aggcggtggc | 360 |
| ggattcgctt actggggcca gggcaccctg gtcaccgtct ccagcgctag caccaagggc | 420 |
| ccatcggtct tccccctggc accctcctcc aagagcacct ctgggggcac agcggccctg | 480 |
| ggctgcctgg tcaaggacta cttccccgaa ccggtgacgg tgtcgtggaa ctcaggcgcc | 540 |
| ctgaccagcg gcgtgcacac cttccggct gtcctacagt cctcaggact ctactccctc | 600 |
| agcagcgtgg tgaccgtgcc ctccagcagc ttgggcaccc agacctacat ctgcaacgtg | 660 |
| aatcacaagc ccagcaacac caaggtggac aagaaagttg agcccaaatc ttgtgacaaa | 720 |
| actcacacat gcccaccgtg cccagcacct gaactcctgg ggggaccgtc agtcttcctc | 780 |
| ttccccccaa aacccaagga caccctcatg atctcccgga cccctgaggt cacatgcgtg | 840 |
| gtggtggacg tgagccacga agaccctgag gtcaagttca actggtacgt ggacggcgtg | 900 |
| gaggtgcata atgccaagac aaagccgcgg gaggagcagt acaacagcac gtaccgtgtg | 960 |
| gtcagcgtcc tcaccgtcct gcaccaggac tggctgaatg gcaaggagta caagtgcaag | 1020 |
| gtctccaaca aagccctccc agcccccatc gagaaaacca tctccaaagc caagggcag | 1080 |
| ccccgagaac acaggtgta caccctgccc ccatcccggg atgagctgac caagaaccag | 1140 |
| gtcagcctga cctgcctggt caaaggcttc tatcccagcg acatcgccgt ggagtgggag | 1200 |
| agcaatgggc agccggagaa caactacaag accacgcctc ccgtgctgga ctccgacggc | 1260 |
| tccttcttcc tctacagcaa gctcaccgtg gacaagagca ggtggcagca ggggaacgtc | 1320 |
| ttctcatgct ccgtgatgca tgaggctctg cacaaccact acacgcagaa gagcctctcc | 1380 |
| ctgtctccgg gtaaatga | 1398 |

<210> SEQ ID NO 11
<211> LENGTH: 702
<212> TYPE: DNA
<213> ORGANISM: Artificial Sequence
<220> FEATURE:
<223> OTHER INFORMATION: Human constant and framework regions, rodent
      CDRs

<400> SEQUENCE: 11

| | |
|---|---|
| atggctccag tgcagctgct ggggctgctg gtgctgttcc tgccagccat gagatgtgat | 60 |
| atccagatga cccagtctcc atcctccctg tctgcctctg tgggcgacag agtgaccatc | 120 |
| acctgcagga ccagcgagaa catctacagc tacctggcct ggtatcagca gaagccaggg | 180 |
| aaggccccta agctgctgat ctataacgcc aagaccctgg ctgaagggt gccatccagg | 240 |
| ttcagcggca gcggctctgg gacagacttc accctgacca tcagcagcct gcagcctgag | 300 |

```
gacttcgcca cctactactg tcagcaccac tacggaattc cattcacctt cggccagggc    360
accaaggtgg agatcaagcg tacggtggct gcaccatctg tgttcatctt ccctccatct    420
gatgagcagc tgaagtctgg aactgcctcc gtggtgtgcc tgctgaataa cttctatccc    480
agagaggcca aggtgcagtg gaaggtggat aacgccctcc agagcggcaa ctcccaggag    540
agcgtgacag agcaggacag caaggacagc acctacagcc tgagcagcac cctgaccctg    600
agcaaagcag actacgagaa acacaaggtg tacgcctgcg aggtgaccca tcagggcctg    660
agcagccccg tgacaaagag cttcaacagg ggagagtgtt aa                       702
```

```
<210> SEQ ID NO 12
<211> LENGTH: 19
<212> TYPE: PRT
<213> ORGANISM: Mus musculus

<400> SEQUENCE: 12

Met Ala Val Leu Gly Leu Leu Phe Cys Leu Val Thr Phe Pro Ser Cys
1               5                   10                  15

Val Leu Ser

<210> SEQ ID NO 13
<211> LENGTH: 19
<212> TYPE: PRT
<213> ORGANISM: Rattus norvegicus

<400> SEQUENCE: 13

Met Ala Pro Val Gln Leu Leu Gly Leu Leu Val Leu Phe Leu Pro Ala
1               5                   10                  15

Met Arg Cys
```